US006141862A

United States Patent [19]

Matsui et al.

[11] Patent Number: 6,141,862

[45] Date of Patent: Nov. 7, 2000

[54] APPARATUS AND METHOD FOR DISASSEMBLING AND ASSEMBLING GAS TURBINE COMBUSTOR

[75] Inventors: Hiroshi Matsui, Souka; Yoshinobu Ishikawa, Hino; Tadashi Munakata, Tokyo; Yoshikata Kobayashi, Hachiouji; Takeshi Takahara, Yokohama; Yoshihiko Nakada, Tama; Yukio Someya, Higashimurayama, all of Japan

[73] Assignee: Kabushiki Kaisha Toshiba, Kawasaki, Japan

[21] Appl. No.: 08/726,932

[22] Filed: Oct. 7, 1996

[30] Foreign Application Priority Data

Oct. 11, 1995 [JP] Japan .................................... 7-263372
Apr. 8, 1996 [JP] Japan .................................... 8-111342

[51] Int. Cl.[7] ............................ B23P 21/00; B23Q 15/00

[52] U.S. Cl. ........................ 29/714; 29/890.01; 29/889.2; 29/278; 29/281.6

[58] Field of Search .................................... 29/700, 281.6, 29/888.01, 888.011, 890.01, 889.2, 714, 715, 270, 271, 278, 281.5; 901/44, 50, 1

[56] References Cited

U.S. PATENT DOCUMENTS 3,678,559 7/1972 Zilkalns ................................ 29/281.6
3,780,571 12/1973 Wiesener ................................ 901/44 X
3,790,356 2/1974 Bergling ............................ 29/281.6 X
3,815,202 6/1974 Squires .............................. 29/281.6 X
5,109,915 5/1992 Osusko .................................. 901/44 X
5,117,897 6/1992 Robert .................................. 901/44 X
5,381,811 1/1995 Boisture .................................. 901/1 X

FOREIGN PATENT DOCUMENTS 6-91448 4/1994 Japan ...................................... 29/700
8-200682 8/1996 Japan .
2279605 1/1995 United Kingdom ..................... 29/700

*Primary Examiner*—David P. Bryant
*Assistant Examiner*—Marc W. Butler
*Attorney, Agent, or Firm*—Oblon, Spivak, McClelland, Maier & Neustadt, P.C.

[57] ABSTRACT

An apparatus for disassembling and assembling a gas turbine combustor comprises a hand assembly for holding a combustor component of a gas turbine, an inserting and drawing section which supports the hand assembly and moves the same in parallel to a central axis of the combustor component and a retainer for securing the inserting and drawing section onto a casing which constitutes an outer section of the gas turbine.

42 Claims, 50 Drawing Sheets

APPARATUS AND METHOD FOR DISASSEMBLING AND ASSEMBLING GAS TURBINE COMBUSTOR

BACKGROUND OF THE INVENTION

The present invention relates to a gas turbine combustor disassembling and assembling apparatus and a gas turbine combustor disassembling and assembling method capable of easily disassembling and assembling a gas turbine combustor in an improved manner.

The combustor of a gas turbine is composed of a high-temperature component which is overhauled at regular intervals. Extensively used as a commercial large gas turbine is a multi-can type, as shown in FIG. 54, in which about ten to twenty combustors 2 are disposed around the axial center of a gas turbine 1 at a predetermined tilt angle A provided with respect to the axial center. In recent years, the combustors of such gas turbine 1 are becoming complicated in structure and increasing in weight due to the demand for obtaining higher temperature and reduced Nox.

As illustrated in FIG. 55, the multi-can type combustor 2 is so constructed that a combustor casing 7 is connected to a gas turbine main body casing 8 to constitute an outer section, and a fuel nozzle 3 is disposed by a mounting flange 25 to an end of the combustor casing 7 via a head plate 4. Fuel is supplied through the fuel nozzle 3 and the burnt gas is led to a turbine 26 via a combustor liner 5. Reference numeral 6 denotes a transition piece which guides the air supplied from a compressor 27 to the outer surface of an inner cylinder 28 so as to cool the inner cylinder 28, then leads it into the combustor 2.

A heaviest component of a recent large gas turbine 1 having the configuration described above weighs approximately 500 kgf. Despite this, the disassembling and assembling work of the combustor 2 has conventionally been done by hand except a lifting device such as an overhead crane is used.

Manual handling of heavy substances involves danger including accidents of lifting failures and getting caught. Disassembling and assembling the combustors 2 located at lower half side of the gas turbine is especially difficult because cranes or the like cannot be used. Therefore, there has been a demand for improving the work.

Furthermore, the transition piece 6 of a state-of-the-art gas turbine weights nearly 100 kg. A crane cannot be used for handling the transition piece 6 because it is located in the gas turbine main body casing 8. Hence, moving the transition piece 6 out of and back into the gas turbine main body casing must be done mostly by hand, making the work extremely difficult.

As the disassembling and assembling work becomes difficult, the period for overhauling the combustors 2 becomes longer, resulting in an extended shutdown period of a gas turbine system.

Mechanizing the work which has been done by hand to a large extent may be a possible solution to the problem described above. However, no effective apparatus has yet been developed mainly due to the multi-can design of the combustor casing 7 and the increasingly complicated structure of the combustor 2 itself.

SUMMARY OF THE INVENTION

An object of the present invention is to substantially eliminate defects or drawbacks encountered in the prior art described above and to provide apparatus and method for disassembling and assembling a gas turbine combustor capable of easily disassembling and assembling the gas turbine combustor in an improved manner.

This and other objects can be achieved according to the present invention by providing, in one aspect, an apparatus for disassembling and assembling a gas turbine combustor, comprising:

- a hand assembly for holding the combustor component of a gas turbine;
- an inserting and drawing section which supports the hand assembly and moves the same in parallel to a central axis of the combustor component; and
- a retainer for securing the inserting and drawing section onto a casing which constitutes an outer section of the gas turbine.

The retainer comprises a plurality of supporting sections which are provided in a circumferential direction of the casing of the gas turbine and a travel device which moves along the supporting sections in the circumferential direction of the gas turbine.

The hand assembly comprises an inner hand and an outer hand, the inner hand being constructed by a rod which has a length allowing the rod to be inserted in the casing of the gas turbine and which is flexible and a holding section disposed on the distal end of the rod, and the outer hand being constructed by a holding section disposed on the outer side of the inner hand.

In another aspect, there is provided an apparatus for disassembling and assembling a gas turbine combustor, comprising:

- at least two annular rails which are installed concentrically with an axial center of the gas turbine;
- a frame which travels on the annular rails in a circumferential direction of the gas turbine;
- a hand mounting section which travels on the frame in a direction for inserting and drawing out the combustor component; and
- a hand assembly which is mounted on the hand mounting section and which holds the combustor component,
- wherein the hand assembly is installed with substantially the same tilt angle as a tilt angle for mounting the combustor component on the gas turbine, and the hand mounting section and the hand assembly are connected so as to be allowed to rock in two independent directions by a link mechanism which has at least three links.

In preferred embodiments, an intermediate mounting section is further provided between the hand mounting section and the hand assembly and a plurality of the link mechanisms are connected in series via the intermediate mounting section.

There may be further comprised of a restoring mechanism which provides the link mechanisms with a restoring force to restore a particular attitude thereof and a rocking and securing mechanism for rocking the link mechanisms until the link mechanisms take a predetermined attitude and for applying a braking force to the link mechanisms when reached the predetermined attitude. The links of the link mechanism are respectively arranged in parallel.

The links of the link mechanisms are arranged to form a trapezoid directed substantially toward a reference point at an end of the combustor component observed from the hand assembly side. Two links of three or more link mechanisms are formed as a set and the link ends of the set are coaxially connected. The link mechanisms are equipped with a balancing mechanism, the balancing mechanism having a point of action at the intermediate mounting section at a portion near the hand assembly of the link mechanisms or the hand assembly and having a fulcrum at the hand mounting section at a portion near the frame of the link mechanisms or the intermediate mounting section, a balancing weight serving as a point of force which balances with a weight at the fulcrum is provided on the opposite side to the fulcrum, and a balancing link which serves also as one of the links of the link mechanisms or a separate balancing link is employed as a balance pole of the three points to support the balancing link so as to be allowed to rock in two independent directions at the point of action and the fulcrum.

The balancing mechanism is provided with a balance ratio changing mechanism for changing a balance ratio by changing the position of the point of force, the point of action or the fulcrum. The balancing link is separately provided and the balancing link is equipped with an error absorbing mechanism which absorbs a geometrical error in a link direction when the link mechanism moves if the balancing link is geometrically redundant for the link mechanism.

A length or a supporting of the links of the trapezoid linkage-shaped link mechanisms which connect the intermediate mounting section and the hand assembly is changed, and a position of the reference point toward which the links are directed between an inserting distal end mounting section and the center of gravity of the combustor component to be held by the hand assembly is changed.

There may be further provided with at least an axis position changing mechanism for changing a position of the axis of the link end of the link mechanism or a link length changing mechanism, and reference point position moving means for changing the position of the reference point toward which the links of the link mechanism are directed between the distal end mounting section and a center of gravity of the combustor component. There may be also provided with, instead of the link mechanism, a guiding mechanism for guiding the hand assembly in a spherical trajectory in relation to the intermediate mounting section.

The guiding mechanism is a curve guiding mechanism in two independent directions which permits a curvature radius center to be set between a distal end mounting section and the center of gravity of the combustor component as observed from the hand assembly.

The restoring mechanism has a restore position adjusting mechanism for adjusting the restore position of the link mechanisms.

A chain which serves as a traveling guide of the frame, on which the hand assembly is mounted, is further disposed in the circumferential direction of the annular rail on an outer or inner circumferential side of the annular rail, the chain having a plurality of lengthy chain elements projecting on both sides of the chain provided at intervals, and the projecting ends of the respective lengthy chain pins are fixed to the annular rail by fixtures.

The frame which travels along the annular rail has a plurality of travel sprocket type wheels which engage with the chain in the direction of the length of the chain so that the wheels rotate in synchronization with each other.

The frame which travels on the annular rail is mounted on a guide member which is guided by the annular rail, a mounting portion of the frame with respect to the guide member is fixed with a plurality of fasteners, and a fastened section secured by the fasteners is fastened via elastic means which permits movement in a counter-fastening direction in response to a reaction force of a predetermined level or higher in the counter-fastening direction.

The annular rail is permanently provided on an outer circumferential section of the gas turbine so that the annular rail serves to support a component installed around the gas turbine.

There may be further provided with a movable body which moves to respective positions of the outer circumferential section of the gas turbine along the annular rail, the movable body being provided with a retaining member capable of retaining a component of the gas turbine. There may be further provided with a combustor component retaining device which permits transfer of the combustor component to and from the hand assembly and positioning means for positioning and stopping said combustor component retaining device in a predetermined position and for always ensuring that the combustor component is transferred to and from the hand assembly in the predetermined position.

A flange extending on an outer periphery of a casing of a main body of the gas turbine is applied as the annular rail so as to use the flange as the rail on which the frame is mounted, a plurality of guiding projections which are parallel to the axial center of the casing of the main body of the gas turbine are projected all over a circumference of a side surface of said flange at predetermined intervals, a rotating drive device having a gear engaging with the respective guiding projections is installed on the frame, and the frame is adapted to travel around the casing of the main body of the gas turbine.

The annular rail is disposed with a predetermined gap provided in a diametral direction around a casing of a main body of the gas turbine by interconnecting a plurality of split ring rail elements, a plurality of jack screws are disposed to project toward a center on an inner circumferential side of said rail elements, a plurality of base plates are connected at intervals in a circumferential direction on an outer peripheral surface of the casing of the main body of the gas turbine, and the base plates are respectively pressed against the outer peripheral surface of the casing of the main body of the gas turbine from the rail elements by fixtures which engage with the jack screws to fix the annular rail. The annular rail is provided with an operating area defining section composed of a projection or a groove and a frame which travels on the annular rail is provided with a movable mechanical stopper which moves in and out of the operating area defining section. The mechanical stopper is equipped with a movable hard limit switch which detects in advance an approach of the mechanical stopper to an end of the operating area defining section. There may be further provided with a conduit for taking a power and a signal from outside an operating area of the frame and a cable hitch for supporting a middle portion of the conduit in a position of an enclosure of the gas turbine. A controller for controlling operating sections is disposed on a floor outside the operating area. The conduit has a sufficient length beyond the cable hitch to allow the cable hitch to be wound around the gas turbine and a check switch for checking the number of workers is provided in the middle of the conduit.

The restoring mechanism is equipped with a position check sensor for checking that the link mechanisms have been restored to a particular position. The balance ratio changing mechanism is disposed and further comprises an automatic restoring mechanism which operates the balance ratio changing mechanism according to information received from the position check sensor so as to reset said link mechanisms to the particular position.

In a further aspect of the present invention, there is provided an apparatus for disassembling and assembling a gas turbine combustor, comprising:

at least two annular rails which are installed concentrically with an axial center of the gas turbine;

a frame which travels on the annular rails in a circumferential direction of the gas turbine;

a hand mounting section which travels on the frame in a direction for inserting and drawing out the combustor component; and a hand assembly which is mounted on the hand mounting section and which holds the combustor component, wherein the hand assembly is provided with an independent inner hand and an independent outer hand, the inner hand being equipped, at a root of the inner hand, with a rotatable inner hand joint, a driving and fixing shaft which drives a hook of the inner hand and which also fixes the inner hand joint when the drive shaft moves to a side where the hand is used, and an inner hand stretching device which stretches and bends the inner hand joint.

In a still further aspect, there is provided an apparatus for disassembling and assembling a gas turbine combustor, comprising:

at least two annular rails which are installed concentrically with an axial center of the gas turbine;

a frame which travels on the annular rails in a circumferential direction of the gas turbine;

a hand mounting section which travels on the frame in a direction for inserting and drawing out the combustor component; and a hand assembly which is mounted on the hand mounting section and which holds the combustor component, wherein the hand assembly is provided with an independent inner hand and an independent outer hand, the inner hand having a hook equipped with a rotatable auxiliary roller which is composed of an elastic material.

In a still further aspect, there is provided an apparatus for disassembling and assembling a gas turbine combustor, comprising:

at least two annular rails which are installed concentrically with an axial center of the gas turbine;

a frame which travels on the annular rails in a circumferential direction of the gas turbine;

a hand mounting section which travels on the frame in a direction for inserting and drawing out the combustor component; and a hand assembly which is mounted on the hand mounting section and which holds the combustor component, wherein the hand assembly is provided with an independent inner hand and an independent outer hand, the outer hand having a hook provided with a driving unit which comprises an outer hand driving device which drives an output end in a linear direction or a rotational directional in relation to a hand central axis and an outer hand hook driving link which rotatably links one end thereof to an output end of the outer hand driving device and which rotatably links another end thereof to the hook.

In a still further aspect, there is provided an apparatus for disassembling and assembling a gas turbine combustor, comprising:

at least two annular rails which are installed concentrically with an axial center of the gas turbine;

a frame which travels on the annular rails in a circumferential direction of the gas turbine;

a hand mounting section which travels on the frame in a direction for inserting and drawing out the combustor component; and a hand assembly which is mounted on the hand mounting section and which holds the combustor component, wherein the hand assembly is provided with an independent inner hand and an independent outer hand, and a rotatable auxiliary roller is provided on a corner end section of a hook of the outer hand.

In a still further aspect of the present invention, there is provided a method of disassembling and assembling a gas turbine combustor comprising the steps of:

preparing a gas turbine combustor disassembling and assembling apparatus having a hand assembly and an inserting and drawing means;

holding a component of the gas turbine combustor by the hand assembly;

moving the gas turbine combustor component held by the hand assembly by the inserting and drawing means in a direction parallel to a central axis of the combustor; and supporting the gas turbine combustor component moved in the axial direction thereof to a casing constituting an outer housing of the gas turbine.

The gas turbine combustor component holding step includes moving a balancing means, i.e. counter weight, in an axial direction of the hand assembly to thereby balance a gavity center supported by a holding weight of the hand assembly.

The natures and further features of the present invention will be made more clear from the following descriptions made with reference to the accompanying drawings.

DESCRIPTION OF THE PREFERRED EMBODIMENTS

Embodiments of the present invention will now be described in detail with reference to the accompanying drawings. For the components constituting a gas turbine, FIG. 52 and FIG. 53 will be referred to as they are.

First Embodiment (FIG. 1 through FIG. 7)

Figure 1:
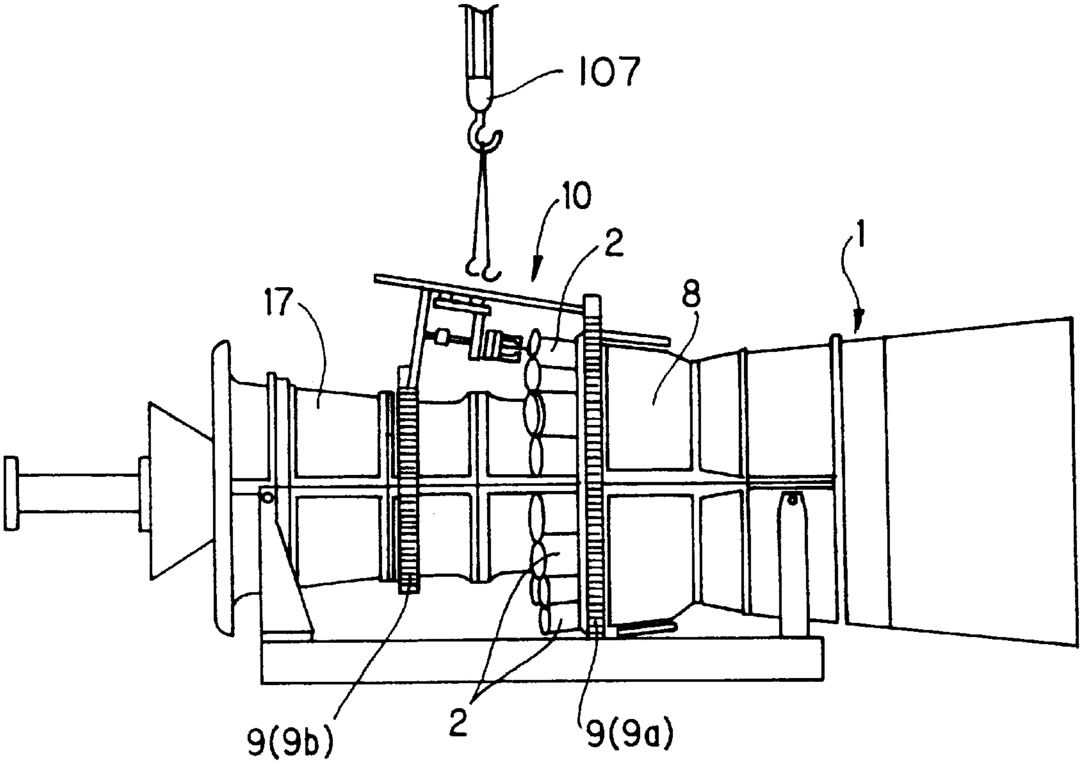
FIG. 1 is a side view illustrative of a gas turbine combustor disassembling and assembling apparatus according to a first embodiment of the present invention, wherein the apparatus is attached to a gas turbine.

FIG. 1 is an outside drawing illustrative of the entire configuration of a disassembling and assembling apparatus 10. In FIG. 1, a pair of annular rails 9 (9*a* and 9*b*) which are concentric with the gas turbine axial center are provided around the gas turbine 1 with a gap provided therebetween in the axial direction. The annular rail 9*a* located nearer the gas turbine main body casing 8 has a larger diameter than the annular rail 9*b* located nearer a compressor 17. The disassembling and assembling apparatus 10 is placed on these annular rails 9*a* and 9*b* by using the overhead crane 26. In order to enhance the stability of the disassembling and assembling apparatus 10, there is no limitation in increasing the number of the annular rail 9 to three or more.

Further, in place of the annular rails 9, a combination of a rack and a pinion may be used for moving around the outer periphery of the gas turbine casing, or a combination of a chain and a sprocket may be used or the disassembling and assembling apparatus main body may be composed of wheels made of magnet and the aforementioned components may be combined, respectively.

Figure 2:
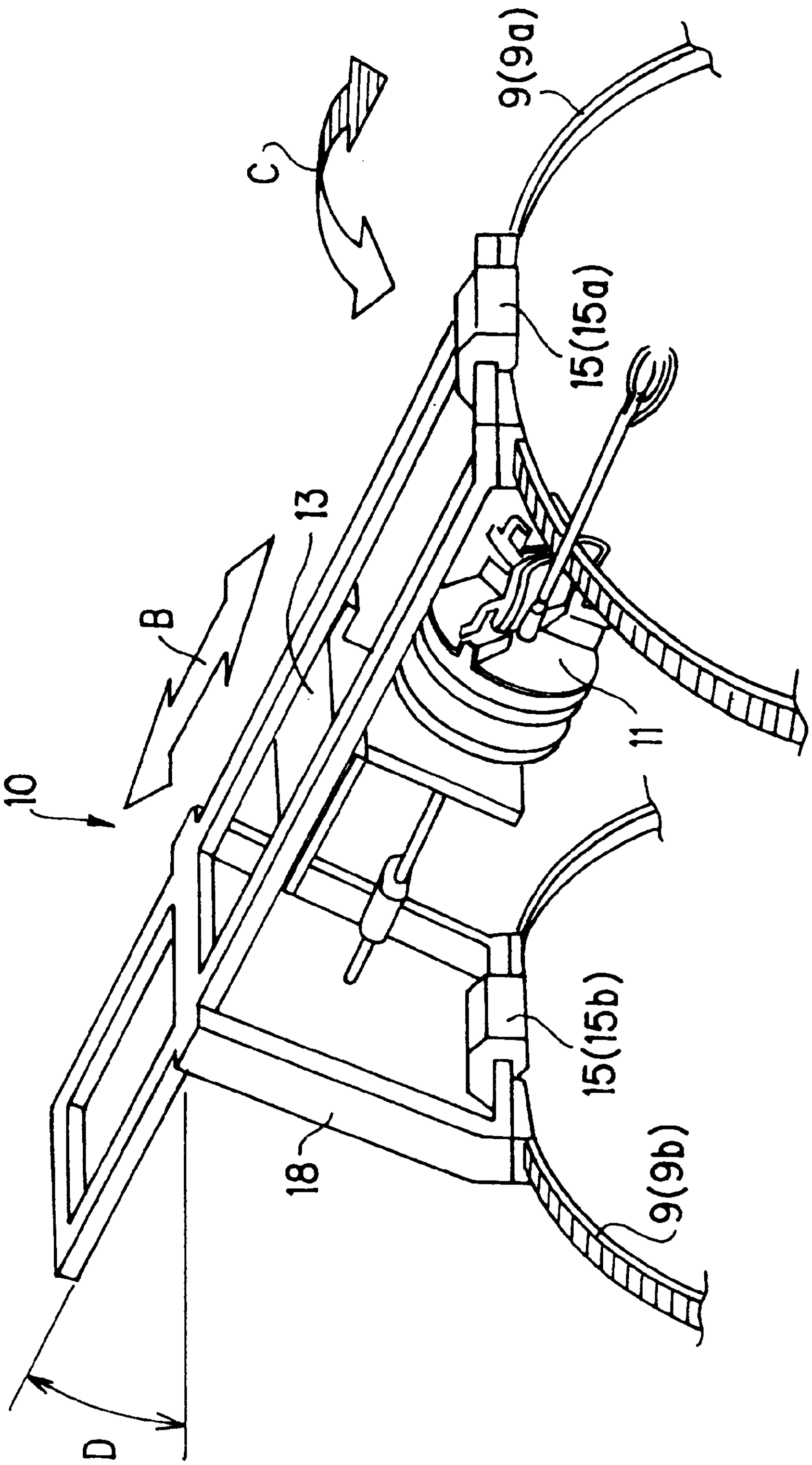
FIG. 2 is a perspective view illustrative of an essential section of the gas turbine combustor disassembling and assembling apparatus shown in FIG. 1.

FIG. 2 is a diagram showing the basic configuration of the disassembling and assembling apparatus 10 shown in FIG. 1.

As shown in FIG. 2, the disassembling and assembling apparatus 10 is basically constructed of a hand assembly 11 which holds a component of the combustor 2, an inserting and drawing section 13 which is supported by a frame 18 and which moves the hand assembly 11 back and forth in a direction B which is parallel to the central axis of the combustor 2, and a pair of circumferential traveling sections 15*a* and 15*b* which travel in a circumferential direction C of the gas turbine on the respective annular rails 9*a* and 9*b* while supporting both ends of the frame 18. A mounting angle D of the inserting and drawing section 13 is set through the frame 18 so that it is identical to a mounting tilt angle A of the combustor 2 shown in FIG. 52.

Figure 3:
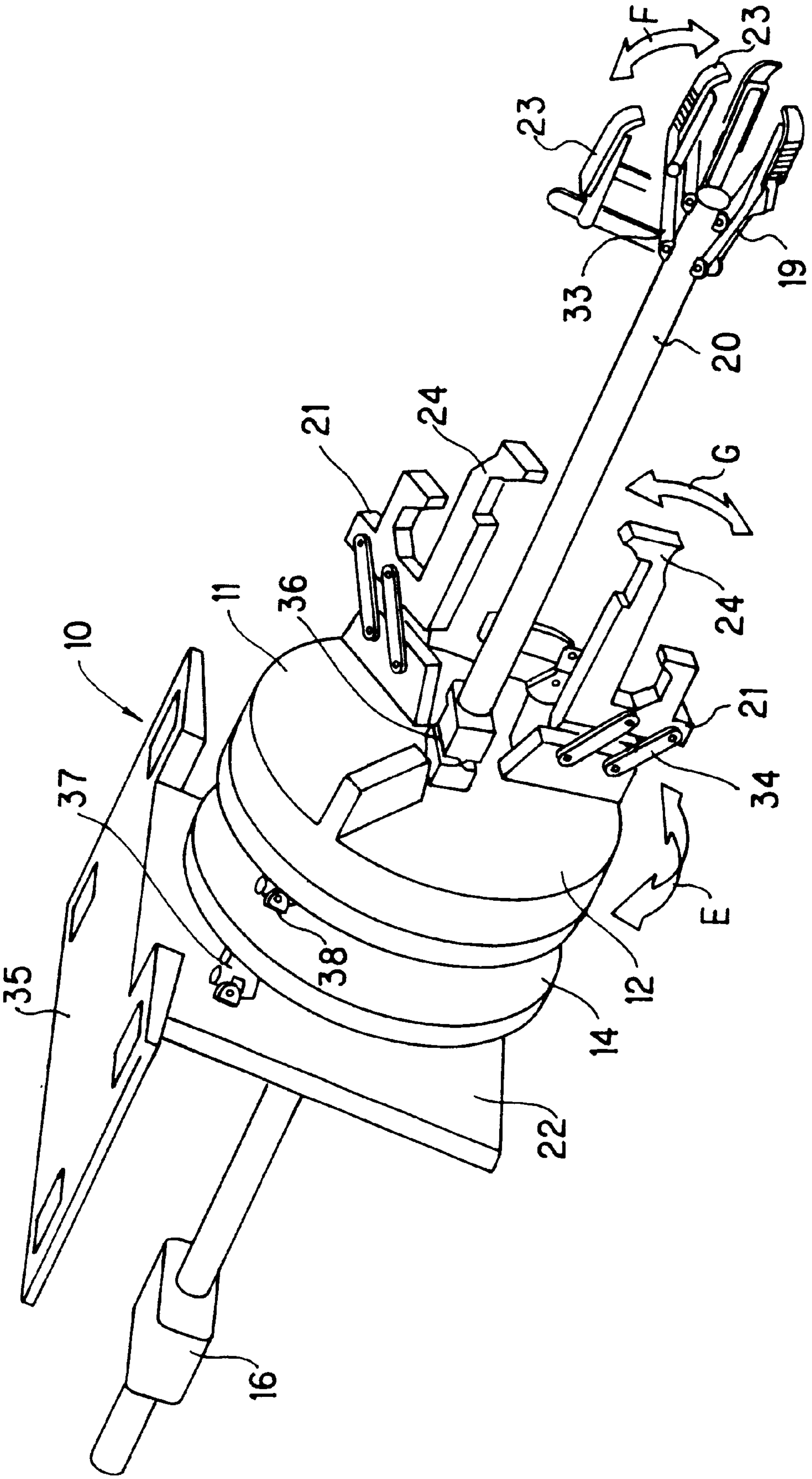
FIG. 3 is an enlarged perspective view illustrative of a hand assembly shown in FIG. 2.

FIG. 3 shows the details of the hand assembly 11 which is a constituent component of the disassembling and assembling apparatus 10 shown in FIG. 2.

As illustrated in FIG. 3, the hand assembly 11 is supported by a base 22 and is constructed so as to be rotated in the circumferential direction (in a direction E in the drawing) around the central axis of the combustor by a rotating device, not shown. Further, a rod 20 juts out forward at the central position of the hand assembly 11, and the rod can be moved for fine adjustment in the axial direction by a parallel fine adjustment member 14 which is connected to the base 22 in two horizontal positions via a hinge 37. Connected to the parallel fine adjustment member 14 is an inserting and drawing angle fine adjustment member 12 via a hinge 38, and the inserting and drawing angle fine adjustment member 12 enables the fine adjustment of the angle of the rod 20.

As shown in FIG. 3, the hand assembly 11 of this embodiment is equipped with two independent holding inner and outer hands 19 and 21, respectively, and the inner hand 19 has a length sufficient to insert itself into the gas turbine casing and it is a relatively small hand which is mounted on the distal end of the rod 20 which can be bent through a hinge 36. The outer hands 21 have a more robust structure than that of the inner hand 19, and they are installed more closely than the inner hand 19 in the axial direction to the base 22 of the hand assembly 11 having a connecting section 35 to be connected to the inserting and drawing section 13. In FIG. 3, the holding hands, namely, the inner hand 19 and the outer hands 21, are so illustrated that they are opened and closed in a direction F and a direction G by pantograph structures 33 and 34 and that they are three-hook type structure having hooks 23 and 24 on the distal ends thereof. However, they are not limited thereto, and they may have four or more hooks.

A counterweight 16 is provided in a position opposite from the mounting positions of the inner hand 19 and the outer hands 21 of the rod 20 and is designed to be moved manually or automatically in the axial direction according to a holding weight so as to maintain balance because the supporting center of gravity changes according to the holding weight of the inner hand 19 and the outer hands 21.

The operation of the gas turbine disassembling and assembling apparatus described above will now be descried with reference to FIG. 4 and FIG. 5.

Figure 4:
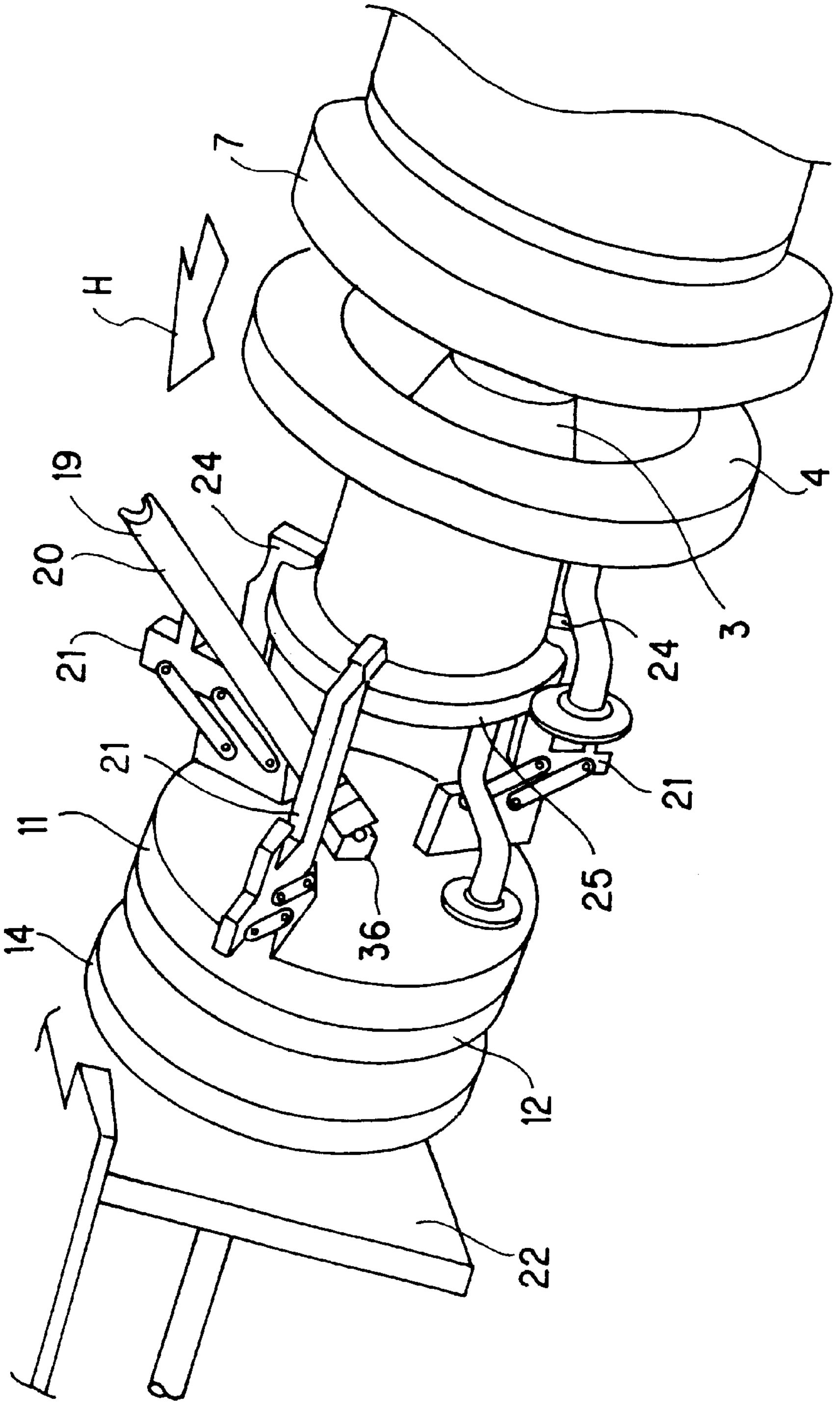
FIG. 4 is a perspective view illustrative of an outer hand assembly shown in FIG. 3 which is in use.

FIG. 4 shows a state wherein the hand assembly 11 of the disassembling and assembling apparatus 10 of this embodiment is holding the fuel nozzle 3 and the head plate 4, which are still not assembled, and taking them out of the combustor casing 7.

In FIG. 4, the outer hands 21 are holding the mounting flange 25 for installing the fuel nozzle 3 from outside by the hooks 24. Bolts, not shown, fastening the head plate 4 to the combustor casing 7 are removed while the outer hands 21 are holding the mounting flange 25. The inner hand 19 is bent at the root of the rod 20 so that it does not interfere with the object held by the outer hands 21.

In this state, the fuel nozzle 3 and the head plate 4 are pulled out in a direction (indicated by an arrow H in FIG. 4) which is parallel to the central axis of the combustor and the disassembling and assembling apparatus 10 is moved in the circumferential direction C of the gas turbine as indicated in FIG. 2 so as to be moved to the highest position of the gas turbine 1 as illustrated in FIG. 1, then the components are suspended by using an overhead crane 107 or the like.

As an alternative, the disassembled components are moved to the lowest position of the gas turbine 1, then put on an exclusive truck, not shown, to carry them out. The components are reassembled by reversing the above procedure.

The disassembling and assembling apparatus 10 can be moved in the circumferential direction C of the gas turbine and also maintained in the same attitude at all times in relation to the mounting tilt angle A of the combustor 2. Therefore, exactly the same series of disassembling and assembling work described above can be applied to any combustors 2 regardless of the installed positions thereof.

The outer hands 21 hold relatively heavy components which are located outside the gas turbine main body casing 8, while the inner hand 19 is used to hold the transition piece 6 which is located inside the gas turbine main body casing 8 and which is relatively lightweight.

FIG. 5 shows a state wherein the inner hand 19 is opened to hold the transition piece 6 by the hook 23 so as to draw it out of the gas turbine main body casing 8 as observed from inside the casing 8.

Figures 5A, 5B, 5C:
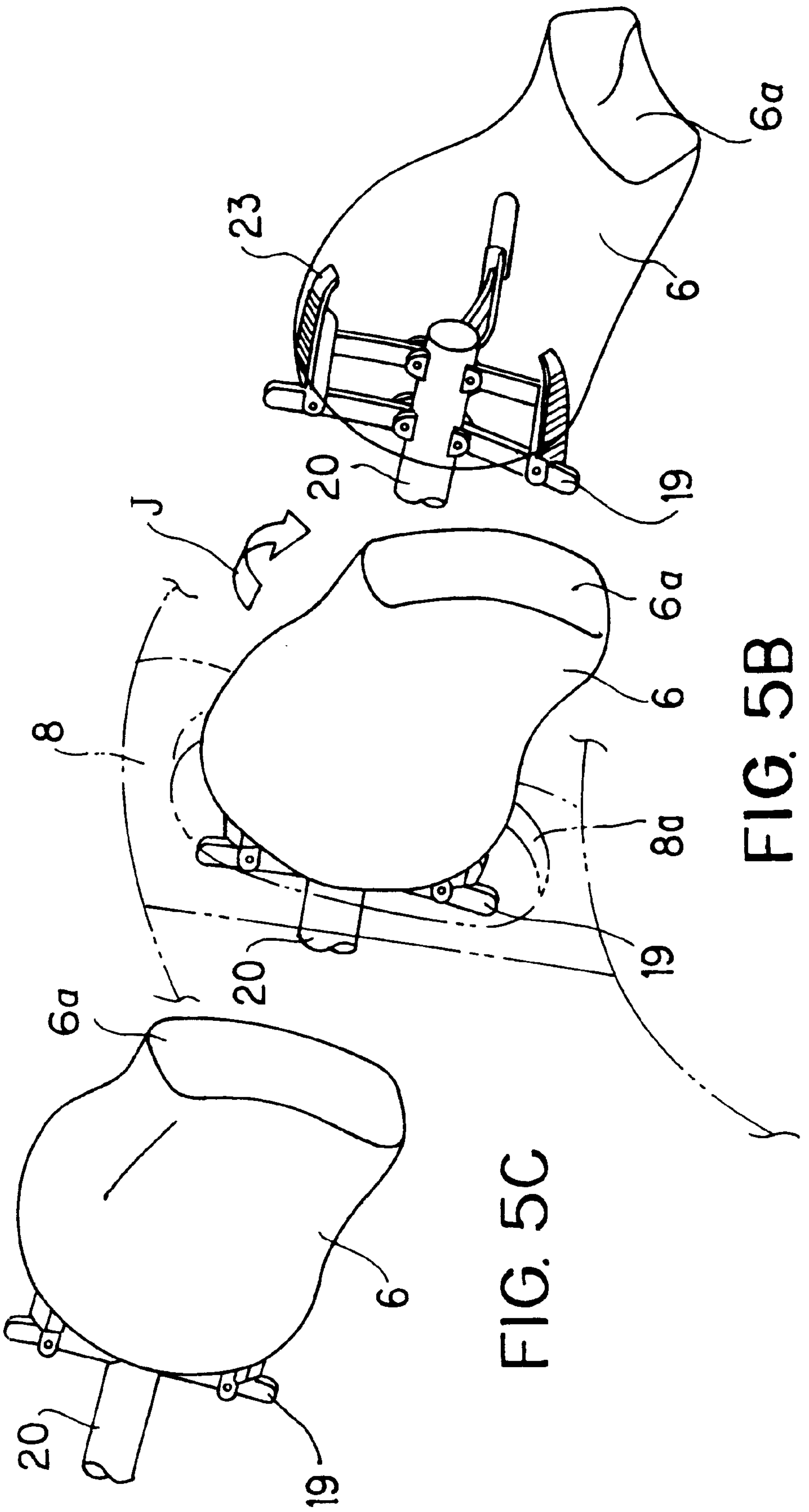
FIGS. 5A, 5B, and 5C are perspective views illustrative of an inner hand shown in FIG. 3 which is in use.

FIG. 5A shows a state wherein the inner hand 19 has been set in the transition piece 6. An outlet 6*a* of the transition piece 6 is made wide in a width direction. Therefore, an attempt to pulling it out as it fails because of a vertically long outlet 8*a* provided on the casing 8. For this reason, as illustrated in FIG. 5B, the rod 20 with the inner hand 19 is turned in a direction J around the central axis of the combustor to clear the outlet 8*a* and, then, the transition piece is pulled out of the casing 8 as shown in FIG. 5C. This operation is accomplished by rotating the rod 20 and the hand assembly 11 as shown in FIG. 3.

The inner hand 19 for holding the transition piece 6 (having approximately 100 kg) which is lighter than the combustor casing 7, etc. is made lightweight and independent from the outer hands 21. This makes it possible to minimize the moment applied to the root of the rod 20 even when the inner hand 19 is attached to the distal end of the long rod 20 to enable it to be inserted into the casing 8. The outer hands 21 are made to have a stronger structure than the inner hand 19 to hold a heavy component (having approximately 500 kg). However, the hands need not be inserted deeply in the casing 8 and are not far apart from the base 22 of the hand assembly 11, thus permitting a minimized moment of the supporting section applied to the base 22 of the hand assembly 11.

Although it is not illustrated, to remove the combustor liner 5, the end of the combustor liner 5 closer to the combustor nozzle 3 is held by the outer hands 21 and the end thereof closer to an inner cylinder 32 is held by the inner hand 19, thus enabling the combustor liner 5 to be taken out of the casing 8. The combustor casing 7 and the gas turbine main body casing 8 can be removed by holding them by the outer hands 21.

In the disassembling and assembling apparatus 10 of this embodiment which is configured as described above, the components are securely held by the inner and outer hands 19 and 21, respectively, considerably reducing the chance of dangers such as dropping a suspended component or a worker being caught. Moreover, the disassembling and assembling work can be done in the same working procedure on any combustors 2 mounted on the periphery of the gas turbine. Markedly greater ease of work can be achieved especially on the lower half which used to be difficult to work on. Furthermore, the entire procedure including the pulling out and transferring of the components of the combustor 2 is carried out by the disassembling and assembling apparatus 10, eliminating the need for the conventional hard work which required that workers support the components by hand. The transition piece 6 can be turned to change the orientation thereof by rotating the hand assembly 11 around the central axis of the combustor 2, permitting easy insertion and removal of the transition piece 6. Furthermore, the two independent inner and outer hands 19 and 21 for holding are provided for efficient use, i.e. for holding the transition piece 6 and for holding other heavier components. This makes it possible to reduce the moment applied to the hand supporting section and to make the disassembling and assembling apparatus 10 compact.

Figure 6:
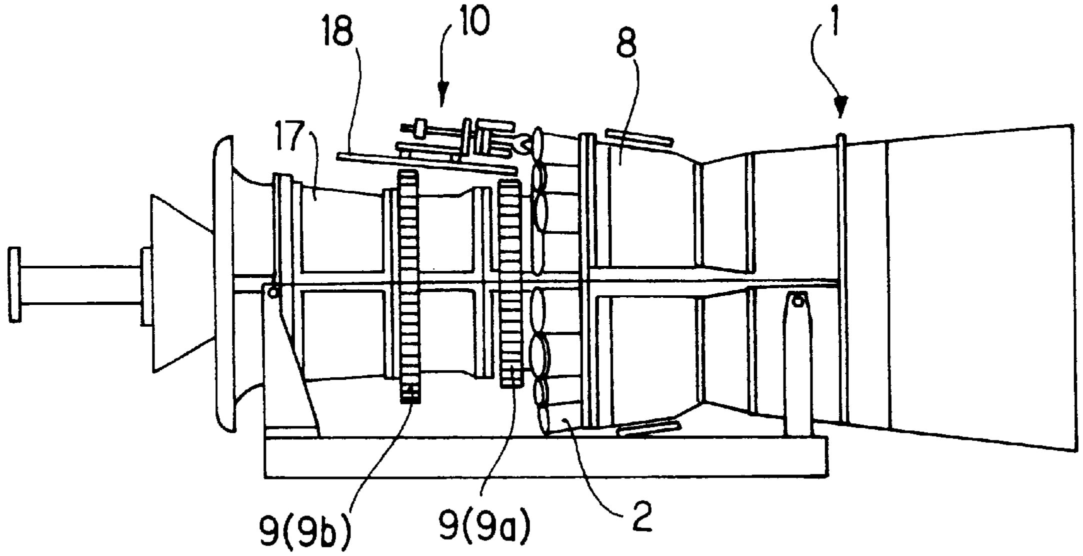
FIG. 6 is a side view illustrative of an example of a modification of the gas turbine combustor disassembling and assembling apparatus according to the aforementioned embodiment.
Figure 7:
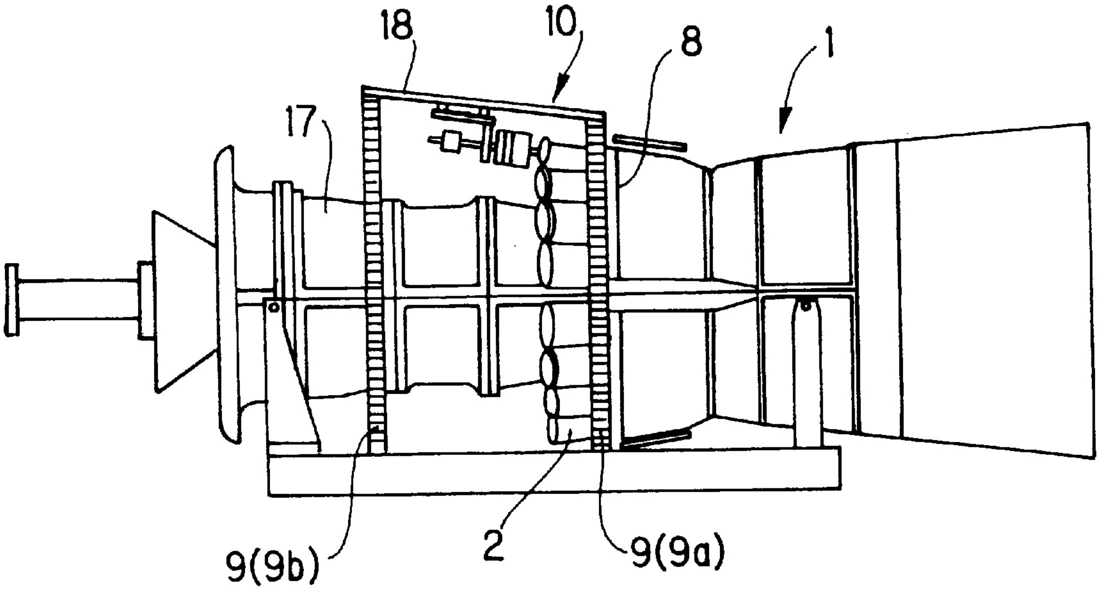
FIG. 7 is a side view illustrative of an example of another modification of the gas turbine combustor disassembling and assembling apparatus according to the described embodiment.

FIG. 6 and FIG. 7 illustrate the annular rails 9 and examples of modified support structures therefor of the disassembling and assembling apparatus 10.

In the example shown in FIG. 6, the disassembling and assembling apparatus 10 is installed around the outer periphery of the two annular rails 9*a* and 9*b* and, in the example shown in FIG. 7, the disassembling and assembling apparatus 10 is installed around the inner periphery of the two annular rails 9*a* and 9*b*. In these examples shown in FIG. 6 and FIG. 7, the outside diameter of the annular rail 9*a* nearer the gas turbine main body casing 8 is made smaller than the outside diameter of the annular rail 9*b* nearer the compressor 17, so that the difference between the two outside diameters enables the angle D for inserting and pulling out the disassembling and assembling apparatus 10 (see FIG. 2) to be set to the same angle as that of the central axis of the combustor 2 and also enables the disassembling and assembling apparatus 10 to be directly supported by the annular rails 9*a* and 9*b* with no excess leg portion of the frame 18 left. It is apparent, therefore, that the same operation and advantage as those of the embodiment described above can be obtained and, furthermore, since the disassembling and assembling apparatus 10 is directly installed on the annular rails 9*a* and 9*b*, further secure support can be achieved with resultant higher resistance to earthquakes.

Second Embodiment (FIG. 8 through FIG. 18)

Figure 8:
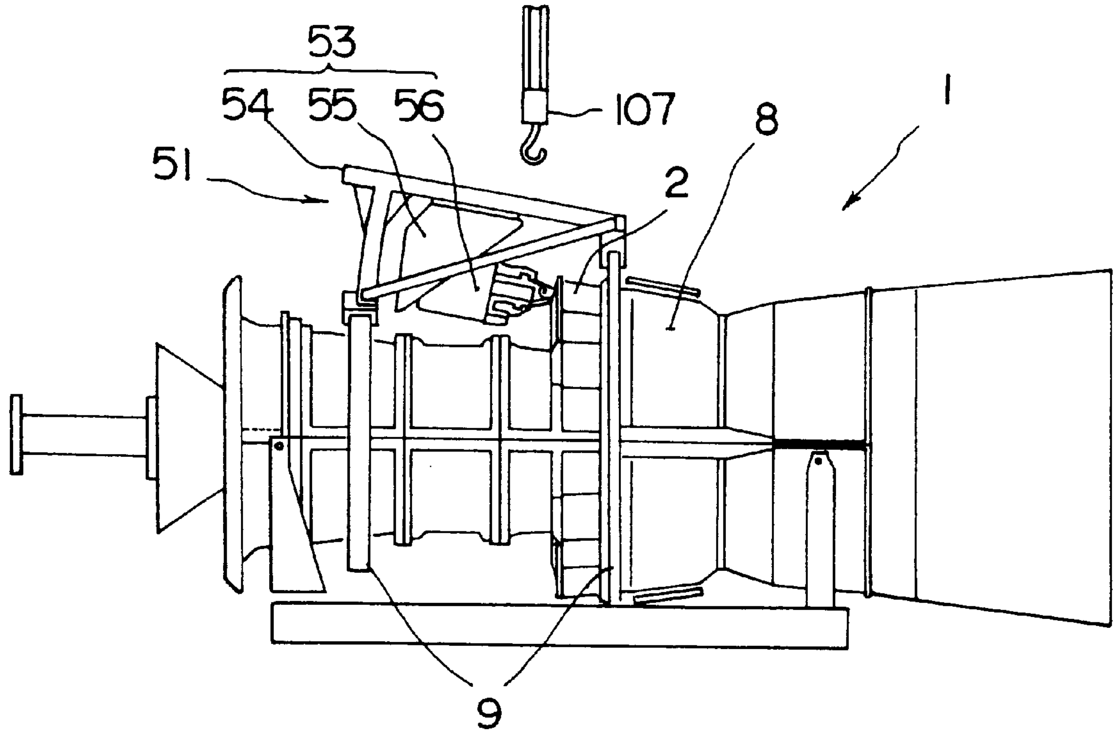
FIG. 8 is a side view illustrative of a basic configuration of a gas turbine combustor disassembling and assembling apparatus according to a second embodiment of the present invention.

FIG. 8 shows a basic configuration of an apparatus for disassembling and assembling a gas turbine combustor according to a second embodiment of the present invention.

In this embodiment, a disassembling and assembling apparatus 51 is constituted by the annular rails 9, a section 53 which travels on these annular rails 9 (this section will be referred to as a robot main body in this embodiment), and a robot controller which is not shown. As in the case of the annular rails 9 of the first embodiment, in the second embodiment, at least two annular rails 9 are disposed concentrically with the axial center of the gas turbine 1 with an interval provided therebetween in the axial direction, and the robot main body 53 is mounted on the annular rails 9.

The robot main body 53 is supported by a frame 54 (almost the same as the frame 18 of the first embodiment) and is equipped with a hand mounting section 55 (which corresponds to the base 22 of the first embodiment) and a hand assembly 56. The frame 54 travels on the annular rails 9 in the circumferential direction of the gas turbine, the hand mounting section 55 travels on the frame 54 in the direction of inserting and pulling out a combustor component, and the hand assembly 56 is attached to the hand mounting section 55 to hold the combustor component.

In such a configuration, normally, the gas turbine 1 is operated with the annular rails 9 attached. At the time of overhaul, the robot main body 53 is attached to the annular rails 9 and the robot main body 53 is moved along the annular rails 9 in the circumferential direction of the gas turbine to bring the hand assembly 56 installed on the hand mounting section 55 close to a combustor component.

In this embodiment, the hand assembly 56 which has the same tilt angle as the mounting tilt angle of the combustor component is adapted to hold the combustor component. In order to remove the combustor component, a nut or the like fastening the component is manually removed by hand or a nut runner and, then, the combustor component is pulled out by the robot main body 53.

The robot main body 53 moves to the top or bottom of the annular rails 9 to hook the combustor component onto the overhead crane 107 or to load it onto a carrying truck. This work is repeated to disassemble the combustors 2 of the gas turbine 1. After completion of the overhaul of the combustors 2, the combustors 2 of the gas turbine 1 are reassembled by reversing the removing procedure to insert and fasten the combustor components.

Figure 9:
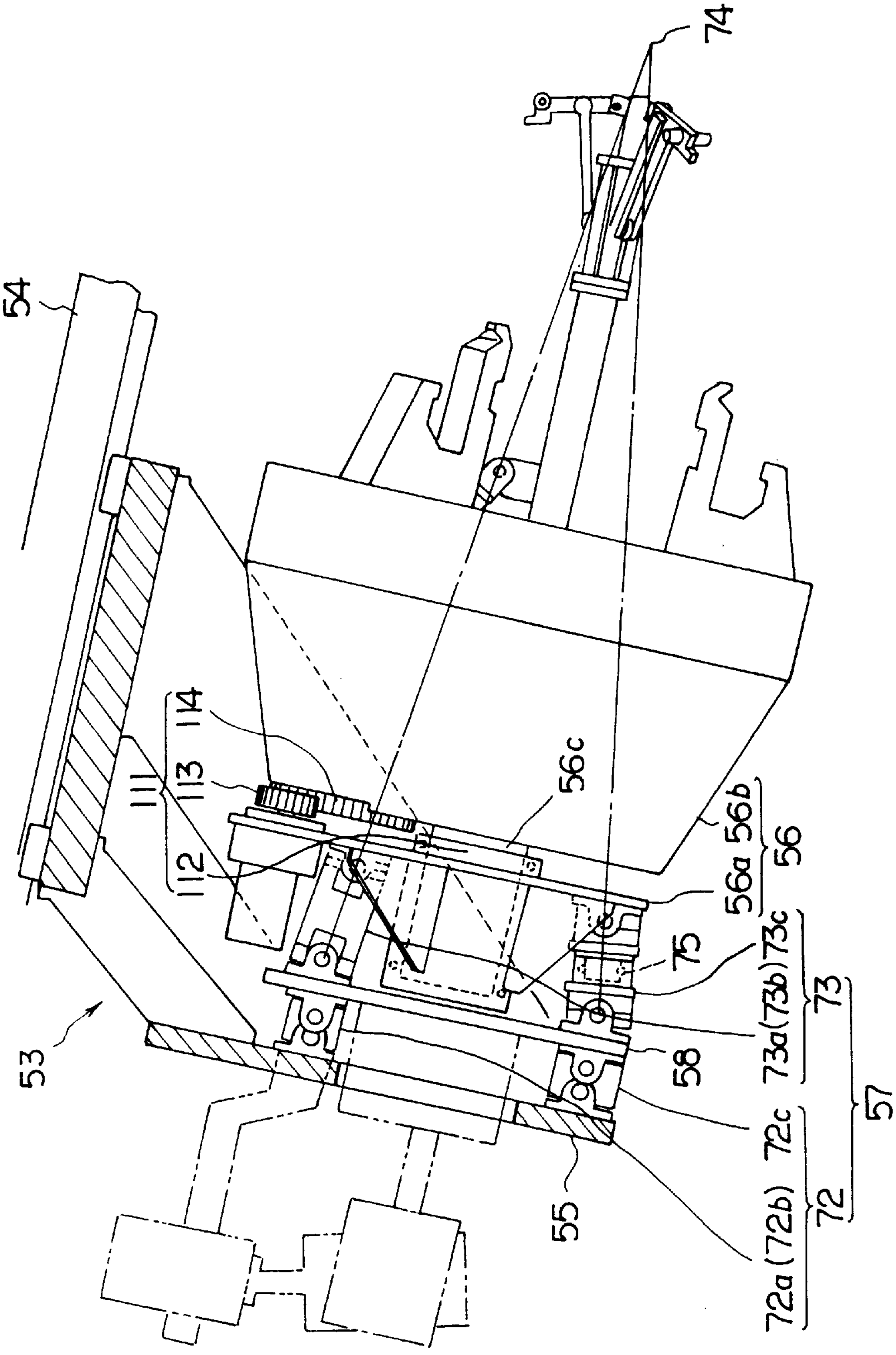
FIG. 9 is a view illustrative of a section of a link mechanism of a robot main body shown in FIG. 8, which is observed from the front side.

FIG. 9 shows the details of the hand mounting section 55 and the hand assembly 56.

In FIG. 9, the hand assembly 56 of the disassembling and assembling apparatus 51 is installed with approximately the same tilt angle as the mounting tilt angle of the combustor 2 with respect to the gas turbine 1 as in the first embodiment. The hand mounting section 55 and the hand assembly 56 are connected so that they are made universal (enabled to rock in two independent directions) by at least three sets of link mechanisms 57 which are provided in the circumferential direction with intervals therebetween.

More specifically, an intermediate mounting section 58 is provided between the hand mounting section 55 and the hand assembly 56 and a plurality of the link mechanisms 57 are connected in series via the intermediate mounting section 58 to render the universal state. The link mechanisms 57 is designed to allow an error in the holding position of the hand assembly 56 and the mounting position of a combustor component between the hand mounting section 55 and the hand assembly 56 to permit easy removing and inserting work when drawing out or inserting the combustor component, which will be described in more detail later.

In FIG. 9, connecting the plurality of link mechanisms 57 via the intermediate mounting section 58 enables various functions to be combined as it will be discussed later.

To be more specific, the link mechanism 57 is composed of two types of link mechanism sections 72 and 73. The first link mechanism section 72 has a parallel linking structure which has three parallel links 72*a,* 72*b,* and 72*c* for connecting the hand mounting section 55 with the intermediate mounting section 58.

The second link mechanism section 73 has three links, 73*a,* 73*b,* and 73*c* for connecting the intermediate mounting section 58 with the hand assembly 56. These links 73*a,* 73*b,* and 73*c* have a trapezoid linkage structure oriented to a certain point (reference point) 74 at the distal end of a combustor component to be held by the hand assembly 56. The trapezoid linkage directed toward the reference point 74 is different from the parallel linkage. When rotated, the linkage renders a dynamically redundant state and produces a twisting moment, and therefore, the link 73*c* is provided with a rotating shaft 75 to permit the twist. More specifically, the link 73*c* is split into two pieces in the direction of length thereof and the two pieces are connected by the rotating shaft 75 along the length, thereby permitting the twist through the rotating shaft 75.

Figure 10:
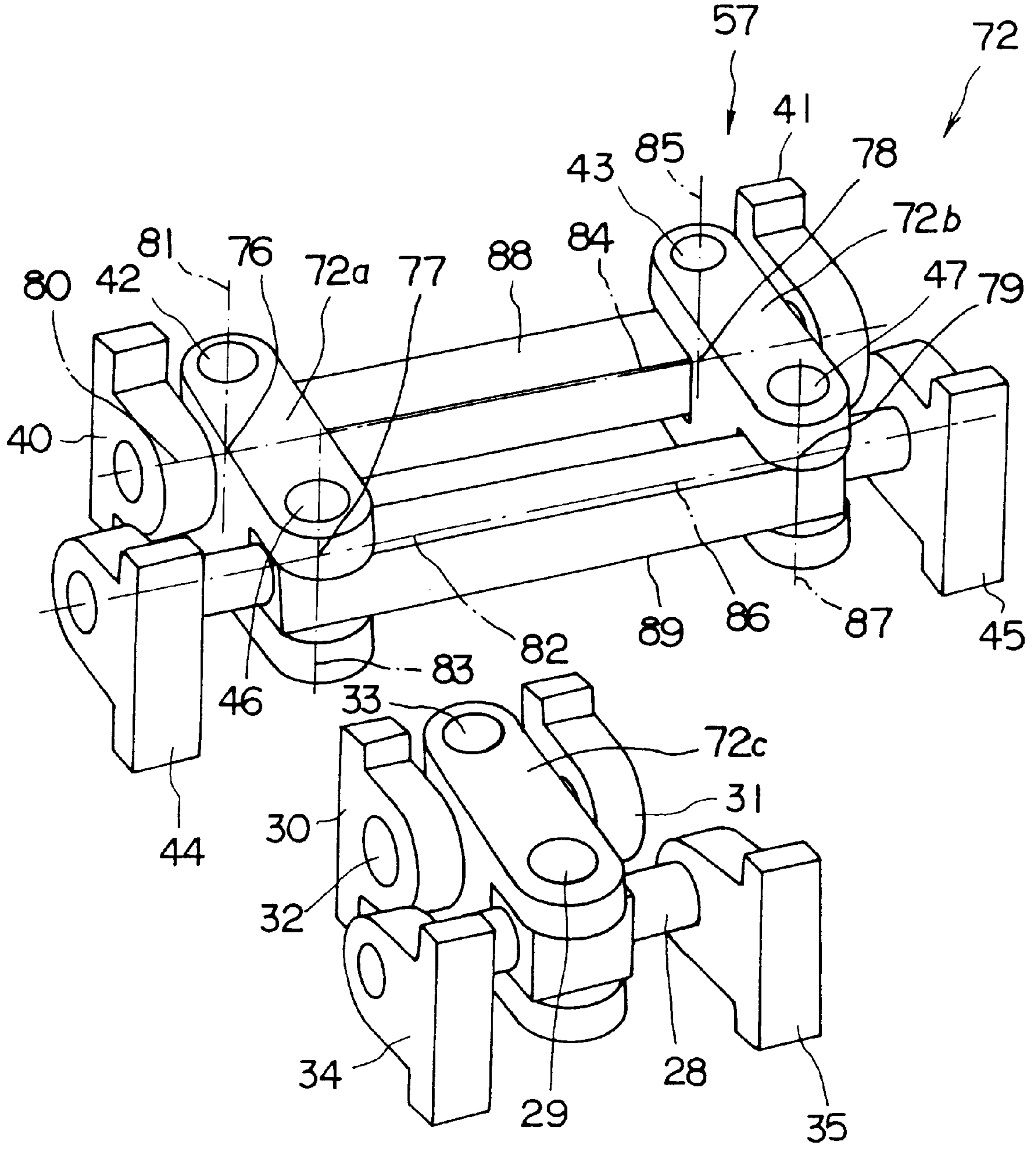
FIG. 10 is a view illustrative of a connecting shaft for enhancing the twist rigidity of the link mechanism in the second embodiment, where the connecting shaft is observed from an obliquely upper side.

FIG. 10 shows the details of the first link mechanism. In the link mechanism 72, the three links 72*a,* 72*b,* and 72*c* are disposed in parallel around the hand assembly 56 with intervals provided therebetween; two (e.g. 72*a* and 72*b*) of which are connected as a pair to enhance the strength thereof. In other words, a pair of bearings 40 and 41 are coaxially provided near the hand mounting section 55 and a single shaft 88 is rotatably supported by the bearings 40 and 41. The links 72*a* and 72*b* are shaped approximately like H, and the openings on one end of each link is fitted to the shaft 88, and at the fitted section, the links 72*a* and 72*b* are rotatably connected to the shaft 88 with crossing pins 42 and 43. Likewise, a pair of bearings 44 and 45 are coaxially provided near the intermediate mounting section 58 and a single shaft 89 which is rotatably supported by the bearings 44 and 45 is fitted in the openings on the other end of each of the links 72*a* and 72*b,* which are also rotatably connected with crossing pins 46 and 47.

More specifically, a horizontal axis 80 of the link 72*a* is aligned with a horizontal axis 84 of the link 72*b,* and vertical axes 81 and 85 of the crossing pins 42 and 43 intersect with these axes, and intersection points 76 and 78 provide the fulcrums of the links 72*a* and 72*b* nearer the hand mounting section 55. The links 72*a* and 72*b* can swing vertically and horizontally with these intersection points (fulcrums) 76 and 78 as the centers thereof.

Near the central mounting section 58, horizontal axes 82 and 86 close to the distal ends of the links 72*a* and 72*b* are symmetrically aligned, and vertical axes 83 and 87 of the crossing pins 46 and 47 intersect with these axes, and these intersection points 77 and 79 provide relative fulcrums of the links 72*a* and 72*b* on the intermediate mounting section 58 side.

Thus, a parallel link is always formed among the intersection points (fulcrums) 76, 78, 77, and 79, allowing the intermediate mounting section 58 to carry out universal operation on a plane while maintaining the parallelism thereof to the hand mounting section 55.

A pair of links 72*a* and 72*b* alone is not capable of handling heavy load. Therefore, the remaining link 72*c* is added to perform three-point support as illustrated in FIG. 10. The link 72*c* is also shaped like H as the aforesaid links 72*a* and 72*b*. The link 72*c* is supported via the bearings 30 and 31, the shaft 32, and the crossing pin 33 with respect to the hand mounting section 55 side and also supported with respect to the intermediate section 58 via the bearings 34 and 35, the shaft 28, and the crossing pin 29.

The link 72*c* is provided separately. A fourth link may be provided and connected just like the links 72*a* and 72*b,* or if many links are used, all the links may be provided separately.

The configuration of the link mechanism 73 supporting the hand assembly 56 in relation to the intermediate mounting section 58 thus supported by the hand mounting section 55 is the same as that described above, except that the links 73*a,* 73*b,* and 73*c* form a trapezoid linkage rather than the parallel linkage because they are oriented toward the reference point 74. Thus, the combination of the link mechanism 72 which forms the parallel link and the link mechanism 73 which forms the trapezoid linkage causes the intermediate mounting section 58 to move in parallel to the hand mounting section 55 and the hand assembly 56 to provide pestle motion with respect to the intermediate mounting section 58 while it is directed to the reference point 74. This operation will be described later.

Figure 11:
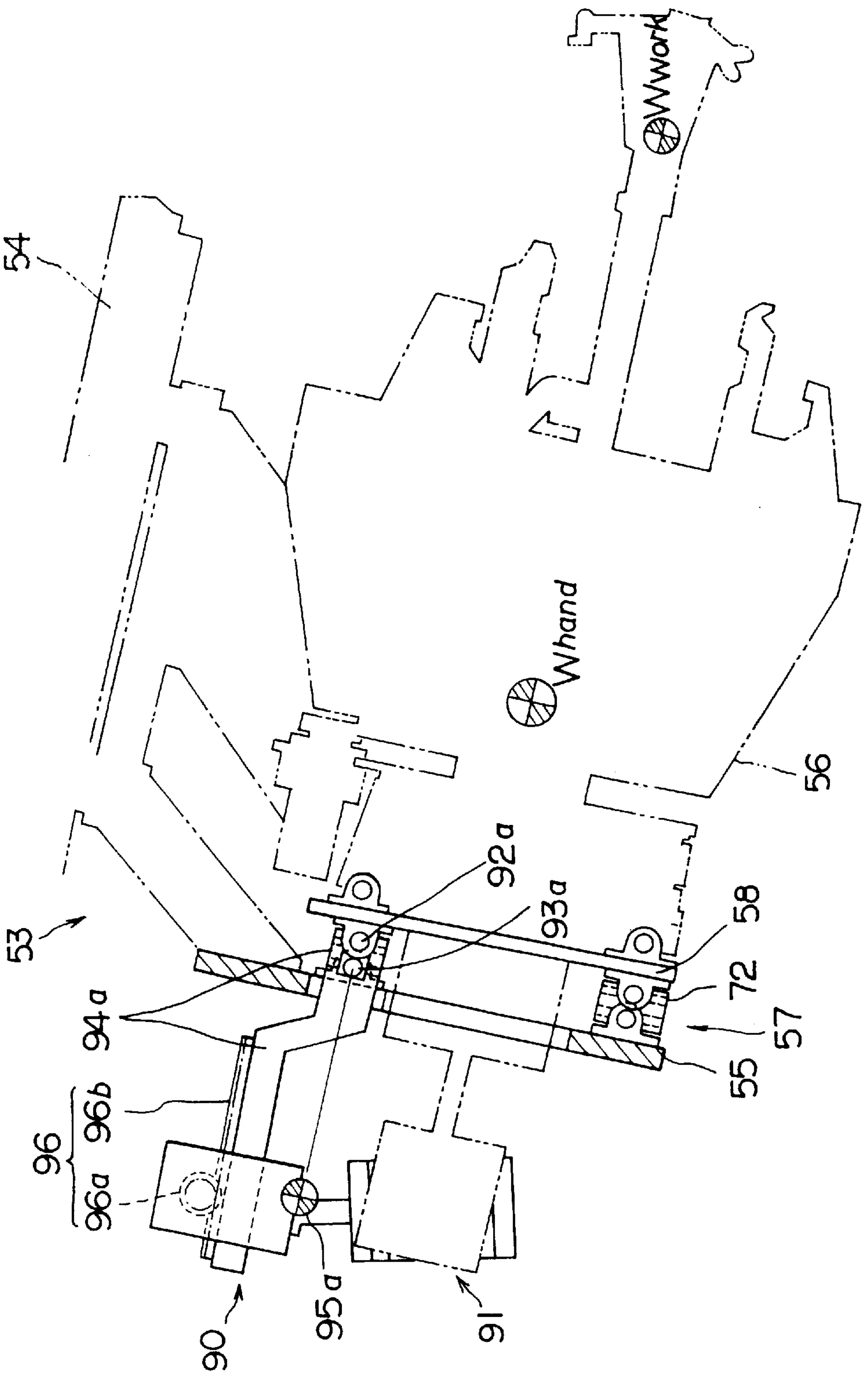
FIG. 11 is a view illustrative of a balancing mechanism of the link mechanism in the second embodiment.
Figure 12:
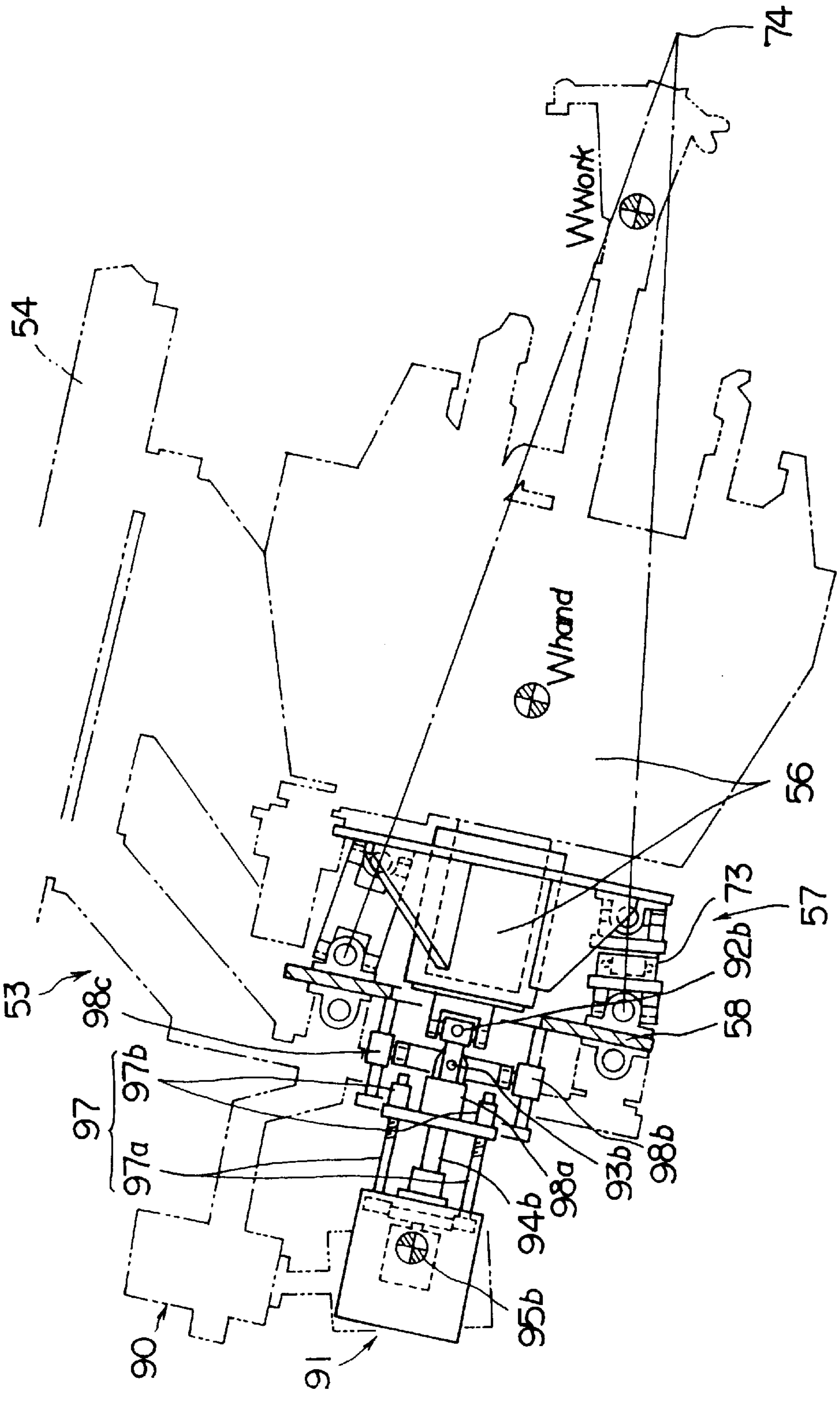
FIG. 12 is a view showing a balancing mechanism of the link mechanism in the second embodiment.
Figure 13:
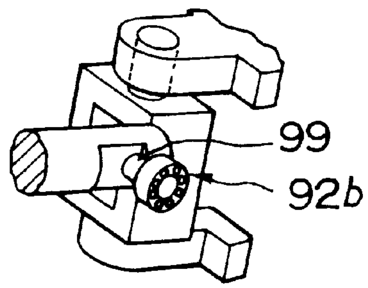
FIG. 13 is a perspective view illustrative of a part extracted from FIG. 12.

Referring now to FIG. 11 through FIG. 13, balancing mechanisms 90 and 91 attached to the link mechanism 57 will be described. Points of application 92*a* and 92*b* are provided on either the intermediate mounting section 58 closer to the hand assembly of the link mechanism sections 72 and 73 or the hand assembly 56. Fulcrums 93*a* and 93*b* are provided on the hand mounting section 55 or the intermediate mounting section 58 of the link mechanism, and counterweights 95*a* and 95*b* (points of force) which balance with the weight at the points of application 92*a* and 92*b* are provided on the opposite side from the fulcrums 93*a* and 93*b,* employing balancing links 94*a* and 94*b* as the balancing poles.

In the balancing mechanism 90 of the link mechanism 72 shown in FIG. 11, one of the links 72*a,* 72*b,* and 72*c* of the link mechanism 72 serving as the balancing poles of the three points is also used as the balancing link 94*a.* The balancing link 94*a* is supported in such a manner that it becomes universal (rocks in two independent directions) at the point of action 92*a* and the fulcrum 93*a.* A balance ratio changing mechanism 96 changes a balance ratio by changing the position of the counterweight 95*a* among the three points (the point of force, the point of action, and the fulcrum). To be specific, the balance ratio changing mechanism 96 is attached to the counterbalance 95; it is comprised of a pinion 96*a* driven by a driving source and a rack 96*b* on the balancing link 94*a*.

In the balancing mechanism 91 of the link mechanism 73 shown in FIG. 12, another balancing link 94*b* is employed as the three-point balancing pole, and the balancing link 94*b* is supported so that it becomes universal (rocks in two independent directions) at the point of action 92*b* and the fulcrum 93*b*.

In the link mechanism 73 shown in FIG. 12, a balance ratio changing mechanism 97 changes the balance ratio by changing the position of the fulcrum 93*b* among the three points (the point of force, the point of action, and the fulcrum).

To be more specific, the balance ratio changing mechanism 97 is composed of a ball screw 97*a* which is mounted on the balancing link 94*b* and which is driven by a driving source and a ball nut 97*b* installed at the fulcrums 93*b.* The fulcrum 93*b* can be moved with respect to the intermediate mounting section 58 by a linear guide 98 and it can be also moved in relation to the balancing link 94*b* by the linear guide 98.

Further, the balancing link 94*b* becomes dynamically redundant in relation to the movement of the link mechanism 73 and, therefore, as shown in FIG. 13, the point of action 92*b* is provided with an alignment (backlash) 99 serving as an error absorbing mechanism for absorbing a geometrical error in the twisting direction of the balancing link 94*b* when the link mechanism 73 moves.

As illustrated in FIG. 9, the hand assembly 56 is constructed by a hand assembly base 56*a* supported by the link mechanism 73 and a hand assembly main body 56*b* which is rotatably attached to the hand assembly base 56*a* via a shaft 56*c,* and a rotating mechanism 111 is provided on the hand assembly 56. The rotating mechanism 111 is equipped with a bearing 112 which rotatably supports, via the shaft 56*c,* the hand assembly main body 56*b* provided on the hand assembly base 56*a,* a hand rotating pinion 113 which is driven by a motor 111*a* serving as a driving source provided nearer the hand assembly base 56*a,* and a sector gear 114 which is provided on the hand assembly main body 56*b* and which meshes with the pinion 113. The rotating mechanism 111 is adapted to rotate the hand assembly main body 56*b* by a desired angle.

Figure 14:
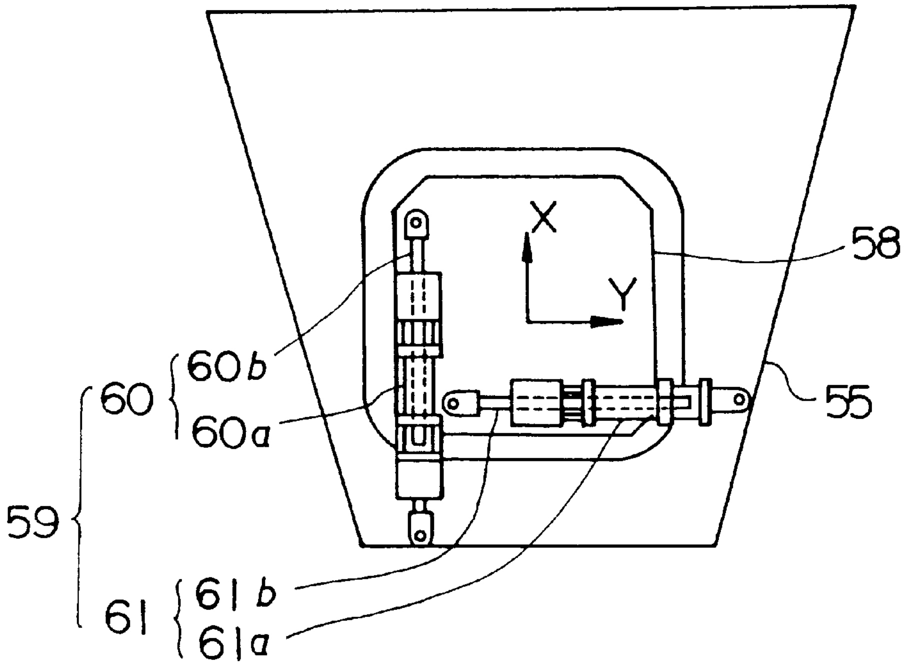
FIG. 14 is a top plan view illustrative of a restoring mechanism of the link mechanism in the second embodiment.
Figure 15:
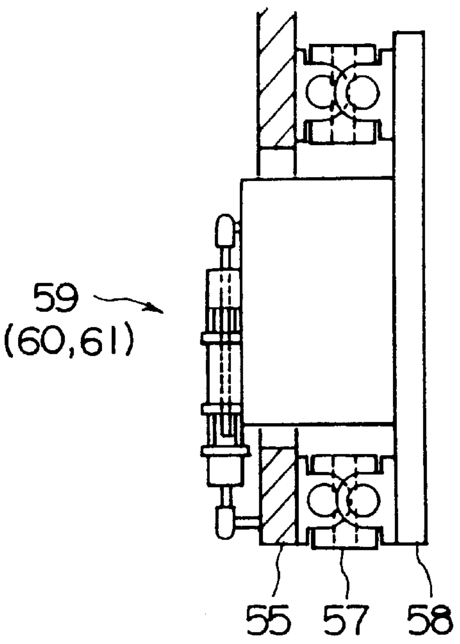
FIG. 15 is a side view of FIG. 14.

A restoring mechanism 59 will now be described in conjunction with FIG. 14 through FIG. 16. This restoring mechanism 59 is designed to provide the hand assembly 56 with a restoring force to regain a particular attitude (rock angle) under the universal support by the link mechanism 57. The restoring mechanism 59 is equipped with two-axis restoring mechanisms 60 and 61 so as to provide a plane restoring force by two axes X and Y. The restoring mechanisms 60 and 61 respectively have housings 60*a,* 61*a* and shafts 60*b* and 61*b* and this pair of restoring mechanisms 60 and 61 are rotatably installed between the hand mounting section 55 and intermediate mounting section 58 and between the intermediate mounting section 58 and the hand assembly 56 to connect these sections (FIG. 14 is a front view illustrative of the pair of restoring mechanisms 60 and 61 connecting the hand mounting section 55 and the intermediate mounting section 58, and FIG. 15 is a side sectional view illustrative of one of them).

Figure 16:
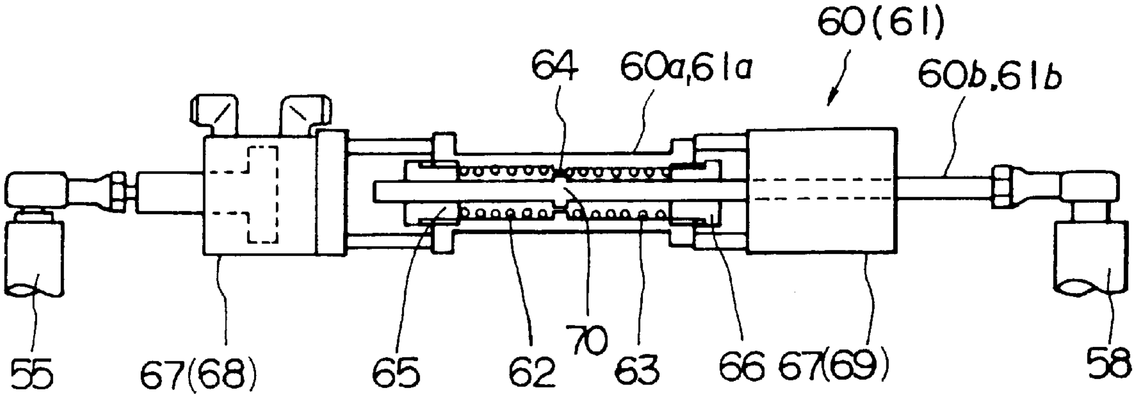
FIG. 16 is an enlarged view illustrative of a rocking and fixing mechanism shown in FIG. 14.

As shown in FIG. 16, in the respective restoring mechanisms 60 and 61, a positive spring 62 and a negative spring 63 composed of compression coil springs are disposed facing against each other between the housings 60*a,* 61*b* and the shafts 60*b,* 61*b*. The positive spring 62 pushes a large diameter section 70 of the shafts 60*b,* 61*b* from the housings 60*a,* 61*a* in a positive direction (rightward in FIG. 16), and the negative spring 63 pushes the large diameter section 70 of the shaft 60*b,* 61*b* from the housings 60*a,* 61*a* in a negative direction (leftward in FIG. 16). Further, a spring stretch limiting projection 64 is provided at the center of the inner surface of the housings 60*a* and 61*a,* so that the positive spring 62 and the negative spring 63 lose the pushing force thereof applied to the shafts 60*b* and 61*b* after they come in contact with the spring stretch limiting projection 64. Spring pushing force adjusting screws 65 and 66 are engaged on both ends in the housings 60*a* and 61*a*. The pushing forces of the respective springs 62 and 63 can be adjusted by changing the degree of threaded engagement of these spring pushing force adjusting screws 65, 66 with the housings 60*a,* 61*a*.

The restoring mechanisms 60 and 61 are further equipped with a rocking and fixing mechanism 67. The rocking and fixing mechanism 67 has a rocking function section 68 for rocking the link mechanism 57 to an attitude (rock angle) where it should be retained and a fixing function section 69 which applies a braking force to the link mechanism 57 in that rock position. The rocking function section 68 is an expandable device (an air cylinder, which is provided independently from the shafts 60*b,* 61*b,* on the ends of one side of the housings 60*a* and 61*a* in this case) which is attached in series to the restoring mechanisms 60 and 61, and the fixing function section 69 is a shaft brake which is attached to the ends of the other side of the housings 60*a* and 61*a* and which is capable of holding and securing the shafts 60*b* and 61*b*.

In the configuration described above, the restoring mechanism 59 provides the link mechanism 57 with a restoring force to go back to a particular (e.g. center) attitude (rock angle), thus maintaining the attitude of a combustor component held by the hand assembly 56 on the central axis. During an operation other than drawing out and insertion (e.g. during transport or before insertion), the combustor component is settled at a particular attitude in relation to the robot main body. The positive spring 62 pushes the shafts 60*b,* 61*b* in the positive direction from the housings 60*a,* 61*a,* while the negative spring 63 pushes the shafts 60*b,* 61*b* in the negative direction from the housings 60*a,* 61*a*. However, the positive spring 62 and the negative spring 63 can no longer push the shafts 60*b,* 61*b* beyond the particular position where they come in contact with the spring stretch limiting projection 64 of the housings 60*a,* 61*a*. Hence, the positive spring 62 and the negative spring 63 exhibit a characteristic shown in FIG. 18. The springs immediately generate the restoring force as soon as they move slightly from the particular position and they stay in the particular position unless a force of a particular level or more is applied to them. The particular level of force can be changed by controlling the initial deflection of the springs by turning the spring pushing force adjusting screws 65, 66.

Furthermore, as shown in FIG. 14 through FIG. 16, the rocking function section 68 of the rocking and fixing mechanism 67 rocks the link mechanism 57 until it reaches a desired attitude (rock angle) and the fixing function section 69 applies the braking force thereto. Therefore, if any obstacle is found ahead of the combustor component held by the hand assembly 56, the combustor component can be rocked to an evading attitude and fixed to hold the same still until it clears the obstacle. The particular position of the rocking function section 68 can be shifted by expanding or contracting the stretching device (the air cylinder in this case) which is attached in series to the restoring mechanism 59, and the fixing function section 69 can be secured by the shaft brakes mounted on the housings 60*a* and 61*a*.

Figure 17:
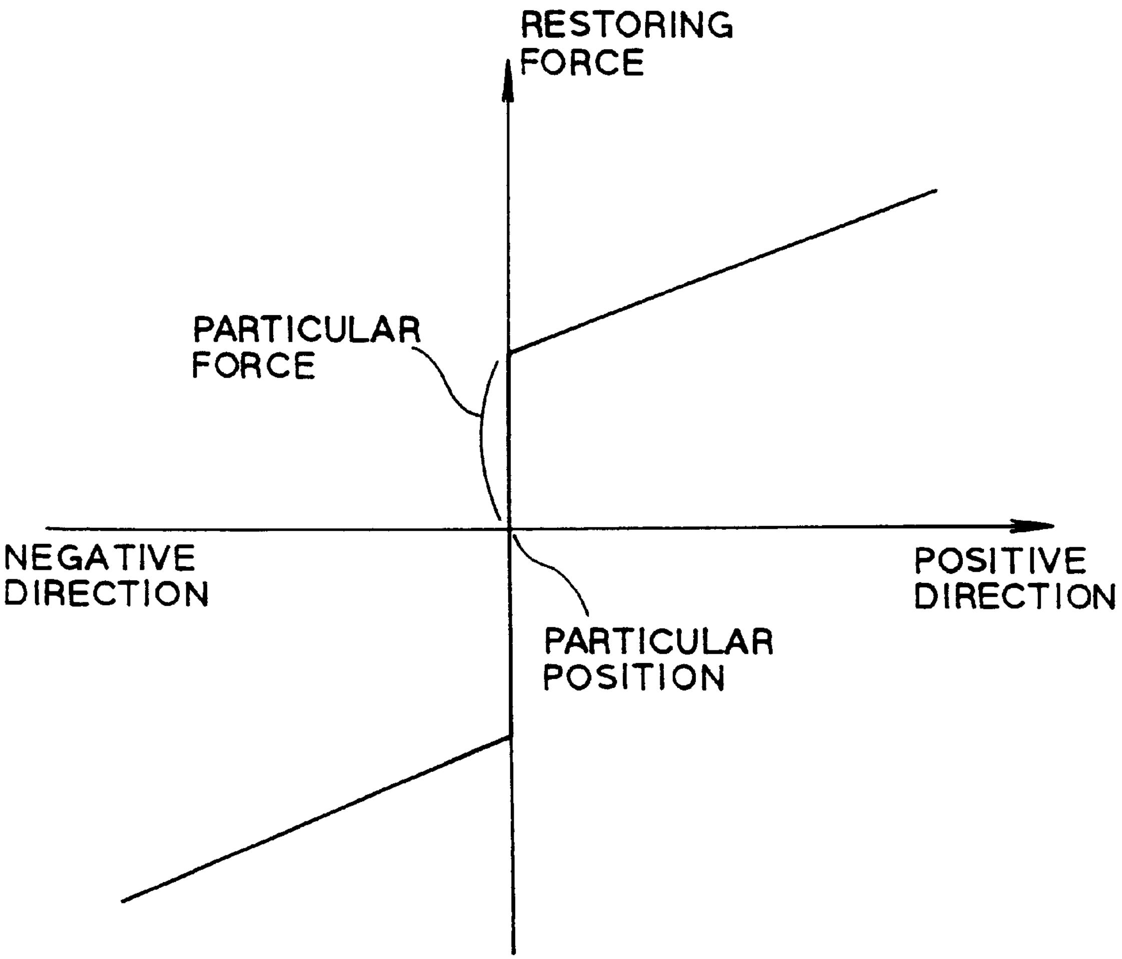
FIG. 17 is a view illustrative of a spring restoring characteristic in the link mechanism in the second embodiment.

In this embodiment, the restoring mechanism 59 makes it possible to maintain the attitude of the combustor component held by the hand assembly 56 on the central axis in relation to the robot main body 53 during transit or before insertion. As shown in FIG. 17, the spring of the restoring mechanism 59 has a characteristic that causes the spring to immediately generate a restoring force as soon as the spring moves from the particular position, while it stays in the particular position unless the particular level of force or more is applied thereto, thus permitting safe transportation free from rocking or swinging. The level of the particular force can be controlled so that it allows easy handling by changing the initial deflection of the positive and negative springs 62 and 63, respectively, by turning the spring pushing force adjusting screws 65 and 66.

If there is any obstacle ahead of the combustor component held by the hand assembly 56, the rocking and fixing mechanism 67 can be rocked until it reaches an evading attitude, then it can be fixed and locked when it should not rock while evading the obstacle or for other reason, thus enabling safe transportation.

Figure 18:
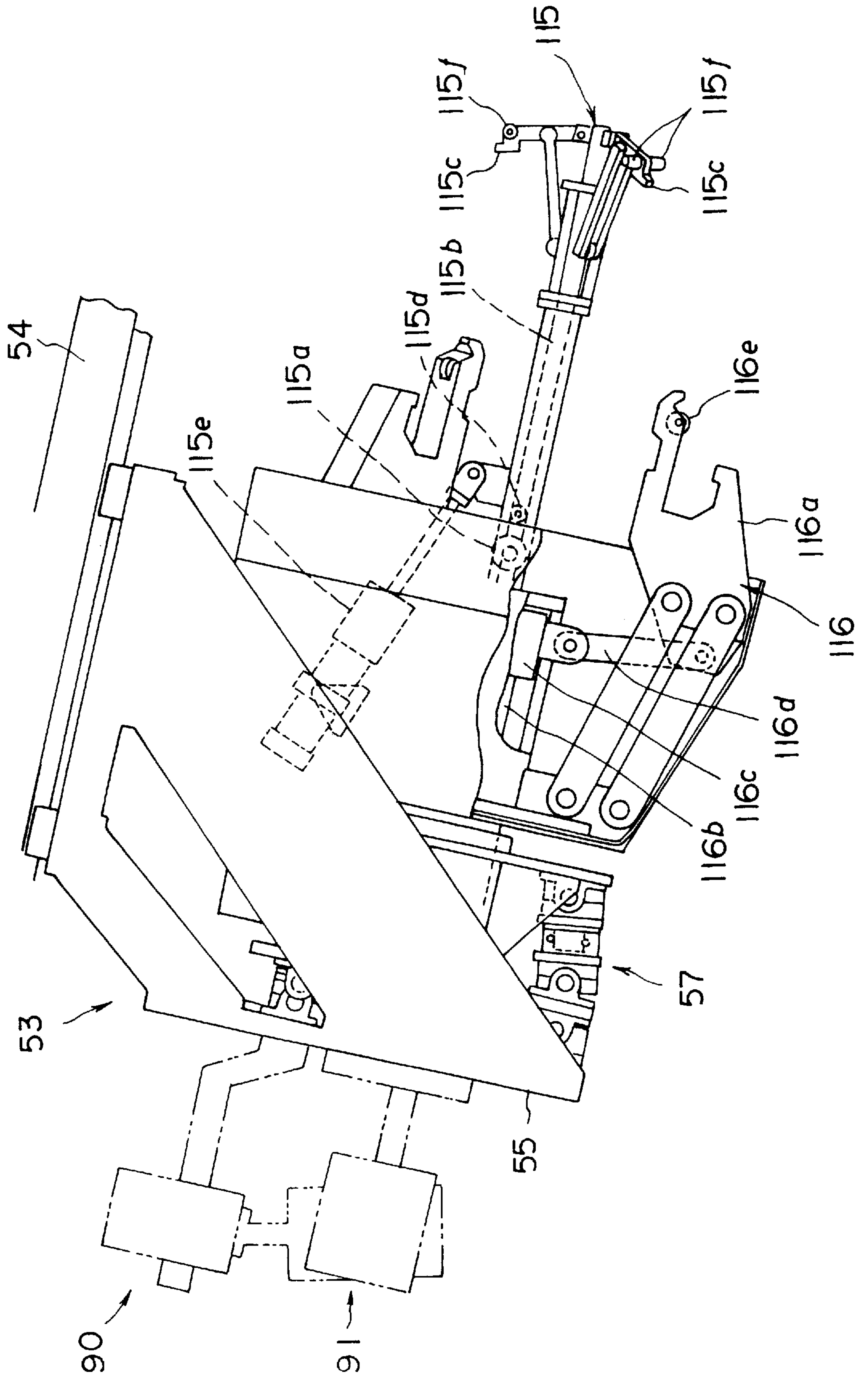
FIG. 18 is a view illustrative of a hand assembly of the second embodiment.

In the inner hand 115 shown in FIG. 18, an inner hand joint 115*a* rotates at the root of the inner hand 115; a joint fixing and driving shaft 115*b* drives a hook 115*c* of the inner hand, a driving shaft joint 115*d* of the joint fixing and driving shaft 115*b* is positioned so that it is aligned with the inner hand joint 115*a* when the driving shaft 115*b* moves to a side where the hook 115*c* is housed, and an inner hand stretching device 115*e* is equipped with a function for stretching and driving the inner hand joint 115*a*.

In the inner hand 115 shown in FIG. 18, an auxiliary roller 115*f* composed of an elastic material is rotatably attached to three hooks 115*c* of the inner hand in such a manner that the rolling surface thereof faces outward.

In the outer hand 116, in relation to the driving device of a hook 116*a* of the outer hand, an outer hand driving device 116*b* drives an output shaft 116*c* in a linear direction with respect to the hand central axis, and one end of the outer hand hook driving link 116*b* is rotatably connected to the output shaft 116*c*, while the other end thereof is rotatably connected to the hook 116*a*.

In the outer hand 116, an auxiliary roller 116*e* is rotatably attached to the distal end of the hook 116*a* of the outer hand.

When the links 72*a*, 72*b*, and 72*c* of the link mechanism 72 constituting the parallel linkage rocks, the combustor component moves in parallel while maintaining the attitude thereof, thus making it possible to absorb an error in the translating direction between the position where the hand assembly 56 holds the combustor component and the position where the combustor component is mounted on the turbine.

Furthermore, the links 73*a*, 73*b*, and 73*c* of the link mechanism 73 constituting the trapezoid linkage are always directed toward the reference point 74 at the distal end of the combustor component as observed from the hand assembly 56. Therefore, the hand assembly 56 rocks by using the reference point 74 as its momentary dynamic center. The attitude of the rocked combustor component can be changed by rocking the hand assembly 56, permitting the absorption of an error between the position where the hand assembly 56 holds the combustor component and the position where the combustor component is mounted on the turbine (pitching/rolling direction).

Specifically, the combustor component behaves as if it were pulled by an invisible string from the reference point 74. Therefore, the combustor component can be properly fitted in a predetermined position by setting the reference point 74, for example, at the distal end of an inserting section of the combustor component.

When the link mechanism 73, in which the links 73*a*, 73*b*, and 73*c* are oriented to the reference point 74, rocks, the weight of the supported combustor component causes the respective links to develop a twisting moment. In this case, one link, namely 73*c*, is provided with the rotating shaft 75 to allow the twist, so that no undue force will be applied to the link mechanism 73.

Two links, namely, the links 72*a* and 72*b*, of the link mechanism 72 serving as the parallel link, are formed as a set and the shafts 88, 89 are connected with the respective horizontal axes 80, 84, 82, and 86 thereof coaxially disposed, so that the links 72*a* and 72*b* move only in parallel. Hence, the hand assembly 56 supported by using the link mechanism 57 does not rotate with respect to the hand mounting section 55 and the combustor component held by the hand assembly 56 accordingly does not rotate with the drawing direction (rolling direction) as the axis. Therefore, the combustor component can be settled in a particular rotational position in relation to the robot main body 53 and it does not move accidentally.

The link mechanism 72 does not allow rotation (rolling direction) at an axial span thereof. However, the link mechanism 72 would be subjected to excessive forces because the universal axial span is short. The shafts 88, 89 connecting the links 72*a*, 72*b* add to the rotation (rolling direction) strength of the link mechanism 57 and enforce twist rigidity. The same operations described above are true with the link mechanism 73 although it is not illustrated.

As shown in FIG. 11, the balancing link 94*a* is supported as the balancing pole at the fulcrum 93*a*, and the weight of the counterweight 95*a* (the point of force) is balanced with the weight applied to the point of action 92*a*. As shown in FIG. 12, the balancing link 94*b* is supported as the balancing pole at the fulcrum 93*b*, and the weight of the counterweight 95*b* (the point of force) is balanced with the weight applied to the point of action 92*b*. Hence, the link mechanisms 72 and 73 are balanced by the hand assembly 56 holding the combustor component, so that the combustor component is drawn out or inserted as if it were suspended in the air.

It is apparent that the counterweights 95*a* and 95*b* can be made lighter and smaller by reducing the distances between the points of action 92*a*, 92*b* and the fulcrums 93*a*, 93*b* in the balance ratio because of the principle of lever.

In this embodiment, since the hand mounting section 55, the link mechanism 72, the intermediate mounting section 58 (including all the balancing mechanisms 90 and 91 shown in FIG. 11 and FIG. 12), the link mechanism 73, the hand assembly 56, and a combustor component are connected in series in the order in which they are listed. Therefore, the weight applied to the point of action 92*a* shown in FIG. 11 is the weight of a part of the link mechanism 72 and the total weight of those from the intermediate mounting section 58 to the combustor component. The link mechanism 73 supports a part of the weight of the hand assembly 56 and the combustor component at a virtual point of the reference point 74. Accordingly, the weight applied to the point of action 92*b* shown in FIG. 12 is the remaining weight of the hand assembly 56 and the combustor component.

The direction of the weight applied to the point of action 92*b* changes according to the direction of the center of gravity as the robot main body 53 travels on the annular rails 9 in the circumferential direction of the gas turbine. Since the connection (the fulcrum and the point of action) of the three points of the balancing mechanism is universal, the direction of the action force produced at the point of action 92*b* by the counterweight 95*b* (the point of force) can be changed according to the direction of the center of gravity which changes as the robot main body travels in the circumferential direction of the gas turbine. The balance of the balancing mechanism can be maintained even when the direction of the center of gravity changes during the travel in the circumferential direction of the gas turbine.

As illustrated in FIG. 12, the balancing ratio changing mechanism 97 changes the balance ratio of the balance of the balancing link 94*b* to change the force applied to the point of action 92*b*. Therefore, the balance is accomplished by using the weight of the hand assembly 56 excluding the combustor component (Whand) before the hand assembly 56 holds the combustor component, while it is accomplished using the total weight from the weight of the hand assembly 56 and the weight of the combustor component held thereby (Whand+Wwork) after the hand assembly 56 holds the combustor component.

To be more specific, in FIG. 11, the balance ratio changing mechanism 96 moves the counterweight (the point of force) 95*a* through the pinion 96*a* in response to the reactive force from the rack 96*b* on the balancing link 94*a*. In FIG. 15, the balance ratio changing function 97 drives the ball nut 97*b* through the ball screw 97*a* from the driving source mounted on the balancing link 94*b* and moves the fulcrum 93 which is movably supported by linear guides 98*a*, 98*b*, and 98*c*.

Since the fulcrum 93*b* can be moved through the linear guides 98*a* and 98*b*, the balancing link 94*b* geometrically follows the point of action 92*b* smoothly even when the link mechanism 73 moves, so that the mechanical error is absorbed while maintaining the balanced conditions.

As illustrated in FIG. 13, since the alignment (backlash) 99 of the error absorbing function has a function to absorb the geometrical error of the balancing link 94*b*, no undue force that causes the balancing link 94*b* to twist will be applied when the link mechanism 73 rocks.

As shown in FIG. 9, the rotating mechanism 111 is capable of rotating (rolling direction) the hand assembly 56 with the inserting and drawing direction as the rotational axis. Hence, if the phases of the hole and screw of a fastening bolt are found misaligned when fastening the combustor component or if the combustor component has to be rotated (rolling direction) because of a limited space or limitation due to the mechanical shape of the inserting section when inserting the combustor component, then the held combustor component can be rotated. The hand rotating bearing 112 rotatably supports the hand assembly main body 56*b* and drives the sector gear 114 through the hand rotating pinion 113 which is driven by the driving source so as to drive the hand assembly main body 56*b*.

If the inner hand 115 shown in FIG. 18 interferes with the operation of the outer hand 116, then the inner hand stretching device 115*e* bends the inner hand 115 through the inner hand joint 115*a*. At this time, the hand is not used and the hook 115*c* is near the housing. Therefore, the driving shaft joint 115*d* of the joint fixing and driving shaft 115*b* is in the position where it is aligned with the inner hand joint 115*a*, thus allowing the inner hand joint 115*a* to bend. When the inner hand joint 115*a* is stretched to use the hook 115*c*, the joint fixing and driving shaft 115*b* sticks the inner hand joint 115*a* like a bone, permitting the inner hand joint 115*a* to be linearly fixed.

In the inner hand 115 shown in FIG. 18, the auxiliary rollers 115*f* which are attached to the three hooks 115*c* of the inner hand and which are composed of an elastic material come in contact softly with the inner surface of a hollow combustor component (a combustor liner and a combustor casing) when supporting it from the inner side, thus enabling the combustor component to be smoothly inserted or pulled out even if the component and the hand rub each other at the time of attaching the combustor component to or detaching it from the hand.

In the outer hand 116 shown in FIG. 18, if the outer hand driving device 116*b* is an air device in association with the driving device of the hook 116*a* of the outer hand, the output end 116*c* thereof is driven by a predetermined force. The angle of an outer hand hook driving link 116*d* located between the output end 116*c* and the hook 116*a* changes according to the position where the hook 116*a* holds a combustor component, and the holding force of the hook 116*a* accordingly changes. Making use of this characteristic, the hook 116*a* is provided with a plurality of holding sections to enable the hook 116*a* to change the holding angle thereof for each combustor component, thereby making it possible to set a holding force suited for the weight of each component.

Further, in the outer hand 116 shown in FIG. 18, when moving the hook 116*a* of the outer hand to the holding section of a component, even if the component and the hand rub each other, the auxiliary roller 116*e* rolls to ensure smooth insertion or drawing out. Especially when the outer hand driving device 116*b* is an air device, the hook 116*a* cannot be accurately stopped in the middle. Therefore, the auxiliary roller 116*e* is rolled to serve as a guide and the hook 116*a* is opened or closed, thereby bringing the hook 116*a* to the holding section of the component.

The link mechanism 72 absorbs an error in the translating direction between the position where the hand assembly 56 holds the combustor component and the position where the combustor component is mounted on the turbine, thus permitting easy work even if the robot main body 53 does not present dynamically complete accuracy.

Likewise, the link mechanism 73 absorbs an error between the position where the hand assembly 56 holds the combustor component and the position where the combustor component is mounted on the turbine (pitching/rolling direction), thus permitting easy work even if the robot main body 53 does not present dynamically complete accuracy.

The rotating shaft provided on the link 73*c* which becomes redundant from the viewpoint of dynamics of mechanism accommodates the twist, and therefore, no undue force is applied to the link mechanism, thus securing a mechanical service life.

The shafts 88, 89 connecting the links 72*a*, 72*b* do not allow a held combustor component to rotate (rolling direction), so that the combustor component can be safely carried without rocking. Further, the shafts 88 and 89 enhance the rotation (rolling direction) strength of the link mechanism 57 to protect the universal rocking shaft of the link mechanism 57 from undue force, thus securing the mechanical service life.

With the balancing links 94*a* and 94*b* serving as the balancing poles, the balance is maintained while the combustor component is being held, and the combustor component is pulled out or inserted in a state where the combustor component is suspended in the air, thus enabling the combustor component to be moved easily by hand. This means easier removing and insertion.

The balance is accomplished using the weight of the hand assembly 56 excluding the combustor component (Whand) before the hand assembly 56 holds the combustor component, while it is accomplished by using the total weight from the weight of the hand assembly 56 and the weight of the combustor component held thereby (Whand+Wwork) after the hand assembly 56 holds the combustor component. Hence, the hand assembly 56 which is suspended in the air can be easily moved by hand, thereby permitting easy operations such as positioning, removal and insertion.

The alignment (backlash) 99 which has the error absorbing function prevents an undue twisting force from being applied to the balancing link 94*b*, securing a mechanical service life.

Since the rotating mechanism 111 is capable of rotating the held combustor component if the phases of the hole and screw of the fastening bolt are found misaligned when fastening the combustor component, there is no need to manually retain a heavy component, permitting easy positioning. In addition, if the combustor component has to be rotated (rolling direction) at the time of pulling out or inserting the combustor component, the combustor component held by the hand assembly 56 can be rotated, permitting easy removal and insertion of the combustor component.

Furthermore, if the inner hand 115 interferes with the operation of the outer hand 116, the inner hand joint 115*a* can be bent to withdraw the inner hand 115. This enables the hand assembly 56 to handle more types of components, minimizing the need for cumbersome change of the hand assembly 56 during the work. Moreover, the inner hand joint 115*a* can be stretched and fixed linearly, so that the inner hand 115 can be positioned accurately, permitting easy holding of the component.

In the inner hand 115, the auxiliary roller 115*f* is capable of softly touching the inner surface of a combustor component when supporting the combustor component from the inner side thereof. Therefore, even if the interior of the combustor component is provided with a thermal barrier coat (TBC), the TBC will not be scratched. Furthermore, even if a combustor component and the hand rub each other when attaching the component to or detaching it from the hand, the auxiliary roller 115*f* ensures smooth insertion and removal, permitting easy suspension onto the crane without causing an undue force applied to the component.

In the outer hand 116, using the outer hand hook driving link 116*d* and providing the plurality of the holding sections of the hook 116*a* make it possible to set a holding force suited to the weight of each component even if the outer hand driving device 116*b* is an easy-to-control air device, thus making the hand assembly 56 lighter and easier to handle.

Further in the outer hand 116, even if the outer hand driving device 116*b* is an air device, the auxiliary roller 116*e* is rolled to serve as a guide and the hook 116*a* is opened or closed, thereby bringing the hook 116*a* to the holding section of the component. This adds to the number of types of components which can be held and also reduces the cumbersome work such as replacing the hand assembly 56 in the middle.

Figure 19:
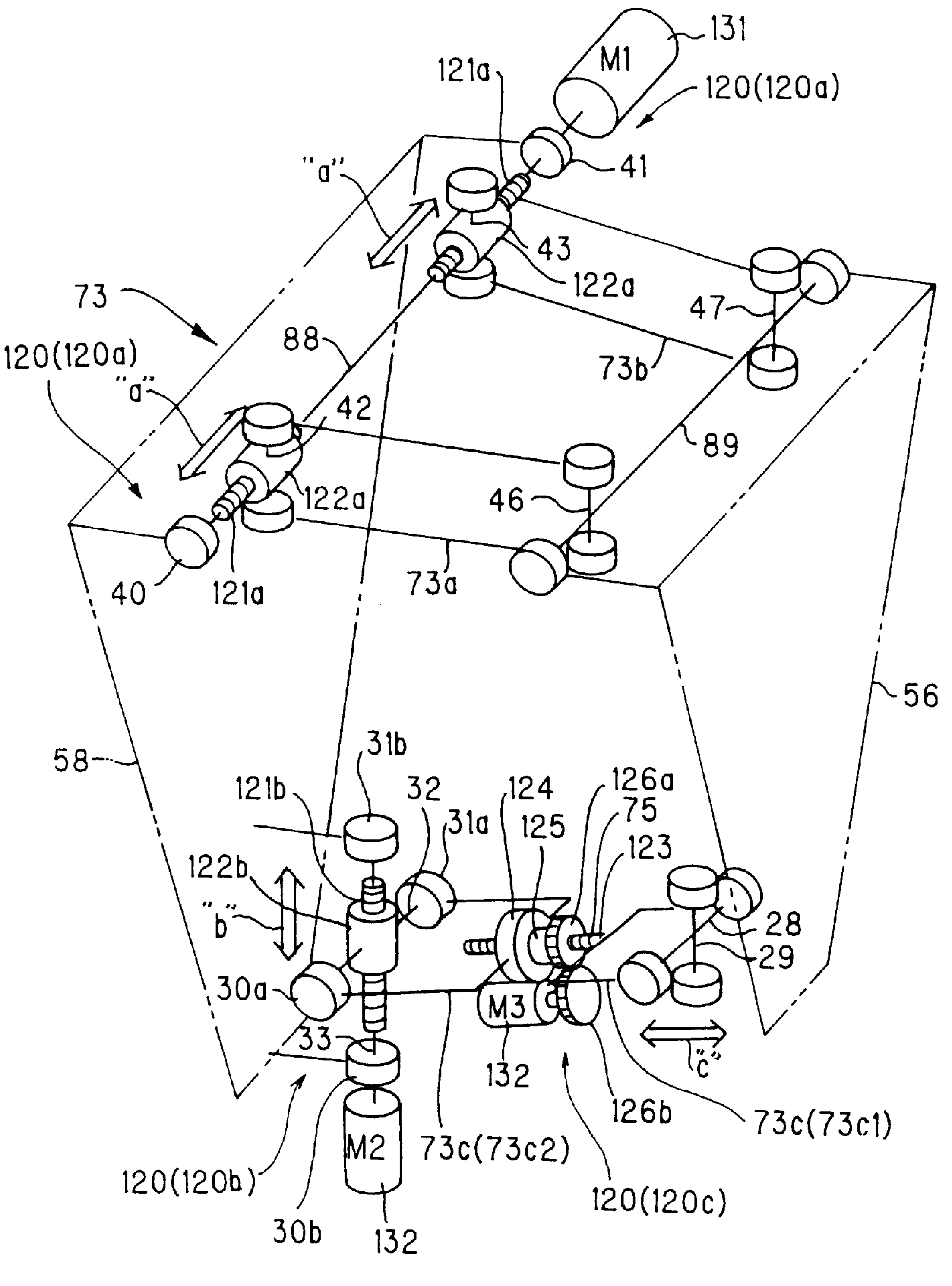
FIG. 19 is a perspective view illustrative of the configuration of a gas turbine combustor disassembling and assembling apparatus in accordance with a third embodiment of the present invention.
Figure 20:
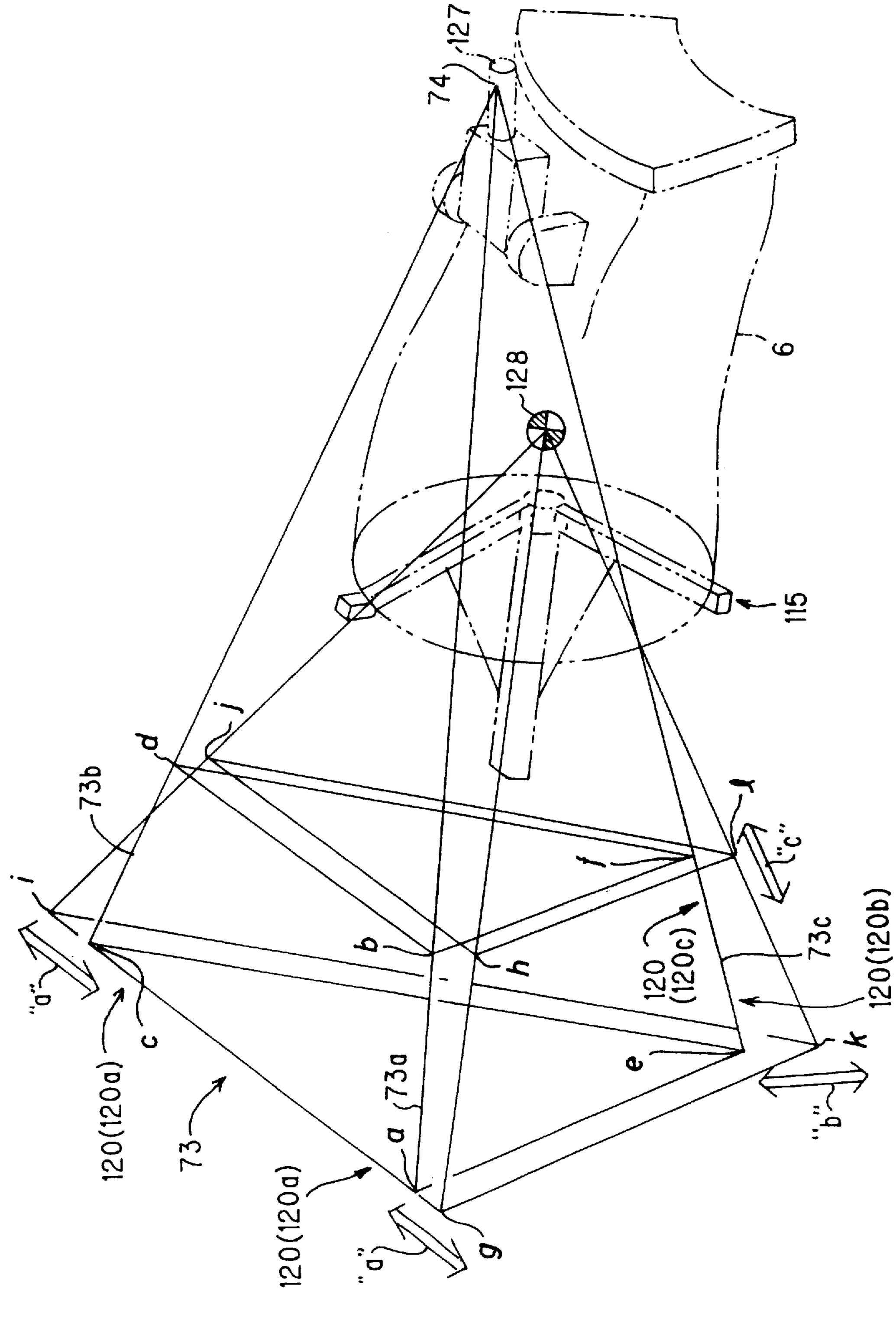
FIG. 20 is a schematic diagram showing the operation of the third embodiment.

Third Embodiment (FIG. 19, FIG. 20)

This embodiment is characterized in that, in the link mechanism 57 in the second embodiment described above, the lengths or the supporting positions of the links 73*a,* 73*b,* and 73*c* of the link mechanism 73, which is the trapezoid linkage supporting the hand assembly 56 onto the intermediate mounting section 58, are made variable and the position of the reference point 74 toward which the links 73*a,* 73*b,* and 73*c* are directed is also made variable.

FIG. 19 is a block diagram showing the link mechanism 73 and the mechanism for changing the link lengths or the link supporting positions and FIG. 20 is an operation explanatory diagram illustrating the change of the reference point 74.

As shown in FIG. 19, the link mechanism 73 in this embodiment is equipped with axial position changing mechanisms 120*a* and 120*b* for changing the axial positions of the link ends and a link length changing mechanism 120*c* for changing the link lengths as a reference point position changing means 120 for changing the position of the reference point toward which the links 73*a,* 73*b,* and 73*c* of the link mechanism 73 are directed.

The first axial position changing mechanism 120*a* is provided on the links 73*a* and 73*b* which are connected by a shaft to form a pair (see FIG. 19). Specifically, screws 121*a* and 121*a* which are threaded oppositely from each other are provided on both ends of the shaft 88 which connects the ends of the links 73*a* and 73*b* nearer the intermediate mounting section 58, and nuts 122*a* and 122*a* are engaged with the screws 121*a* and 121*a*. Reference numerals 40 and 41 denote the bearings which support both ends of the shaft 88. The nuts 122*a* and 122*a* are rotatably connected to the links 73*a* and 73*b* via the crossing pins 42 and 43. A motor 131 for rotating and driving is connected to one end of the shaft 88 with the screws 121*a* and 121*a.* The motor 131 drives the screws 121*a* and 121*a,* which are threaded oppositely from each other, causing the nuts 122*a* and 122*a* to move together with the links 73*a* and 73*b* made integral therewith in a direction (indicated by an arrow "a") for increasing or decreasing the interval therebetween.

The ends of the links 73*a* and 73*b* near the hand assembly 56 and the shaft 89 connecting them are not provided with the axial position changing mechanism, and the distance between these ends is kept constant. Reference numerals 46 and 47 denote crossing pins which rotatably connect the ends of the links 73*a* and 73*b* near the hand assembly 56 with the shaft 89.

In such a configuration, as the distance between the ends of the links 73*a,* 73*b* and the nuts 122*a,* 122*a* on the intermediate mounting section 58 side is increased or decreased as mentioned above, the opposing angle of the links 73*a* and 73*b* which form a pair of links of the trapezoid linkage changes since the distance between the ends of the links 73*a* and 73*b* on the hand assembly 56 side remains unchanged.

The second axial position changing mechanism 120*b* is provided on the other link 73*c* constituting the link mechanism 73 (see FIG. 19). Specifically, the end of the link 73*c* nearer the intermediate mounting section 58 is swingably supported via bearings 30*a,* 31*a* and the shaft 32, the shaft 32 being connected to the nut 122*b.* The crossing pin 33 is rotatably supported on the intermediate mounting section 58 via the bearings 30*b,* 31*b,* a screw 121*b* being formed on the crossing pin 33. The nut 122*b* engages with the screw 121*b* of the crossing pin 33 and the crossing pin 33 is connected to a driving motor 132 by which it is rotated.

As the screw 121*b* is rotated by the motor 132, the nut 122*b* moves together with the link 73*c* made integral therewith in one direction (indicated by an arrow "b").

The end of the link 73*c* nearer the hand assembly 56 and the shaft 28 connecting them are not provided with the axial position changing mechanism and they are maintained in a predetermined position at all times. Reference numeral 29 denotes a crossing pin which rotatably connects the end of the link 73*c* nearer the hand assembly with the shaft 28.

In such a configuration, as the end of the link 73*c* nearer the intermediate mounting section 58 moves together with the nut 122*b,* the angle of the link 73*c* constituting one link of the trapezoid linkage changes since the position of the end of the link 73*c* nearer the hand assembly 56 remains unchanged.

The link length changing mechanism 120*c* will now be described. The link length changing mechanism 120*c* is incorporated in the aforementioned link 73*c.* As described in the second embodiment, the link 73*c* is divided into two pieces, namely, 73*c*1 and 73*c*2 in order to absorb a twist, and the two pieces are connected with a rotating shaft 73. In this embodiment, the rotating shaft 75 juts out of the link 73*c*1 nearer the distal end of the two pieces and the rotating shaft 75 is received by a bearing 124 of the link 73*c*2 on the proximal end side. The rotating shaft 75 is provided with a screw and also a nut 125 which engages with the screw 123 and which is made integral therewith, a gear 126*a* being connected to the nut 125 as an integral piece. The gear 126*a* rotates by meshing with a gear 126*b* of the driving motor 132 provided on the link 73*c.*

Thus, as the nut 125 is rotated by the motor 132 via the gears 126*a* and 126*b*, the nut 125 moves in the direction of the length of the link 73*c* (in a direction "c") through the engagement with the screw 123, and the link 73*c*2 on the proximal end side relatively moves away from or toward the link 73*c*1 nearer the distal end via the bearing 124, thereby changing the entire length of the link 73*c*. This means that changing the length of the link 73*c* by the link length changing mechanism 120*c* changes the orientation of the whole link mechanism 73, i.e. the trapezoid linkage, because of the relationship with other links 73*a* and 73*b*.

FIG. 20 illustrates the reference point 74 which moves as the link length changing mechanism 120*c* is driven. In this embodiment, the diagram shows a case wherein the transition piece 6 which is a gas turbine component is held by the inner hand 115 of the hand assembly 56.

In FIG. 20, it is assumed that both ends of the link 73*a* of the link mechanism 73 are located in positions "a" and "b" and both ends of the link 73*b* are located in positions "c" and "d," and the both ends of the link 73*c* are located in positions "e" and "f" in an initial state. At this time, it is assumed that the reference point 74 is set at an inserting pin 127 nearer the distal end of the transition piece 6 because of the orientations of the links 73*a*, 73*b*, and 73*c*.

From the state described above, the first axial position changing mechanism 120*a* is driven to move, for example, one end of the link 73*a* to the position "g" and one end of the link 73*b* to the position "i" to increase the link interval. Further, the second axial position changing mechanism 120*b* is driven to move, for example, one end of the link 73*c* to the position "k" and the link length changing mechanism 120*c* is driven to extend a link 83*c*.

Thus, the other ends of the links 73*a*, 73*b*, and 73*c* respectively move to the positions "h," "j," and "l," thus enabling the central point, toward which the links are directed, to be moved from the reference point 74 to, for example, a center of gravity 128 of the transition piece 6.

Thus, according to this embodiment provided with the reference point position changing means 120, the position of the reference point 74 to which the links 73*a*, 73*b*, and 73*c* of the link mechanism are directed can be changed to any of the distal end, the inserting and fitting section, the center of gravity, etc. of a combustor component.

Hence, since the center (reference point) 74 of the fine adjustment of the attitude can be moved according to the type of work and the type of a combustor component, the attitude of a combustor component can be slightly changed by using the center of gravity 128 of the component as the center for making fine attitude adjustment when carrying a heavy component or the chance of prying caused by fitting can be reduced by using a fitting section as the center (the distal end of the inserting pin 127 in the case shown in FIG. 20) when fitting components, thus allowing components to be transported in optimum conditions.

Figure 21:
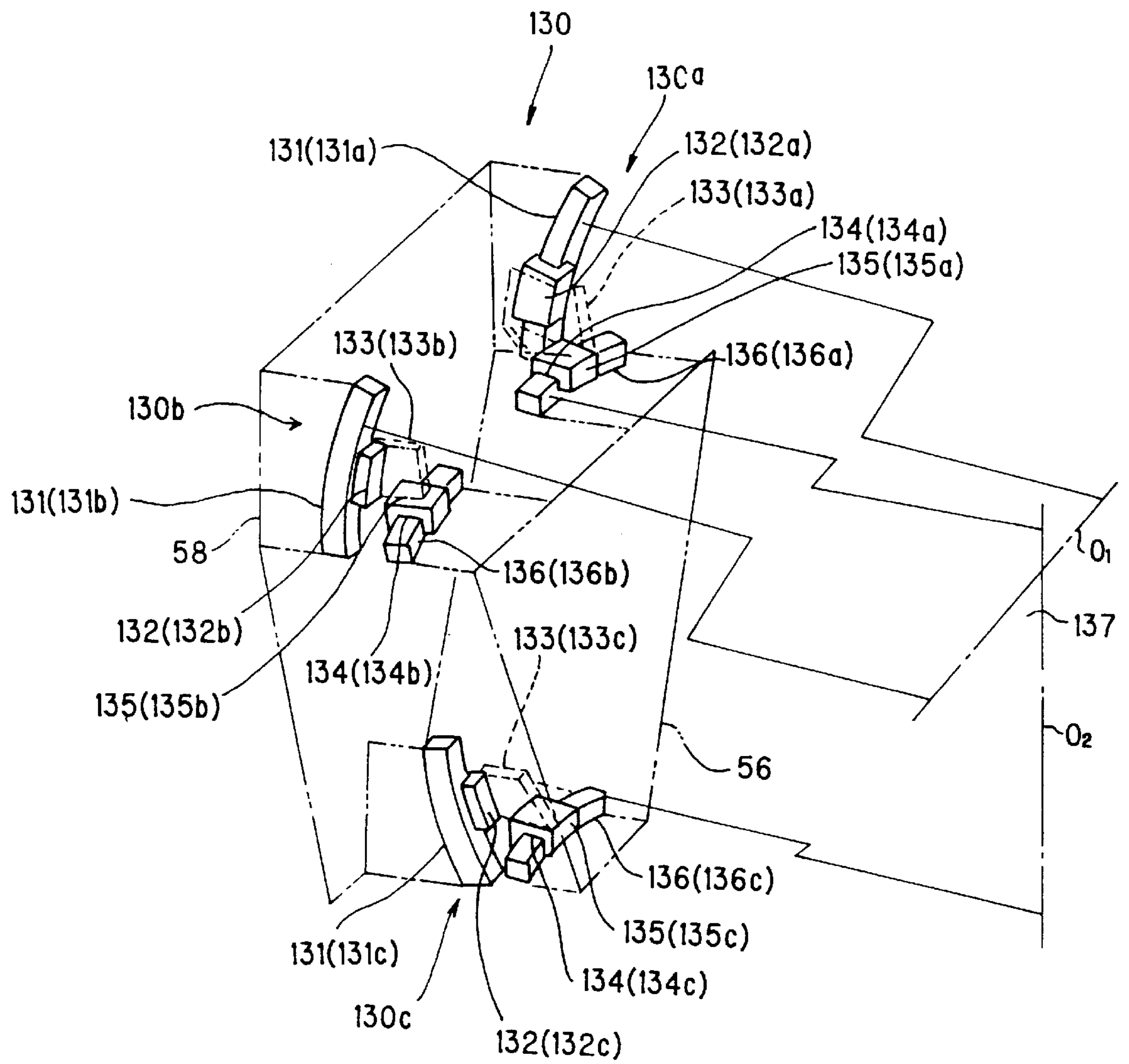
FIG. 21 is a perspective view illustrative of the configuration of a gas turbine combustor disassembling and assembling apparatus in accordance with a fourth embodiment of the present invention.
Figure 22:
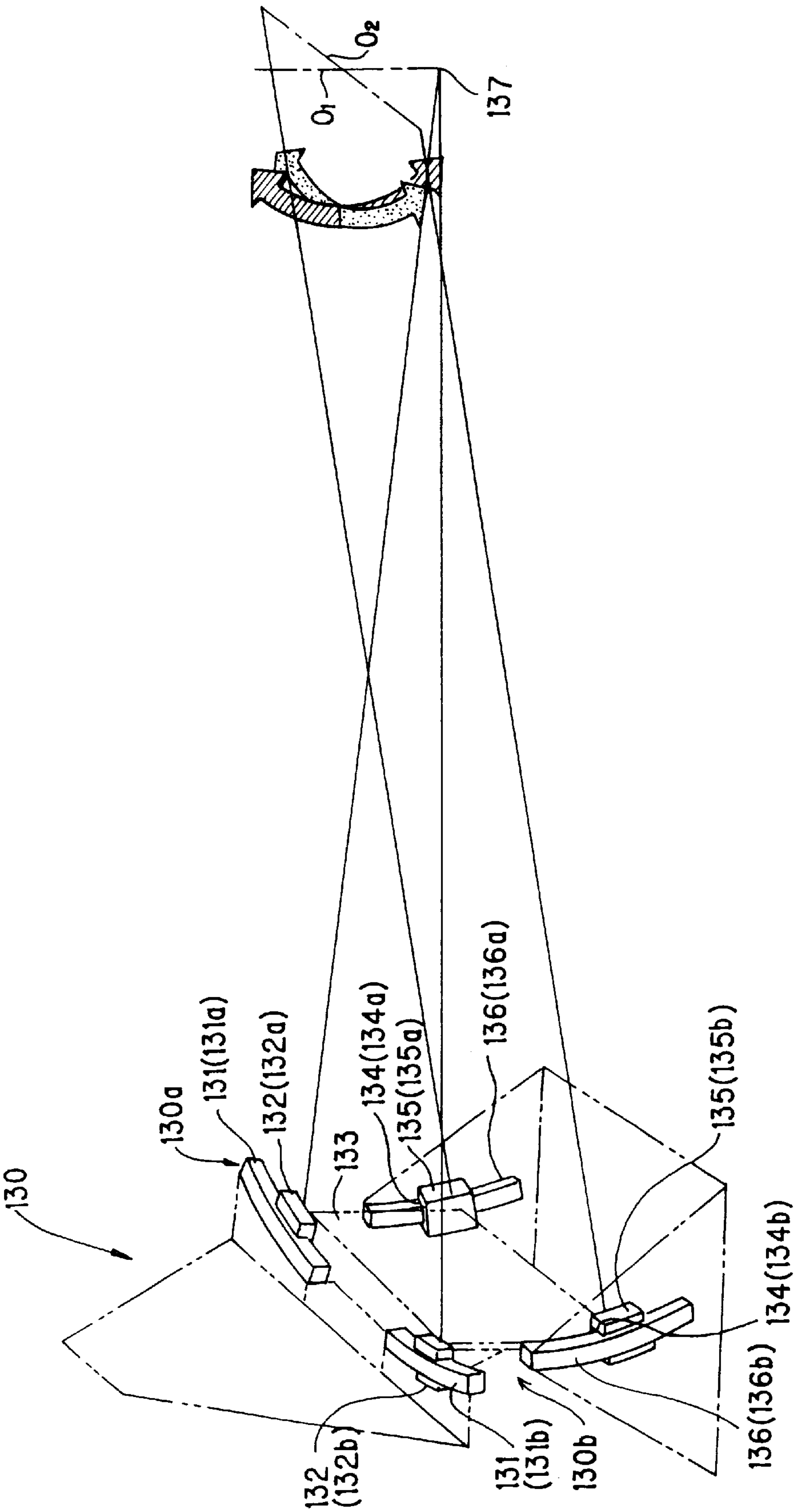
FIG. 22 is a perspective view showing an example of a modification of the fourth embodiment.

Fourth Embodiment (FIG. 21, FIG. 22)

This embodiment is provided with a guiding mechanism which guides the hand assembly 56 along a spherical trajectory in relation to the intermediate mounting section 58, and the guiding mechanism replaces the link mechanism 73 serving as the trapezoid linkage which is a constituent element in the first through third embodiments.

FIG. 22 is a schematic diagram illustrative of the basic configuration of a guiding mechanism 130. The guiding mechanism 130 is constructed by an arcuate first guiding member 131 which is disposed along the surface of a cylinder which has an axis 01 as the center thereof, a first movable member 132 which moves along the guiding member 131, a second guiding member 135 which is connected integrally with the first movable member 132 via a connecting member 133 and which has a guide 134 having a shape following the surface of a cylinder, the center of which is an axis 02 orthogonally crossing with the axis 01, and a second movable member 136 which moves along the guide 134 of the second guiding member 135.

In the configuration shown in FIG. 21, as the first guiding member 133, there are provided three guiding members 131*a*, 131*b*, and 131*c*, and there are accordingly provided three members for the rest (first movable members 132*a*, 132*b*, and 132*c*, connecting members 133*a*, 133*b*, and 133*c*, second guiding members 135*a*, 135*b*, and 135*c* and guiding members thereof 134*a*, 134*b*, and 134*c*, and second movable members 136*a*, 136*b*, and 136*c*). This constitutes the guiding mechanism 130 composed of three sets of guides 130*a*, 130*b*, and 130*c*.

The first guiding members 131*a*, 131*b*, and 131*c* are mounted on the intermediate mounting section 58 with intervals provided therebetween and the hand assembly 56 is supported by the second movable members 136*a*, 136*b*, and 136*c*.

Thus, in this embodiment, the guiding mechanism 130 is constructed which performs guiding in two independent directions by the first and second guiding members 131 and 135, respectively, and the hand member 56 can be rocked by using the vicinity of both axes 01 and 02 as a reference point 137. The guiding mechanism 130 in this embodiment is provided with three sets of guides 130*a*, 130*b*, and 130*c*. However, the number of such guides is not limited thereto, and only one set, for example, may be good if it is strong enough for a purpose. For instance, the guiding mechanism 130 shown in FIG. 22 has two sets of guides 130*a* and 130*b*. The configuration of the guiding mechanism 130 shown in FIG. 22 is approximately the same as that shown in FIG. 21, and therefore, the corresponding parts are assigned the same reference numerals and the description thereof will be omitted.

According to this embodiment, the first and second guiding members 131 (131*a*, 131*b*, and 131*c*) and 135 (135*a*, 135*b*, and 135*c*) in the two independent directions are disposed by using the reference point 137 and the axes 01 and 02 passing in the vicinity thereof as their centers. Therefore, the hand assembly 56 rocks, taking the reference point 137 as an approximate geometrical center, and the rocking of the hand assembly 56 enables the attitude of a held component to be adjusted.

Comparison of this embodiment with the link mechanism described above indicates that there is no shift in the reference point (the center of fine adjustment) even when the embodiment makes a major movement. Using strong guiding members 131, 135, etc. reduces the number of members and allows a single guide mounting surface instead of multiple guide mounting surfaces, thus permitting a compact design.

The link mechanism has special advantages. For instance, the use of the link mechanism provides advantages including the follows. The linkage may be disposed by directing it to the reference point in an open space, and the position of the reference point described in the second embodiment can be changed, and machining the link mounting surface does not require high accuracy.

Figure 23:
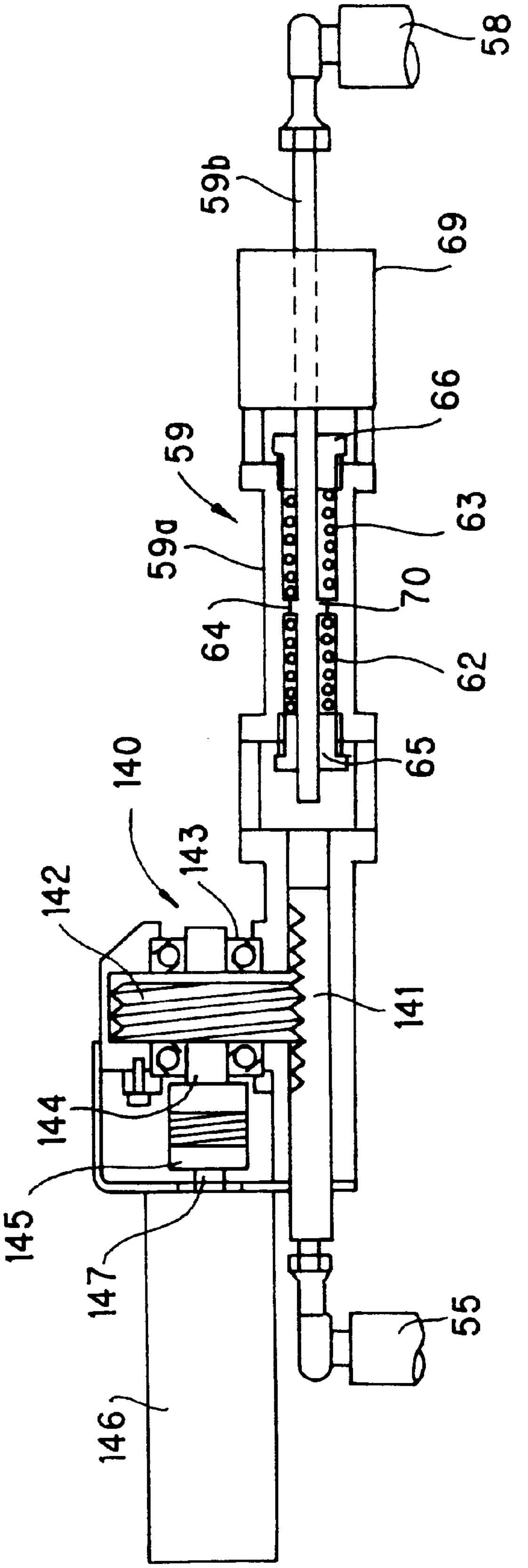
FIG. 23 is a diagram showing the configuration of a gas turbine combustor disassembling and assembling apparatus in accordance with a fifth embodiment of the present invention as a sectional view of a restoring mechanism.
Figure 24:
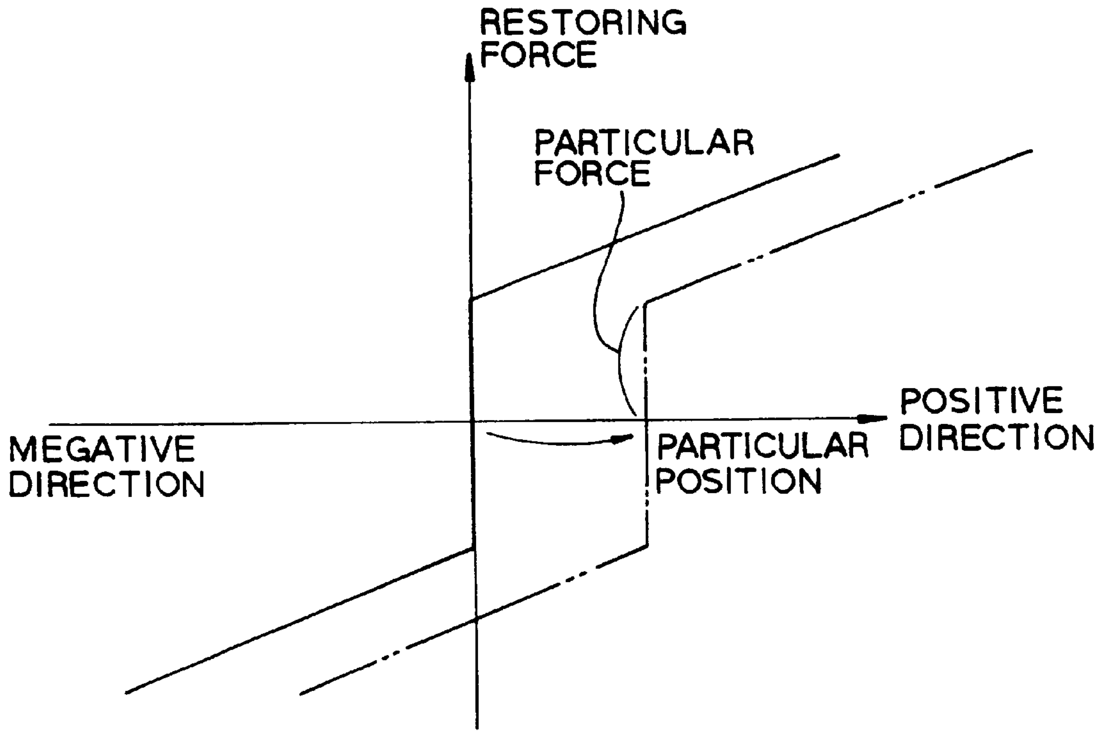
FIG. 24 is a characteristic diagram illustrative of the operation of the restoring mechanism shown in FIG. 23.

Fifth Embodiment (FIG. 23, FIG. 24)

This embodiment is an improvement over the restoring mechanism 59 described previously. FIG. 23 is a sectional view illustrative of the configuration of the restoring mechanism 59 and FIG. 24 is a characteristic diagram showing the function thereof.

As shown in FIG. 23, in the restoring mechanism 59 according to this embodiment, the positive spring 62 and the negative spring 63 composed of compression coil springs are disposed facing against each other between a housing 59*a* and a shaft 59*b*. The positive spring 62 pushes the large diameter section 70 of the shaft 59*b* from the housing 59*a* in the positive direction (rightward in FIG. 23), and the negative spring 63 pushes the large diameter section 70 of the shaft 59*b* from the housing 59*a* in the negative direction (leftward in FIG. 23). Further, the spring stretch limiting projection 64 is provided at the center of the inner surface of the housing 59*a*, so that the positive spring 62 and the negative spring 63 lose the pushing force applied to the shaft 59*a* after the springs come in contact with the spring stretch limiting projection 64. Spring pushing force adjusting screws 65 and 66 are engaged on both ends in the housing 59*a*. The pushing forces of the respective springs 62 and 63 can be adjusted by changing the degree of threaded engagement of these spring pushing force adjusting screws 65, 66 with the housing 59*a*.

The restoring mechanism 59 is further equipped with a restoring position moving mechanism 140. The restoring position moving mechanism 140 is constituted by a linear movement gear 141 which is movably inserted in an extended section of the housing 59*a* in the axial direction, and a worm gear 142 which rotates by meshing with the linear movement gear 141 to cause the linear movement gear 141 to perform linear inching movement. The work gear 142 is supported on the outer side by a bearing device 143, a shaft 144 of the worm gear 142 being connected to an output shaft 147 of a driving motor 146 via a coupling 145.

This embodiment is also provided with a fixing function section 69 which is capable of locking the shaft 59*b* as in the second embodiment shown in FIG. 16. The shaft 59*b*, for example, is connected near the intermediate mounting section 58 and the linear movement gear 141 is connected to the hand mounting section 55.

In the restoring mechanism 59 having such a configuration, the linear movement gear 141 can be linearly moved in relation to the housing 59*a* by the motor 146 via the worm gear 142. At this time, the linear movement gear 141 is connected and secured near the hand mounting section 55, so that if the linear movement gear 141 moves in the negative direction (leftward in FIG. 23) by a predetermined distance, for example, then the housing 59*a* will actually move in the positive direction (rightward in FIG. 23) via the bearing device 143. This movement of the housing 59*a* causes the positions of the spring pushing force adjusting screws 65 and 66 and the position of the spring stretch limiting projection 64 to shift in the positive direction. Therefore, the position where the intermediate mounting section 58 stops before a particular force is applied as the restoring force to the positive spring 62 and the negative spring 63 is shifted in the positive direction (right) in comparison with the case of the second embodiment described above as shown in FIG. 24.

The restoring mechanism 59 of this embodiment can be applied as a restoring mechanism for connecting the intermediate mounting section 58 and the hand assembly 56.

Hence, according to this embodiment, moving the linear movement gear 141 into and out of the housing 59*a* provides the motive power to make fine adjustment for resetting the position and attitude of a combustor component held by the hand assembly 56 to particular position and attitude. This reduces the power required for making fine adjustment and also permits easy remote control.

In this embodiment also, the point at which the elastic forces of the respective springs 62 and 63 operate is up to the point of the spring stretch limiting projection 64 in the middle. Hence, the restoring mechanisms 59 of this embodiment may be disposed among the hand mounting section 55, the intermediate mounting section 58, and the hand assembly 56 and connected in series to retain the flexing function. Therefore, in a case or the like where the positioning section on the distal end of a combustor component is nursed near the gas turbine main body casing 8, for example, the fine moving function following the position of its counterpart will be retained.

Sixth Embodiment (FIG. 25 through FIG. 35)

This embodiment relates to the configurations of the annular rails and the configuration of the traveling and driving section mounted thereon of the gas turbine disassembling and assembling apparatus in accordance with the present invention.

Figure 25:
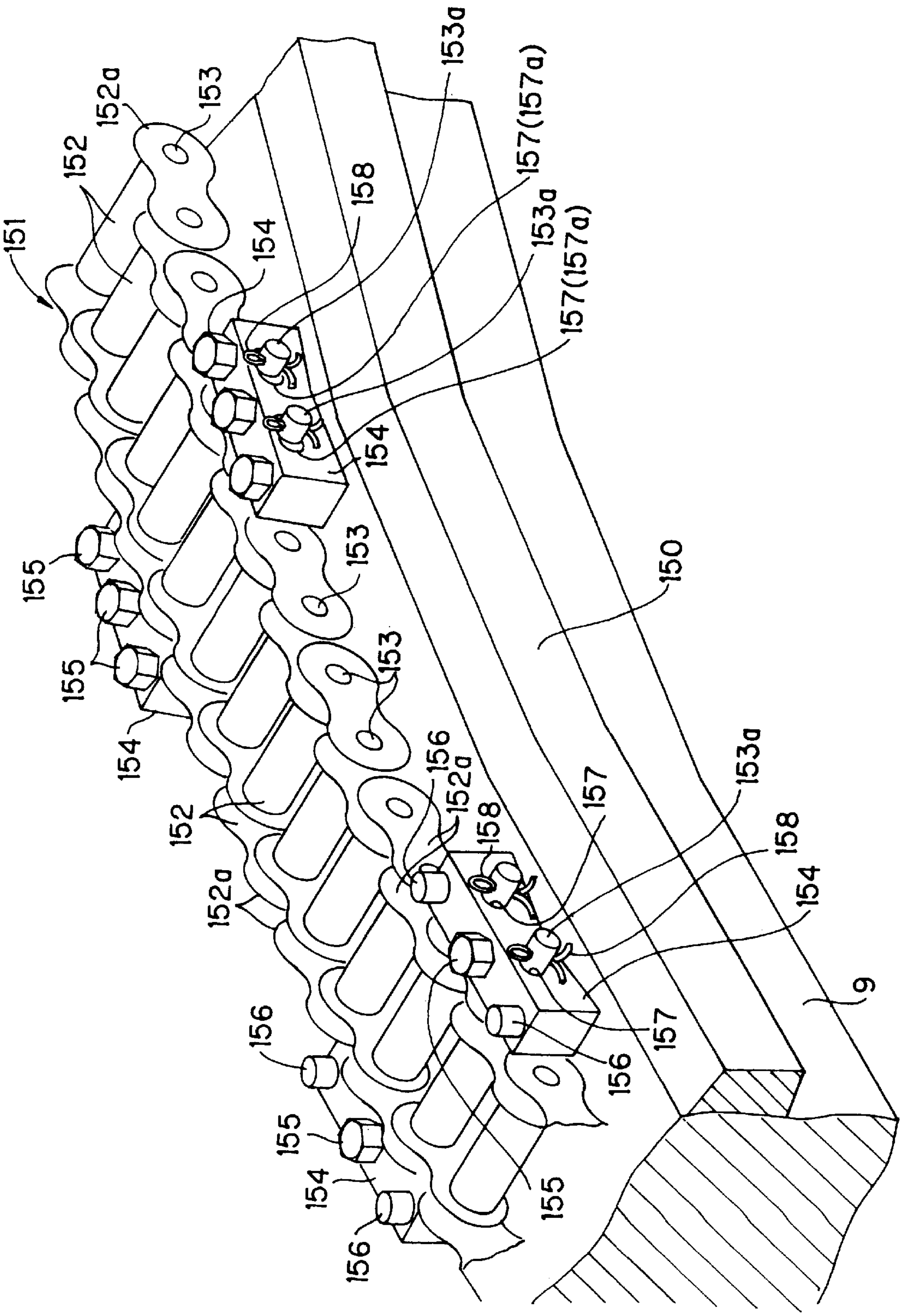
FIG. 25 is a perspective diagram illustrative of the configuration of a gas turbine combustor disassembling and assembling apparatus in accordance with a sixth embodiment of the present invention.
Figure 26:
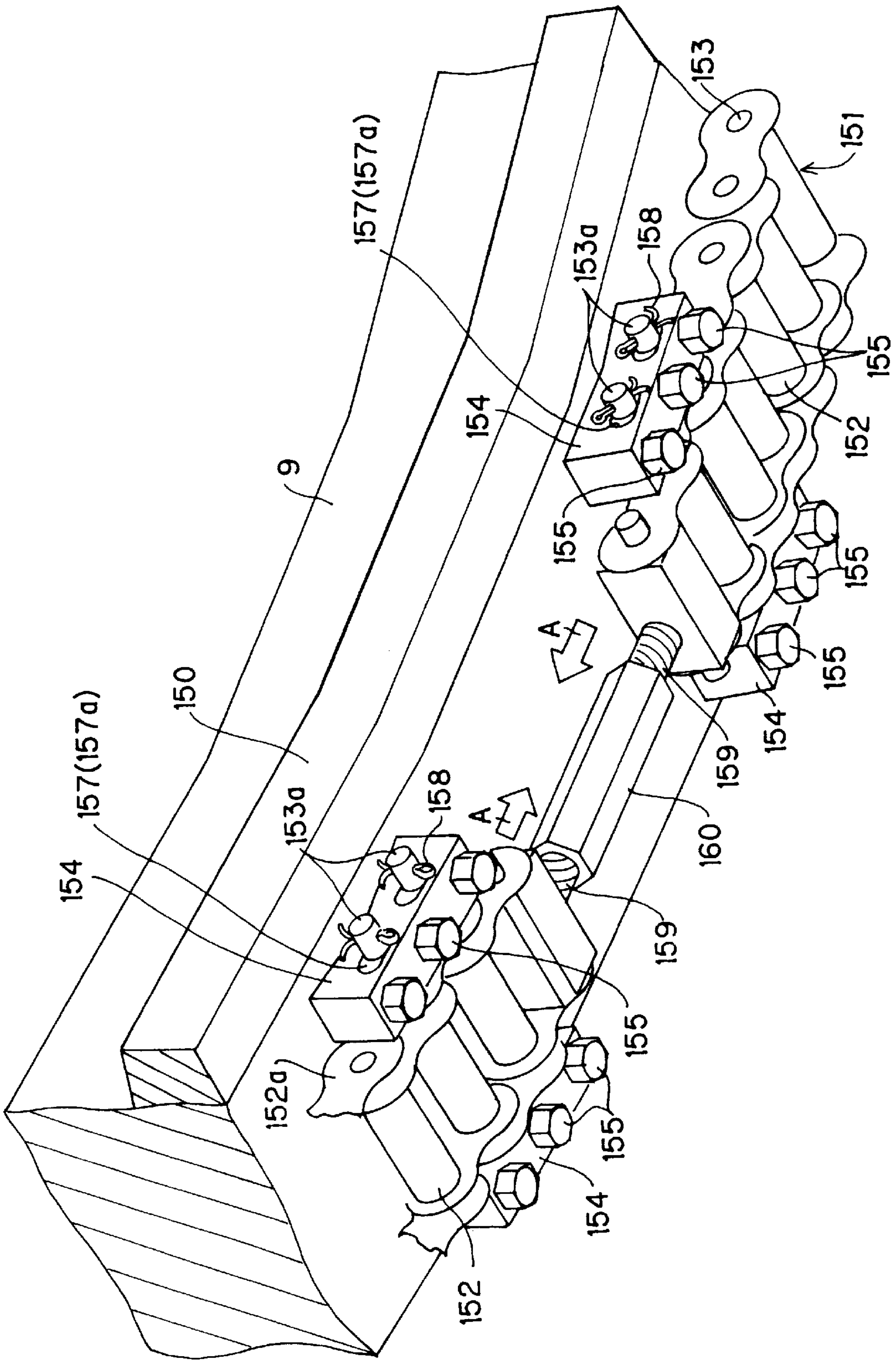
FIG. 26 is a perspective view illustrative of an annular rail shown in FIG. 25 which is observed from the lower side.

Referring first to FIG. 25 and FIG. 26, the annular rail 9 and a guiding structure of the traveling and driving section for the annular rail 9 will be described. FIG. 25 shows the annular rail 9 observed from above; and FIG. 26 shows the annular rail 9 observed from below.

As illustrated in these drawings, the annular rail 9 is shaped like a large arc and it is disposed around the gas turbine main body casing 8 (see FIG. 8). A guide rail 150 which has a diameter approximately identical to that of the annular rail 9 is fixed to the side surface of the annular rail 9. The guide rail 150 may be made integral with the annular rail 9 or it may be omitted in some cases.

A chain 151 serving as a traveling guide for the aforementioned frame 54 is fixed around the outer periphery of the annular rail 9. The chain 151 is constituted by a plurality of chain elements 152 which are connected by chain pins 153. Provided on the chain pins 153 are lengthy chain pins 153*a* which are disposed with intervals therebetween in the direction of the length of the chain and which are longer than the width of the chain elements 152. Both ends of the lengthy chain pins 153*a* project beyond both outer ends of a linking plate 152*a*.

Disposed on both outer ends of the chain 151 are stopping blocks 154, which are fixed at equal intervals on the outer periphery of the annular rail 9 by a retainers such as bolts 155 and stud pins 156. The distal ends of the chain pins 153*a* are inserted in a plurality of mounting holes 157 formed in parallel to the stopping blocks 154 and secured by, for example, cotter pins 158 or the like, thus securing the chain 151 to the annular rail 9. The mounting holes 157 in which the chain pins 153*a* are inserted and which are formed on the stopping blocks 154 are perfect circles or slots as indicated by reference numeral 157*a*.

Both ends of the chain 151 which is fixed to the outer periphery of the annular rail 9 as described above are respectively provided with screw rods 159 as illustrated in FIG. 26 and these screw rods 159 are connected through a turn buckle 160. The turn buckle 160 is fastened and both ends of the chain 151 are pulled in a direction denoted by an arrow A to decrease the distance between both ends of the chain 151 so as to fasten the chain 151 onto the annular rail 9, thereby closely securing the chain 151.

Specifically, the chain 151 is secured, for example, at the middle in the direction of the length of the chain on the annular rail 9 by the stopping blocks 154 which have the perfectly circular mounting holes 157, then it is further supported at equal intervals from the middle to both ends thereof by the stopping blocks 154 wherein the mounting holes 157 are the slots 157*a*. After the chain 151 has been wound around the outer periphery of the annular rail 9 with both ends of the chain pins 153*a* supported, both ends of the chain 151 are pulled against each other by the turn buckle 160 so as to be closely fixed onto the outer periphery of the annular rail 9.

According to the configurations shown in FIG. 25 and FIG. 26, even if the chain 151 breaks at one point, the stopping blocks 154 which are equidistantly provided on the annular rail 9 serve as stoppers which prevent the entire chain 151 from coming off. This feature is advantageous from the viewpoint of safety because it will prevent the disassembling and assembling apparatus 10 from falling off even if the chain 151 should break during the travel of the disassembling and assembling apparatus 10 along the annular rails 9 while being guided by the chain 151 as it will be discussed later.

Furthermore, when the chain 151 has to be disconnected when disassembling the annular rail 9 or if the annular rail 9 has broken, or when replacing the worn chain 151 after it has worn out, the entire chain 151 can be advantageously loosened by turning the turnbuckle 160, thus enabling only a portion of the chain 151 to be disconnected. The rest of the chain 151 can be left on the annular rail 9 while being supported by the stopping blocks 154. Therefore, when the chain 151 is connected again, there is no need to rewind the entire heavy chain 151 onto the annular rail 9, thus saving time and labor.

Figure 27:
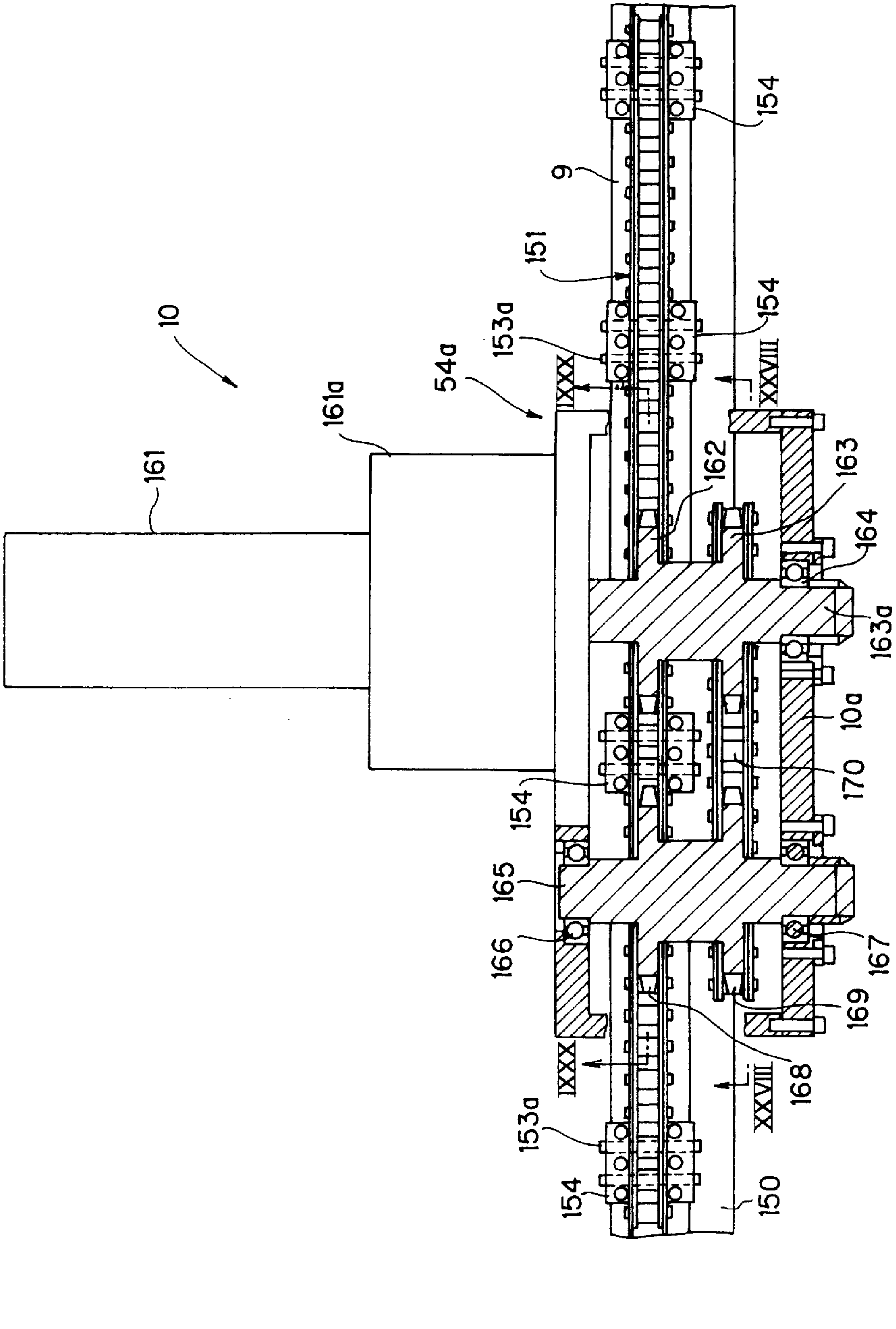
FIG. 27 is a top plan view of the annular rail shown in FIG. 25.
Figure 28:
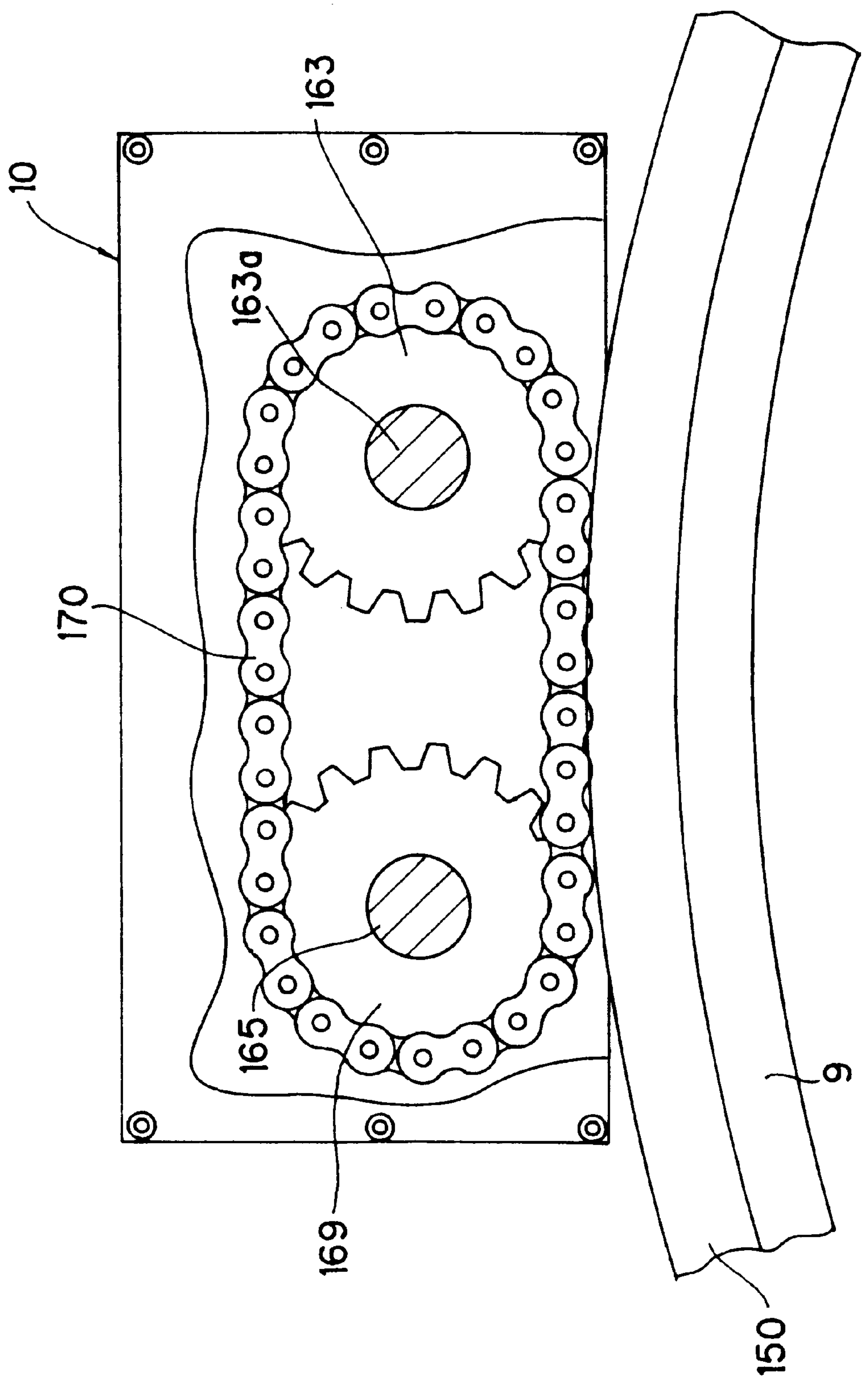
FIG. 28 is a fragmentary view taken on line XXVIII—XXVIII shown in FIG. 27.
Figure 29:
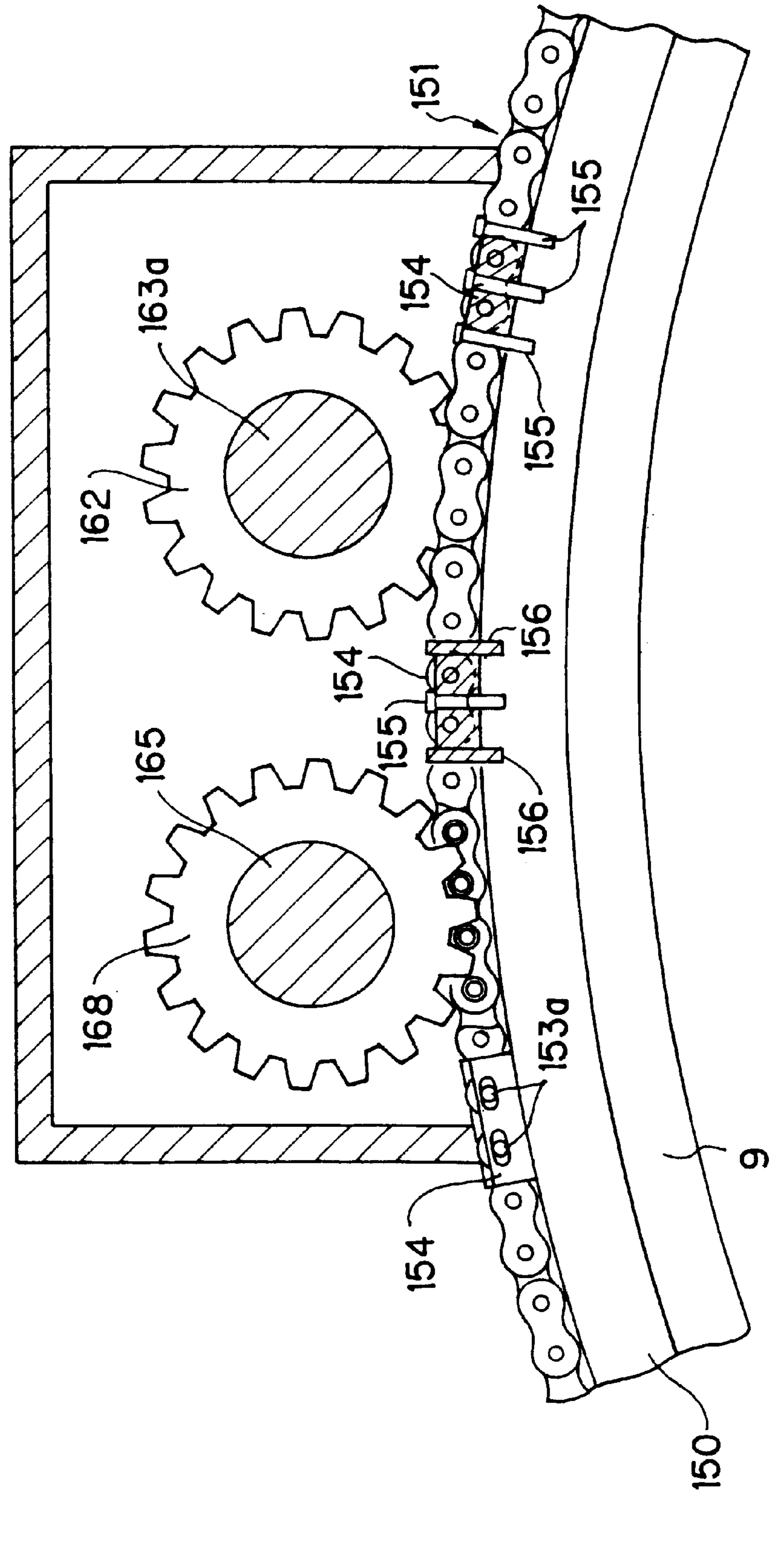
FIG. 29 is a fragmentary view taken on line IXXX—IXXX shown in FIG. 27.

Referring now to FIG. 27 through 29, a structure of the engagement between the chain and a traveling and driving section 54*a* of the frame 54 of the disassembling and assembling apparatus 10 which travels on the annular rail 9 will be described. FIG. 27 shows a section of the traveling and driving section 54*a* observed from the outer periphery of the annular rail 9, i.e. from the side of the surface of the chain 151, and FIG. 28 and FIG. 29 are perspective views of FIG. 27 taken on line XXVIII—XXVIII and line IXXX—IXXX, respectively.

As illustrated in FIG. 27 through FIG. 29, the traveling and driving section 54*a* has a plurality of sprocket-like wheels which are disposed in the direction of the length of the chain 151.

More specifically, the disassembling and assembling apparatus 10 incorporates a motor 161, a first sprocket 162 is connected to a rotary shaft of the motor 161 via an attenuator 161*a*, and the tooth ends of the first sprocket 162 are engaged with the chain 151. Integrally connected on the distal end side of the rotary shaft of the first sprocket 162 is a first interlocked sprocket 163, and the distal end of a rotary shaft 163*a* of the first interlocked sprocket 163 is secured to a traveling section case 10*a* of the disassembling and assembling apparatus 10 via a bearing 164. A brake, not shown, is provided inside the motor 161, which can be stopped and held in the stopped state by actuating the brake.

Further, a driven shaft 165 is placed in parallel to the first sprocket 162 and the rotary shaft 163*a* of the first interlocked sprocket 163, and both ends of the driven shaft 165 are built in the traveling section case 10*a* of the disassembling and assembling apparatus 10 by a pair of bearings 166 and 167. Integrally connected to the driven shaft 165 are a second sprocket 168 which meshes with the chain 151 and a second interlocked sprocket 169 which has the same shape as that of the first interlocked sprocket 163. The second sprocket 169 is connected to the first interlocked sprocket 163 and an interlocked chain 170 to rotate at constant speed.

The row of the teeth of the second sprocket 168 is shifted by a half-pitch rotational phase with respect to the row of the teeth of the first sprocket 162.

With such an arrangement, the first sprocket 162 and the second sprocket 168 mesh with the chain 151 and the traveling and driving section 54*a* rotates around the gas turbine along the annular rail 9, causing the disassembling and assembling apparatus 10 to turn.

In this case, both sprockets 162 and 168 are given approximately the same torque and rotational speed, so that the load applied to the chain 151 wound around the outer periphery of the annular rail 9 is spread and the fatigue of the chain 151 can be reduced. This prevents the disassembling and assembling apparatus 10 from falling due to the breakage of the chain 151, providing a safety advantage.

Further, since the sprockets mesh with the chain 151 at two different places, even if the chain 151 breaks in the vicinity of one of the sprockets, i.e. the sprocket 162 (or 168), the other sprocket 168 (or 162) meshes with the chain 151 and in addition, the chain 151 is supported by the stopping blocks 154 at regular intervals, thus preventing the disassembling and assembling apparatus 10 from dropping.

If the timing at which the first sprocket 162 meshes with the chain 151 is exactly the same as that at which the second sprocket 168 meshes with the chain 151, then the impact force generated when the sprocket teeth engage with the chain 151 is doubled and the play is no better than that if only one sprocket is used. In this embodiment, however, the row of the teeth of the first sprocket 162 is shifted by the half-pitch rotational phase from that of the second sprocket 168 as previously described. Therefore, the impact force applied to the chain 151 can be spread, leading to a prolonged life of the chain 151.

Regarding the play, the teeth of one sprocket 168 (or 162) start to engage with the chain 151 before the teeth of the other sprocket 162 (or 168) leave the chain 151, so that the contact between the chain 151 and the sprockets 162 or 168 can be maintained at all times. This enables the disassembling and assembling apparatus 10 to smoothly travel to the combustor 2 and stop with high accuracy.

A gear may be used in place of the interlocked chain 170 as the means for rotating the two rotary shafts 163*a* and 165 at constant speed. As an alternative, the driving force of the motor 161 may be transmitted by using a gear, a chain, or the like. Likewise, in place of the chain 151 and the sprockets 162 and 168, a gear may be formed on the outer periphery of the annular rail 9 and the gear of the disassembling and assembling apparatus 10 may be engaged therewith to move the disassembling and assembling apparatus 10.

Figure 30:
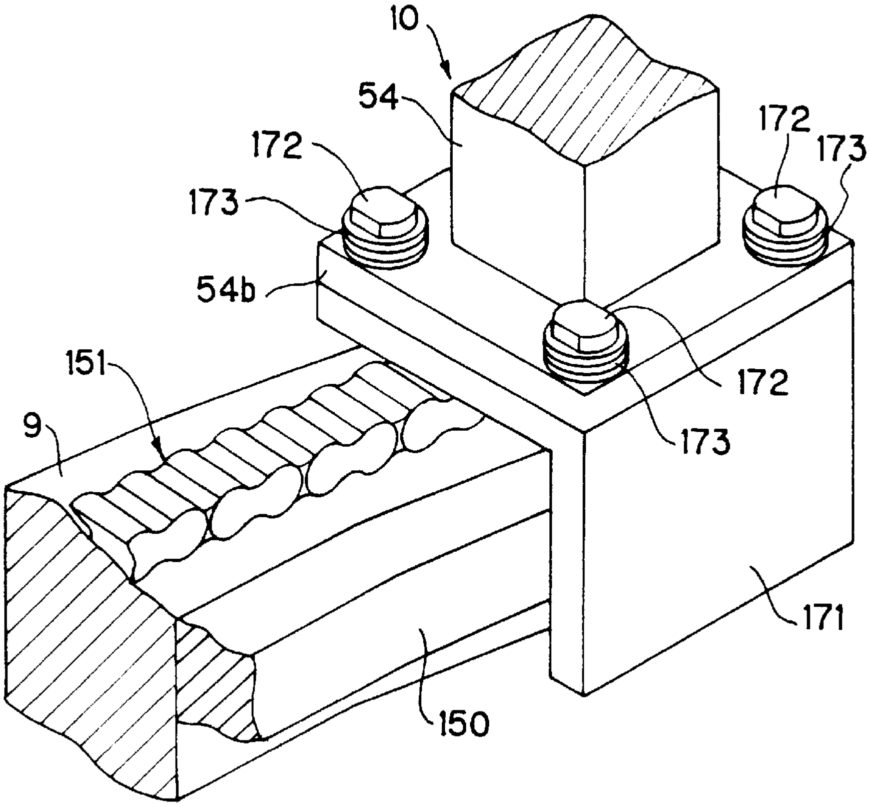
FIG. 30 is a perspective view illustrative of a frame supporting structure in the sixth embodiment.
Figure 31:
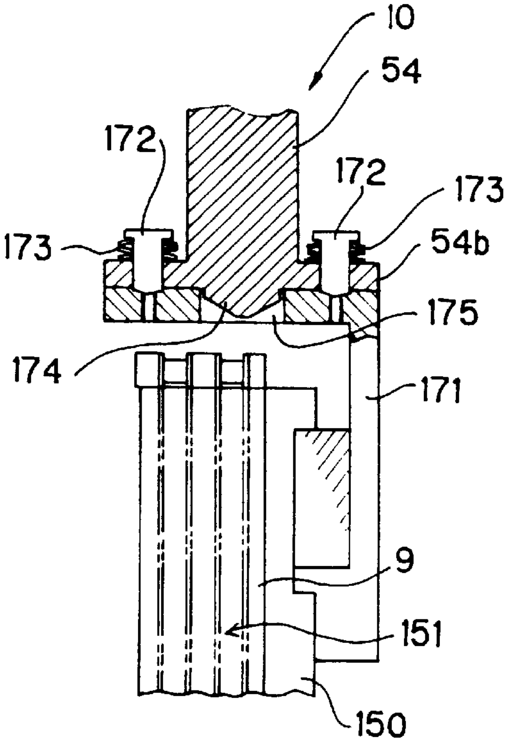
FIG. 31 is a sectional view of the supporting structure shown in FIG. 30.
Figure 32:
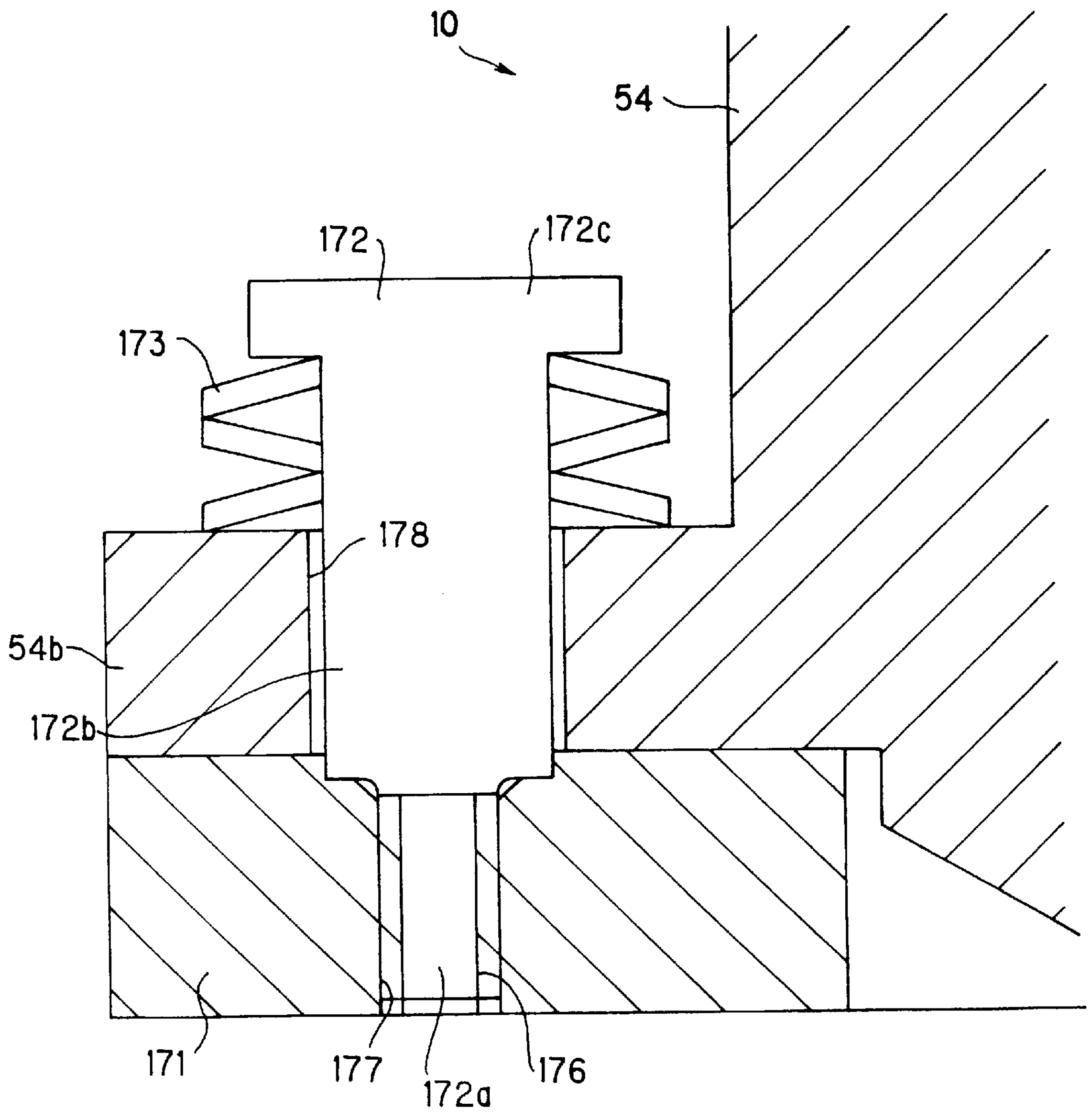
FIG. 32 is an enlarged view illustrative of an essential section shown in FIG. 31.
Figure 33:
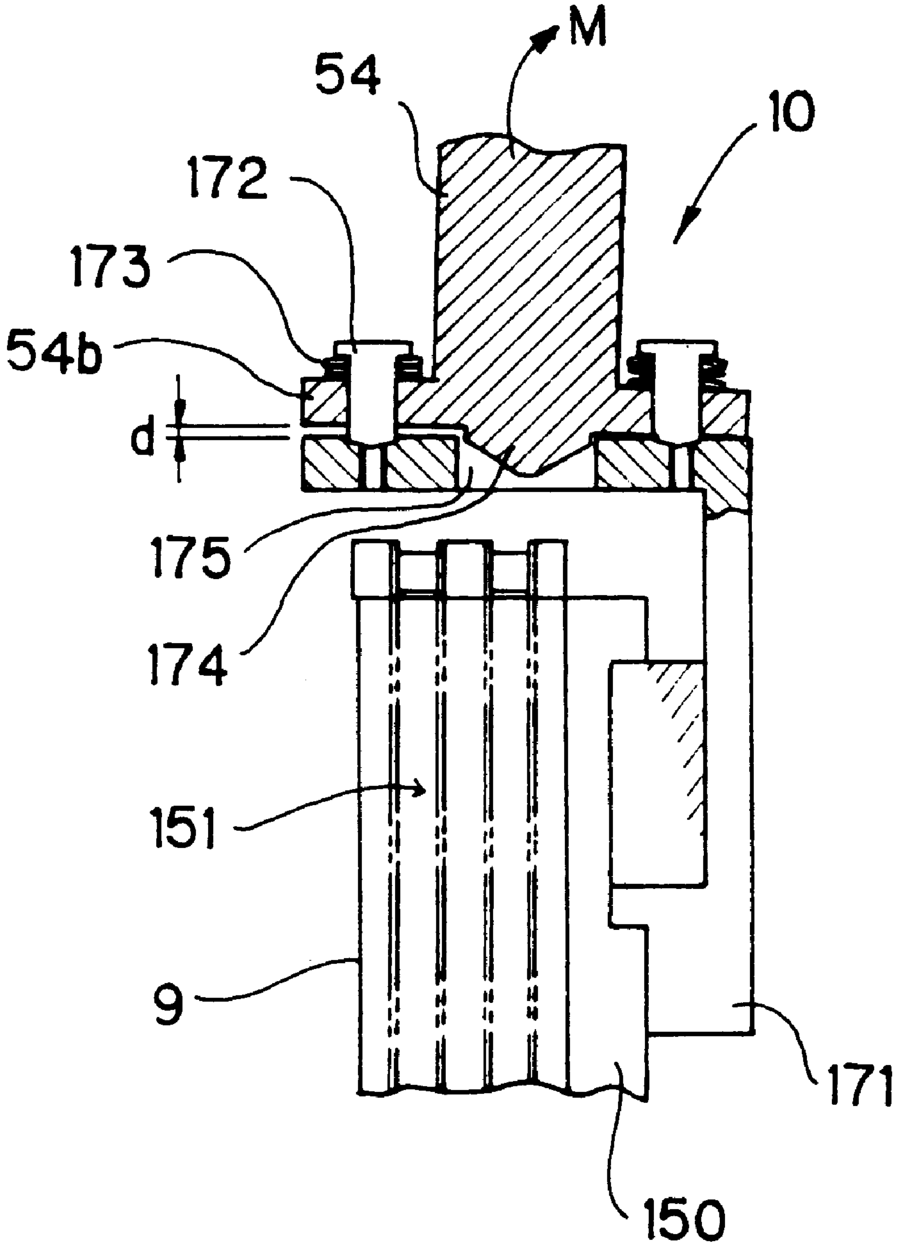
FIG. 33 is a sectional view illustrative of the operation of a connection between a frame and a guiding rod shown in FIG. 31.

Referring now to FIG. 30 through FIG. 36, a supporting structure for mounting the frame 54 of the disassembling and assembling apparatus 10 on the annular rail 9 will be described. FIG. 30 is a perspective view showing the appearance of an example of the supporting structure, and FIG. 31 is a sectional view showing the details of the same. FIG. 32 is an enlarged view of an essential section of FIG. 31 and FIG. 33 is a sectional view illustrative of operation.

As shown in these drawings, in this embodiment, the frame 54 which travels on the annular rail 9 is mounted on a guiding block 171 serving as a guiding member which is led by the annular rail 9. The section of the guiding block 171 for mounting the frame 54 is secured by a plurality of bolts 172 or other fasteners, and the secured section fastened by the fasteners is provided with elastic means such as flush screws 172 which permit the movement in a counter-fastening direction in response to a reaction force of a predetermined level or more.

To be more specific, as shown in FIG. 30 and FIG. 31, the guiding block 171 which has, for example, an L-shaped section, is engaged with the guide rail 150 attached to the annular rail 9. The frame 54 is mounted on the guiding block 171 with a flange 54*b* in contact with the guiding block 171. A pin 174 which projects downward is formed at the bottom center of the flange 54*b*, and the frame 54 is connected to the guiding block 171 by bolts 172 with the pin 174 inserted in a hole 175.

FIG. 32 is an enlarged sectional view illustrative of the structure around the bolts 172. The bolt 172 has a distal end section 172*a* of a small diameter and a proximal end section 172*b* of a large diameter. An external thread section 176 formed on the distal end section 172*a* of the small diameter is screwed to a internal thread section 177 of the guiding block 171. A large-diameter hole 178 is formed on the flange 54*b* of the frame 54, and the proximal end section 172*b* of the large diameter of the bolt 172 is inserted in the large-diameter hole 178 with a gap.

A plurality of disc springs 173 are fitted as the fasteners between a head 172*c* of the bolt 172 and the flange 54*b*, and the disc springs 173 are compressed by the head 172*c* of the bolt 172 and pressed against the flange 54*b*. Thus, the fastening force for the frame 54 and the guiding block 171 comes from the repulsion of the compressed disc spring 173.

FIG. 33 is a sectional view illustrative of the interaction which takes place at the connection between the frame 54 and the guiding block 171 when an undue force is applied to the disassembling and assembling apparatus in the structure described above. As shown mainly in FIG. 8, the disassembling and assembling apparatus 10 travels on a plurality of annular rails 9, and therefore, if, for example, the centers of the annular rails 9 are not aligned in center or the guide rail 150 is unsmooth or twisted, then the frame 54 tilts irregularly, eventually producing a large bending moment M which is applied to the connection between the disassembling and assembling apparatus 10 and the guiding block 171. Since the frame 54, the guiding block 171, and the disc spring 173 abut each other by the repulsion from the compression, no change takes place as long as a force smaller than the repulsion of the disc spring 173 is applied. When, however, a force which exceeds the repulsion of the disc spring 173 is applied, the disc spring 173 is compressed and the connection between the frame 54 and the guiding block 171 opens by about a width "d," causing only the frame 54 to tilt. The tilt of the frame 54 is eliminated when the disassembling and assembling apparatus 10 reaches normal portions of the annular rails 9 after traveling on deformed portions or the like, thus causing the connection between the flange 54*b* and the guiding block 171 to be restored. Accordingly, the pin 174 is fitted back into the hole 175 and, as a result, the positional relationship between the disassembling and assembling apparatus 10 and the guiding block 171 restores an initial state thereof within the error of the fitting between the pin 174 and the hole 175.

With this arrangement, even if the dislocation among the plurality of annular rails 9, the deformation of the guide rail 150, etc. causes the disassembling and assembling apparatus 10 to tilt with consequent excessive bending moment M applied to the connection between the frame 54 and the guiding block 171, the disc spring 173 is compressed and only the disassembling and assembling apparatus 10 tilts, thus protecting the guiding block 171, the guide rail 150, etc. from damage caused by undue bending.

Furthermore, when the disassembling and assembling apparatus 10 is recovered from the tilted state, the pin 174 at the bottom center of the frame 54 is fitted back into the hole 175 of the guiding block 171, thus maintaining the positional relationship unchanged between the frame 54 and the guiding block 171. This ensures smooth disassembling and assembling of combustor components by the disassembling and assembling apparatus 10.

Since no change takes place as long as a force applied stays under the repulsion of the compressed disc spring 173, it is possible to prevent the entire disassembling and assembling apparatus 10 from rocking and interfering with the disassembling or assembling of a combustor component. In addition, simply inserting the pin 174 in the hole 175 positions the connection between the frame 54 and the guiding block 171, permitting extremely easy installation of the disassembling and assembling apparatus 10 to the guiding block 171 and, therefore, saving time and labor in the disassembling and assembling of combustor components.

Figure 34:
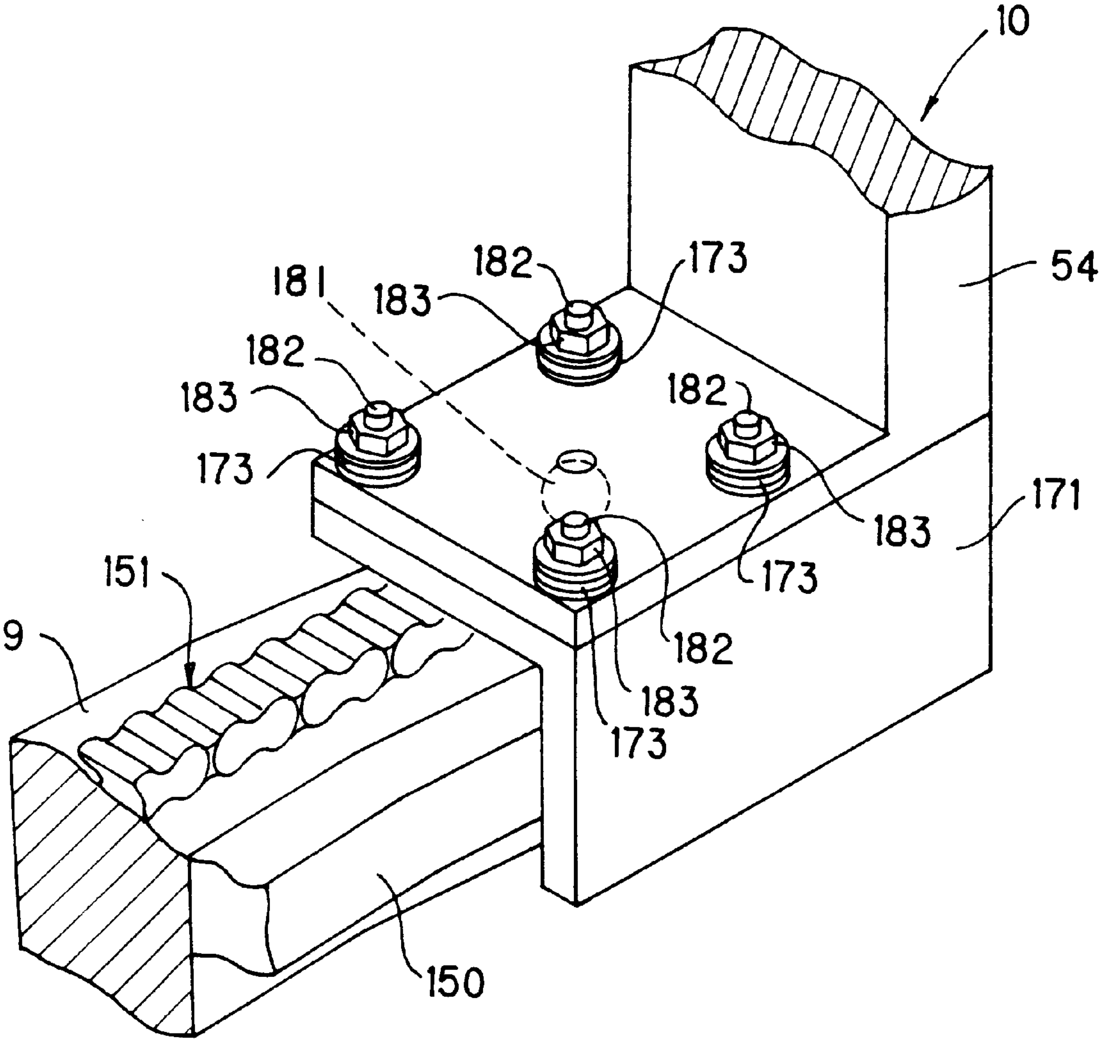
FIG. 34 is a perspective view illustrative of an example of a modification of the frame supporting structure shown in FIG. 30.
Figure 35:
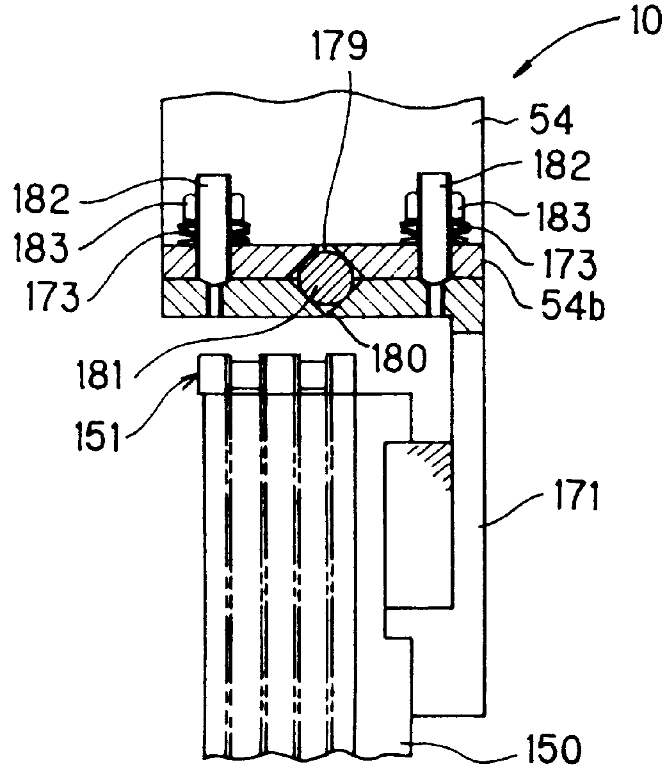
FIG. 35 is a sectional view of the supporting structure shown in FIG. 34.
Figure 36:
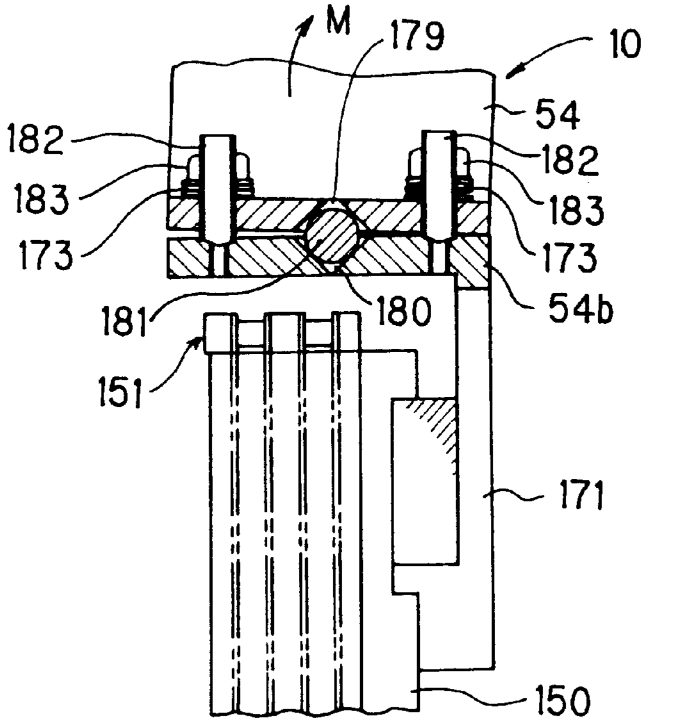
FIG. 36 is a sectional view illustrative of the operation of the connection between the frame and the guiding rod shown in FIG. 35.

FIG. 34 through FIG. 36 show an example of a modified configuration of the connection between the disassembling and assembling apparatus 10 and the guiding block 171. In this example, the bottom central portion of the flange 54*b* of the frame which is a connecting surface near the disassembling and assembling apparatus 10 is provided with a tapered hole 179 which spreads downward. The counterpart connecting surface near the guiding block 171 is provided with a tapered hole 180 which spreads upward, thus making it vertically symmetrical with the tapered hole 179. A sphere 181 which is large enough to touch, through the outer peripheral surface thereof, the surfaces of the two tapered holes 179 and 180 is inserted between the two tapered holes 179 and 180.

The disc spring 173 is compressed between a nut 183 and the guiding block 171; the nut 183 is fastened from above the disassembling and assembling apparatus 10 onto a stud bolt 182 with a shoulder as in the case of the aforesaid bolt 172, the stud bolt 182 being screwed into the guiding block 171. In other words, the flange 54*b* of the frame 54 and the guiding block 171 abut each other by the repulsion from the disc spring 173 compressed by the nut 183.

In such a modified example, as in the case of the configuration shown in FIG. 30 through FIG. 33, even after the moment M works on the frame 54 and the disc spring 173 is compressed, causing the disassembling and assembling apparatus 10 to tilt, the disassembling and assembling apparatus 10 and the guiding block 171 are dislocated within a range wherein the sphere 181 is located at the center of the two tapered holes 179 and 180 nearer the disassembling and assembling apparatus 10 and nearer the guiding block 171, respectively, thus maintaining the positional relationship between the disassembling and assembling apparatus 10 and the guiding block 171 unchanged at all times. Furthermore, with the arrangement illustrated in FIG. 34 through FIG. 36, the compression of the disc spring 173 can be adjusted by adjusting the fastening force of the nut 182, and therefore, the magnitude of the moment M required for tilting the disassembling and assembling apparatus 10 can be set at a desired value by adjusting the compression of the disc spring 173.

Thus, the configuration of the modified example described above also provides the same advantages as those of the preceding example of configuration. In addition, in this example, the compression of the disc spring 173 can be adjusted, so that the rigidity of the disassembling and assembling apparatus 10 can be set to an appropriate level without any special change, enabling a highly accurate disassembling and assembling apparatus 10 by a simple construction.

In the embodiment described above, the positioning structure employing the sphere 181 may appropriately be replaced by the positioning structure employing the pin 174 and the hole 175, or means similar to these members may be used as long as the structure for always maintaining the constant positional relationship between the disassembling and assembling apparatus 10, and the guiding block 171 is provided and the spring force with a compression allowance left is provided to butt the disassembling and assembling apparatus 10 and the guiding block 171. Further, a coil spring or the like may be used in place of the disc spring 173.

Figure 37:
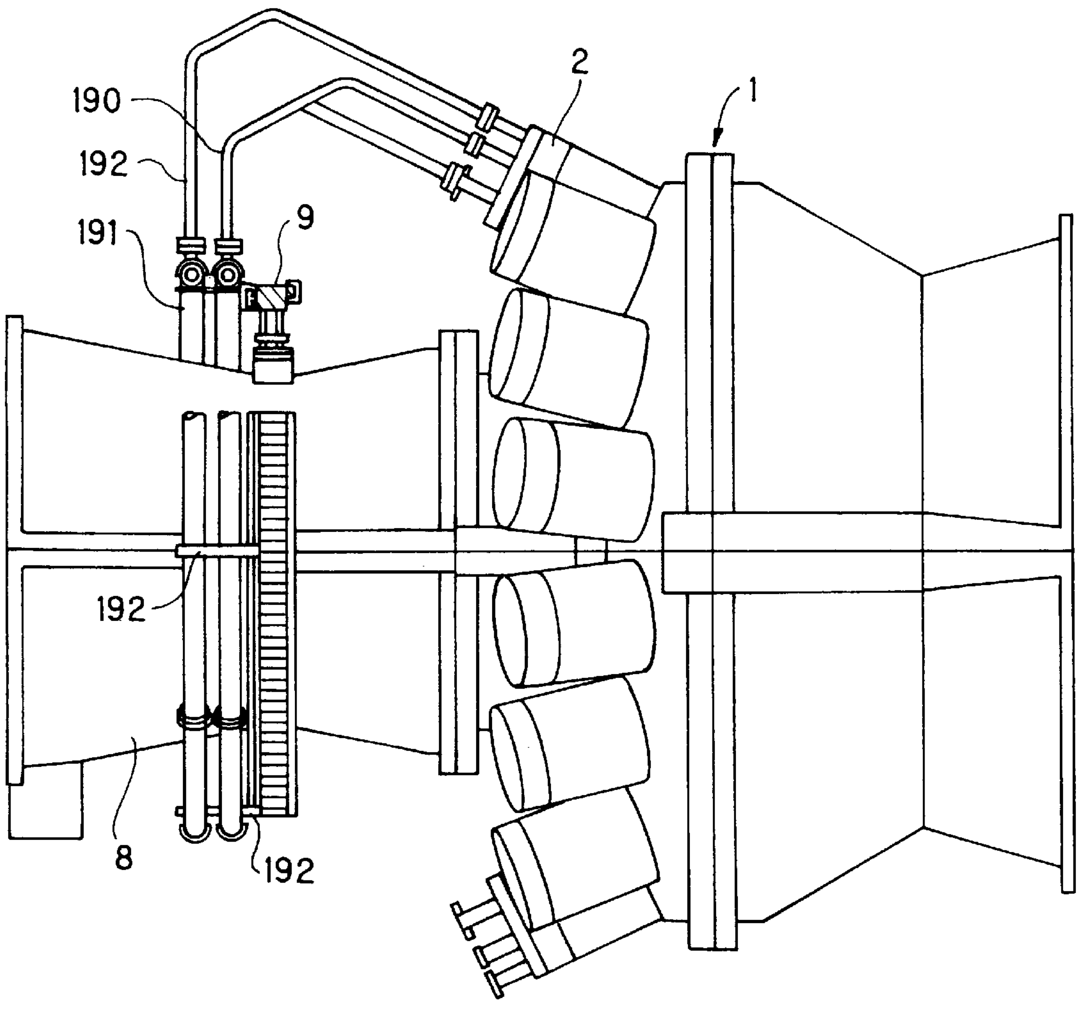
FIG. 37 is a side view illustrative of a configuration of a gas turbine combustor disassembling and assembling apparatus in accordance with a seventh embodiment of the present invention.
Figure 38:
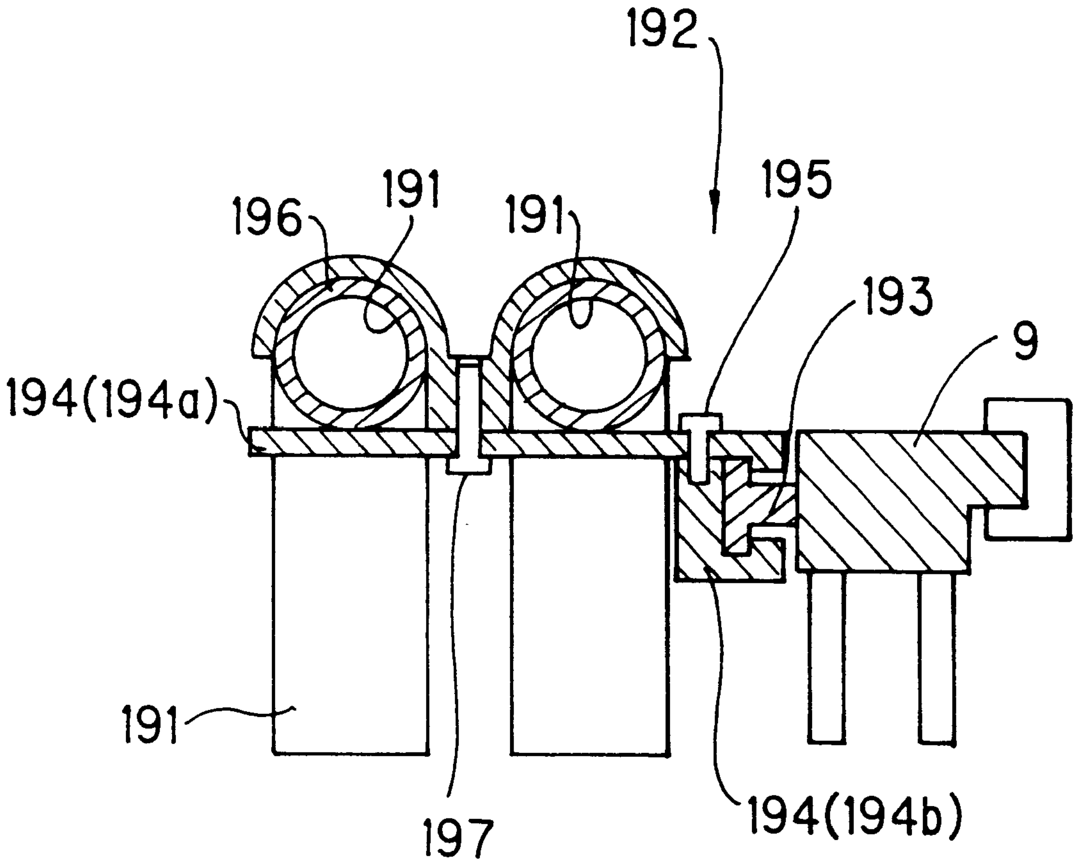
FIG. 38 is an enlarged view of a part shown in FIG. 37.

Seventh Embodiment (FIG. 37, FIG. 38)

In this embodiment, the annular rails 9 are permanently provided around the outer periphery of the gas turbine 1, and the annular rails 9 also serve to support the components attached around the gas turbine 1.

FIG. 37 is a partial sectional view of the gas turbine 1 observed sideways and FIG. 38 is an enlarged sectional view illustrative of a part of FIG. 37.

Fuel pipes 190 for supplying fuels are connected to a plurality of combustors 2 of the gas turbine 1, and the respective fuel pipes are connected to a plurality of fuel pipe manifolds 191 disposed around the outer periphery of the gas turbine 1 to receive fuels supplied from a main fuel pipe which is not shown. The fuel pipe manifolds 191 are fixed at a plurality of points by supports 192 attached to the annular rail 9.

FIG. 38 is an enlarged view of the supporting sections of the fuel pipe manifolds 191 retained by the supports 192. As illustrated in FIG. 38, an annular support rail 193, the section of which is shaped approximately like T, is attached to the side surface of the annular rail 9. The pipe brackets 194 are equipped with a plate-shaped component 194*a* having a distal end bent to an approximately L shape and a hook-shaped component 194*b* which engages with the distal end of the plate-shaped component 194*a;* these components are connected by being clamped to the T-shaped distal end of the support rail 193 and secured by a bolt 195. Loosening the bolt 195 provides a gap between the plate-shaped component 194*a* and the hook-shaped component 194*b*, allowing the support 192 to slide along the support rail 193. The lengthy portion of the plate-shaped component 194*a* extends to a position where it comes in contact with the inner periphery of the fuel pipe manifolds 191; the lengthy portion and a clamping component 196 shaped like a gull wing hold the two fuel pipe manifolds 191 from the inner and outer peripheral sides therebetween and a bolt 197 is used to fix them.

According to this embodiment, the annular rail 9 for the travel of the disassembling and assembling apparatus 10 is used to fix and support the fuel pipe manifolds 191. This makes it possible to omit a conventionally used structure such as a support or the like for fixing the fuel pipe manifolds 191, to efficiently dispose the pipes around the gas turbine 1 and to achieve a compact peripheral equipment of the gas turbine 1 to which the disassembling and assembling apparatus 10 is applied.

Furthermore, since the support 192 allows the selection between the slide along the support rail 193 and fixing, the following great advantages are provided when assembling the fuel pipe manifolds 191. For instance, the fuel pipe manifold 191 is split and supported by lifting equipment above the gas turbine 1 and fixed onto the support 192, then the fuel pipe manifold 191 is moved to a position under the gas turbine 1 while sliding it along the support rail 193. This makes it possible to easily install the fuel pipe manifold 191 under the gas turbine 1 where it is difficult to make the hook of the lifting equipment reach and accordingly make the installation difficult.

In the embodiment, the fuel pipe manifolds 191 are fixed and supported on the annular rail 9 as described above. However, the annular rail 9 may be used to fix and support other components including air pipes and signal conduits around the gas turbine 1 to permit efficient installing work.

Figure 39:
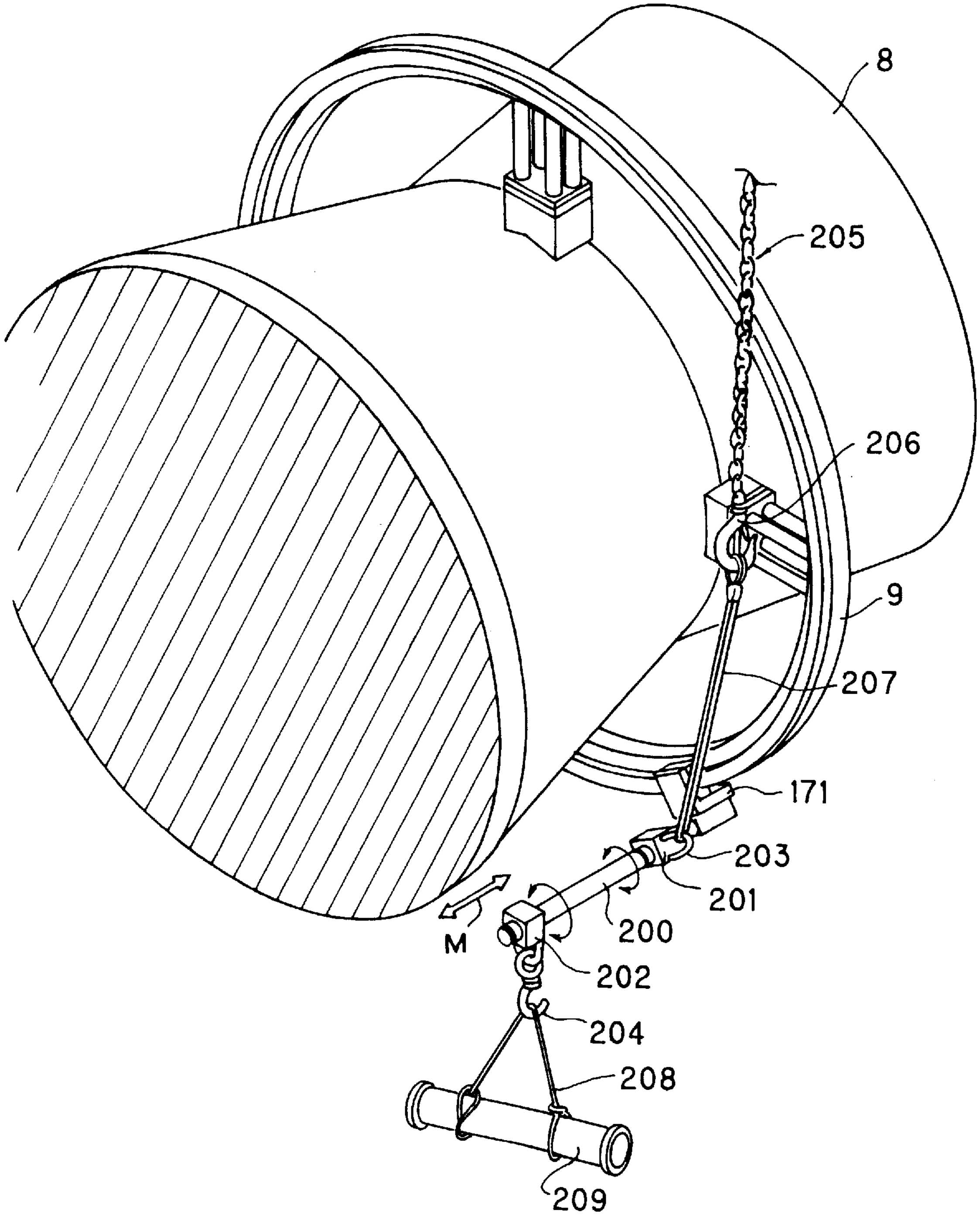
FIG. 39 is a perspective view showing a configuration of a gas turbine combustor disassembling and assembling apparatus in accordance with an eighth embodiment of the present invention.
Figure 40:
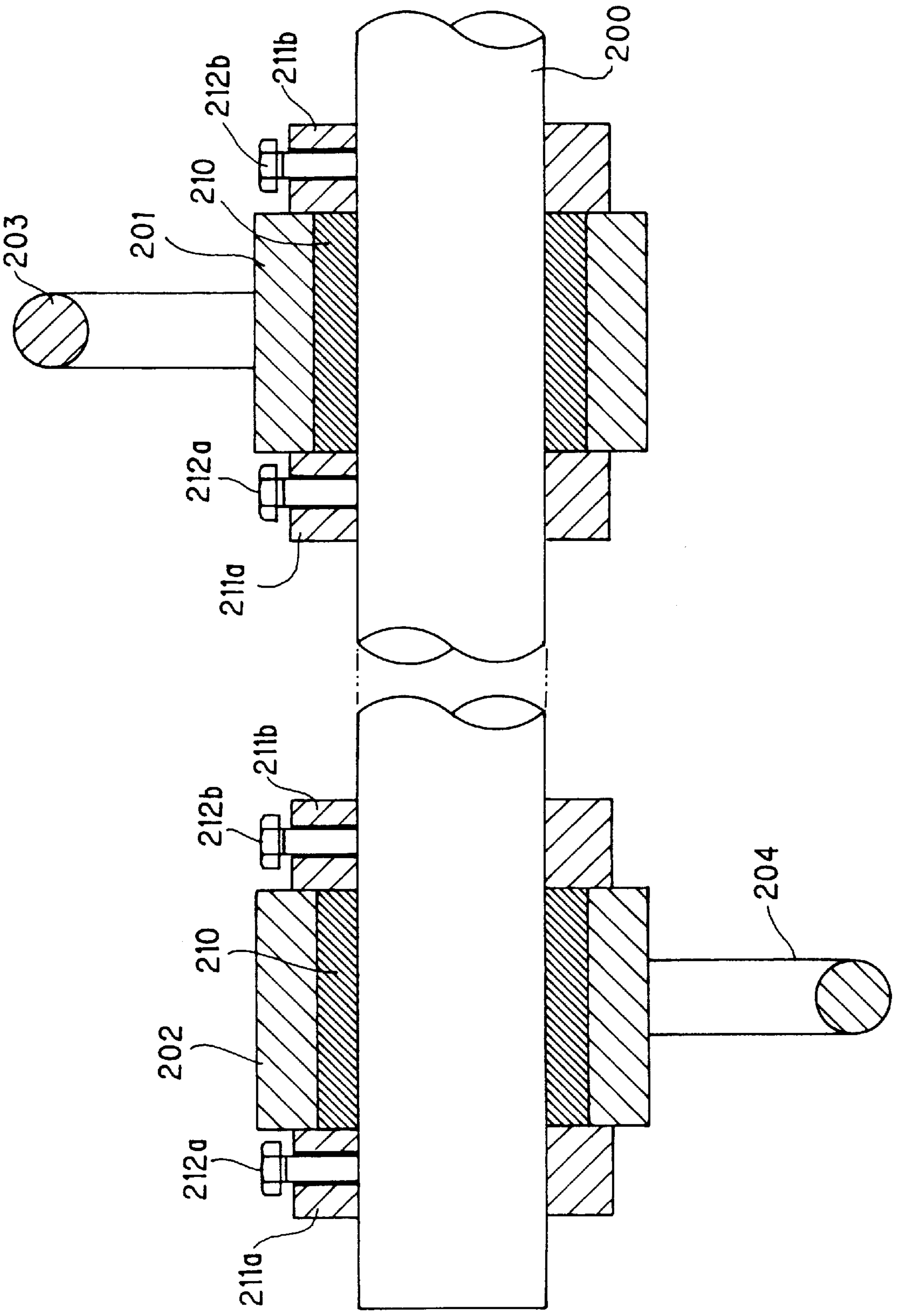
FIG. 40 is an enlarged sectional view illustrative of a retaining bar and a block shown in FIG. 39.

Eighth Embodiment (FIG. 39, FIG. 40)

This embodiment is equipped with a movable body which is capable of moving along the annular rail 9 to reach respective positions on the outer periphery of the gas turbine 1, so that gas turbine components can be retained by the movable body. FIG. 39 is a perspective view illustrative of a schematic configuration of this embodiment, and FIG. 40 is an enlarged sectional view of an essential section. In this embodiment, the description will be given to the application technology of the rails when the main body of the frame or the like of the gas turbine disassembling and assembling apparatus has been removed from the annular rail 9.

As shown in FIG. 39, a cylindrical retaining rod 200 is provided on the guiding block 171 which moves along the annular rail 9. The retaining rod 200 has rotatable blocks 201 and 202 on both ends thereof, the block 201 being connected to the guiding block 171. The blocks 201 and 202 are provided with a suspending handle 203 and a suspending hook 204, respectively. The suspending handle 203 is connected to a hook 206 of lifting equipment 205 via a wire 207. A component 209 of the gas turbine 1 is suspended from the suspending hook 204 via a suspending wire 208.

FIG. 40 shows the details of a structure for connecting the retaining rod 200 with the blocks 201 and 202. As illustrated in FIG. 40, a rotary bushing 210 is fitted in the inner sides of the blocks 201 and 202, and the retaining rod 200 is inserted in the rotary bushing 210. Disposed on both ends of the blocks 201 and 202 are collars 211*a* and 211*b* which are secured to the retaining rod 200 by setscrews 212*a* and 212*b*. Thus, the blocks 201 and 202 can rotate around the retaining rod 200 and are retained by the collars 211*a* and 211*b* so that the blocks do not come off the retaining rod 200.

With the arrangement of this embodiment, the retaining rod 200 which is secured and supported by the guiding block 171 can move along the annular rail 9 around the gas turbine main body casing 8 by being pulled by the lifting equipment 205. In this case, the attitude of the retaining rod 200 is vertically reversed at the upper side and the lower side of the gas turbine main body casing 8. However, the blocks 201 and 202 can rotate around the retaining rod 200, so that the hook 206 of the lifting equipment 205 can always pull the retaining rod 200 from above and the component 209 is suspended under the retaining rod 200.

Thus, according to the embodiment, the component 209 can be carried by using the lifting equipment 205 even under the gas turbine main body casing 8 where the gas turbine main body casing 8 prevents the hook 206 of the lifting equipment 205 from reaching there. This obviates the need for the conventional labor where workers have to carry heavy components to under the gas turbine main body casing 8, thus permitting reduced burden of work and higher efficiency.

Furthermore, loosening the setscrews 212_a_, 212_b_ of the collars 211_a_, 211_b_ enables the block 202 which is suspending the component 209 to slide in the axial direction of the retaining rod 200 as indicated by an arrow M in FIG. 39 so as to carry the component 209 to a desired location within the sliding range.

In this embodiment, the component 209 is suspended from the retaining rod 200 to carry it. However, the method is not limited thereto, and for example, the component 209 may be clamped to the retaining rod 200 or the retaining rod 200 may be provided with a small lifting unit to suspend it.

Ninth Embodiment (FIG. 41 through FIG. 44)

This embodiment is equipped with a combustor component retaining device which is capable of transferring a combustor component to and from the hand assembly 56 and a positioning means for making the frame 54, which travels in the circumferential direction of the gas turbine 1 on the annular rail 9, position the combustor component retaining device in a predetermined position and stop it there to transfer the combustor component to and from the hand assembly 56 always in the predetermined position.

Figure 41:
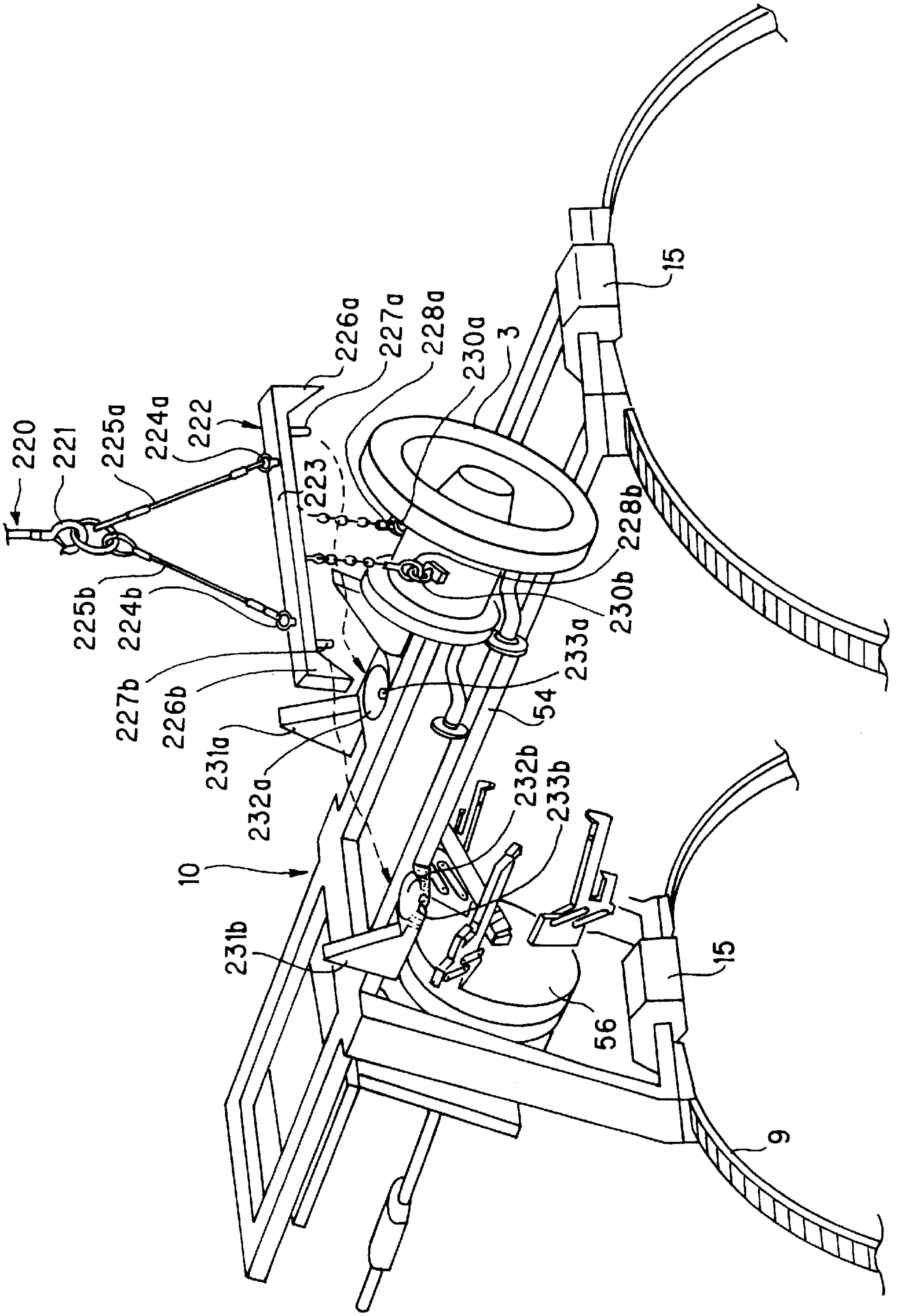
FIG. 41 is a perspective view showing a configuration of a gas turbine combustor disassembling and assembling apparatus in accordance with a ninth embodiment of the present invention.
Figure 42:
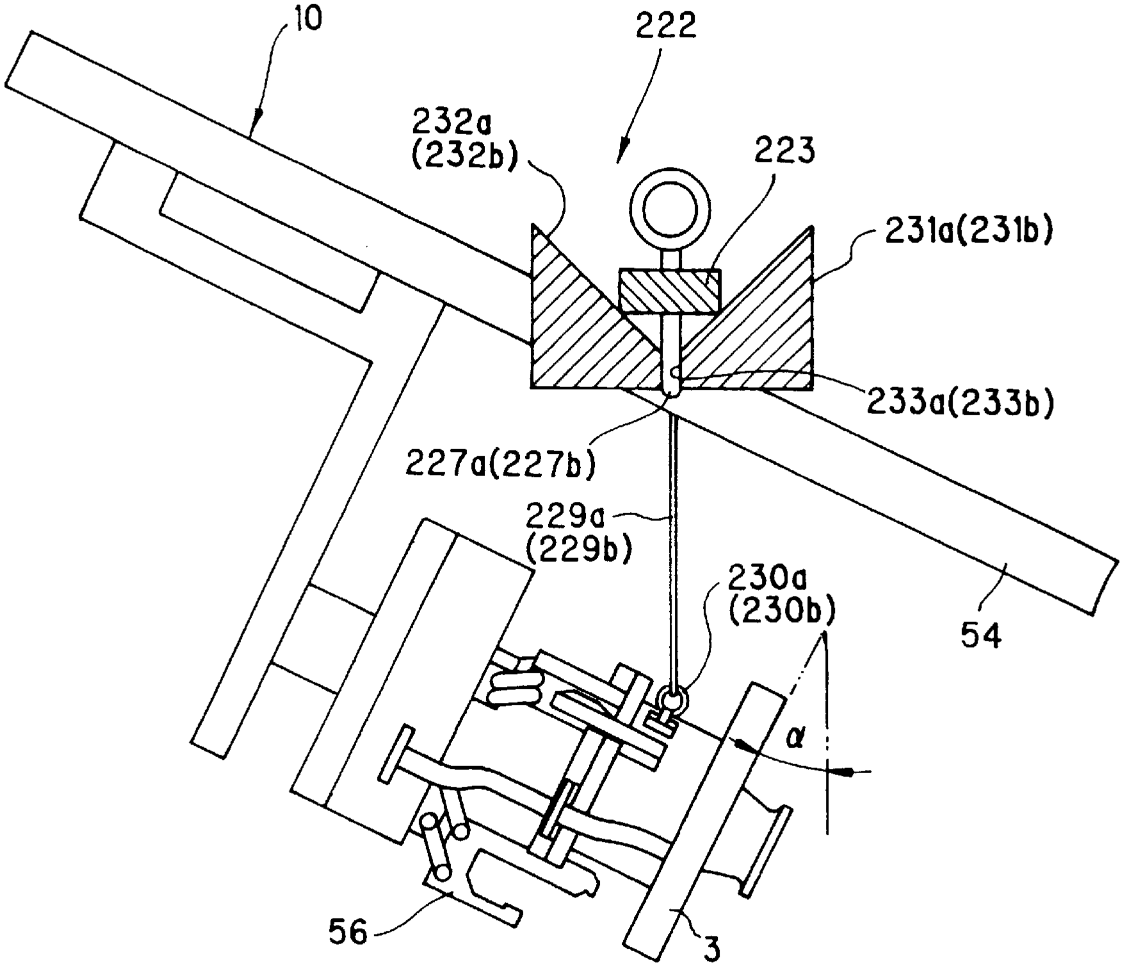
FIG. 42 is a side view showing an operation of the ninth embodiment.
Figure 43:
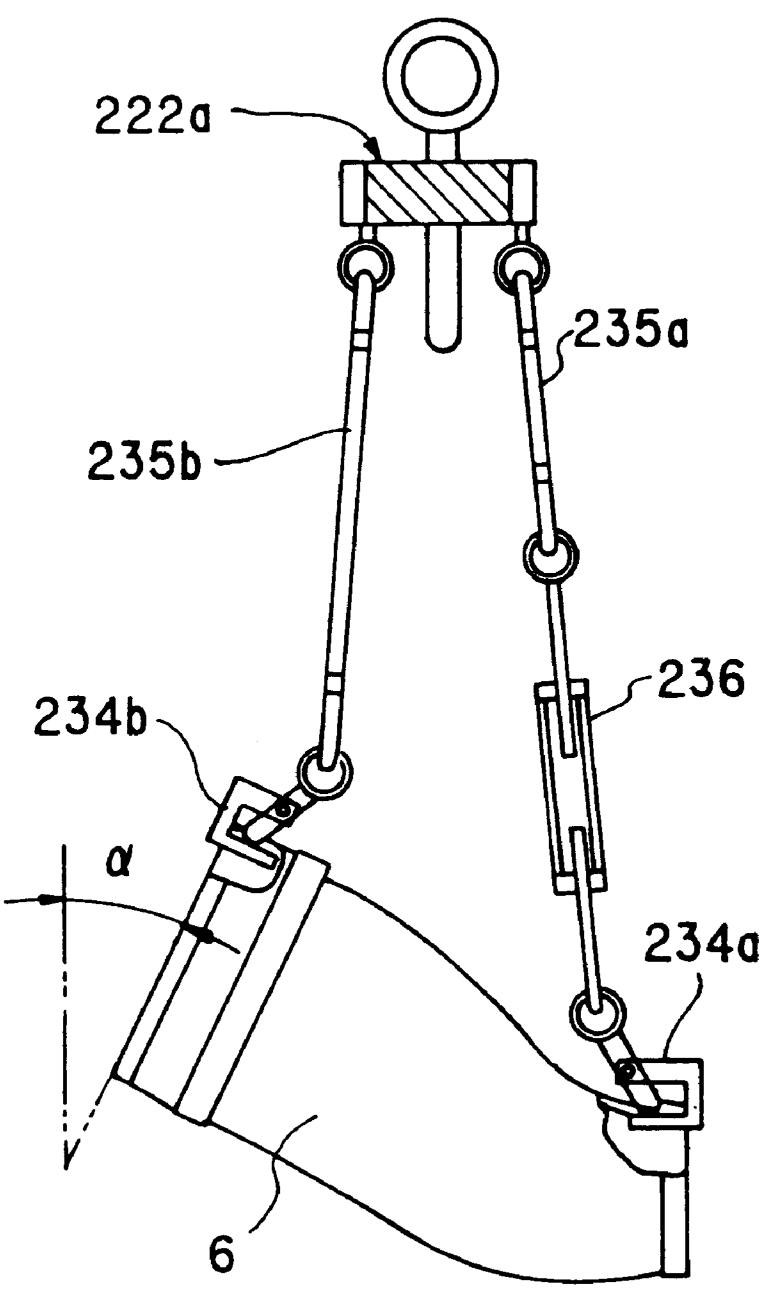
FIG. 43 is a side view showing an operation of the ninth embodiment.
Figure 44:
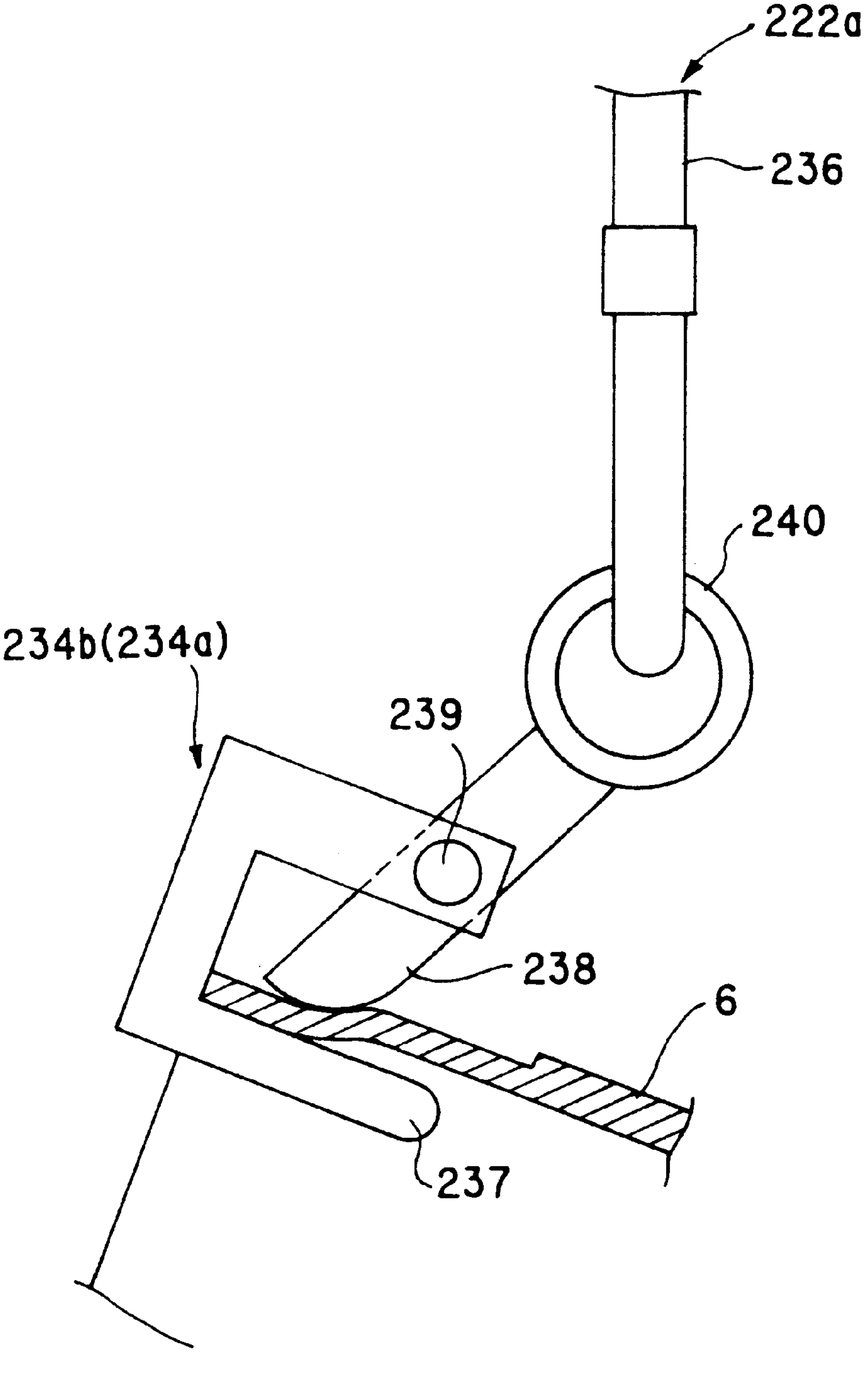
FIG. 44 is an enlarged view illustrative of a supporting section of the a transition piece shown in FIG. 43.

FIG. 41 is a perspective view illustrative of the entire configuration of this embodiment, FIG. 42 and FIG. 43 are explanatory views illustrative of the operation, and FIG. 44 is an enlarged view of a part thereof.

In this embodiment, a technology for supplying the fuel nozzle 3 to the disassembling and assembling apparatus 10 and having it held thereby will be described. As shown in FIG. 41, lifting equipment 220 is provided above the disassembling and assembling apparatus 10 and a combustor component supplying jig 222 is suspended on a hook 221 of the lifting equipment 220. The combustor component supplying jig 222 has a beam 223 which has a length slightly greater than the width of the disassembling and assembling apparatus 10, and suspending bolts 224_a_ and 224_b_ are mounted at both ends on the upper side of the beam 223 and suspending wires 225_a_, 225_b_ are attached to the respective suspending bolts 224_a_, 224_b_.

Provided at both ends on the lower side of the beam 223 are a pair of guides 226_a_ and 226_b_ shaped like inversed triangles having slopes wherein the opposing sides increasingly grow away from each other downward, and a pair of stud pins 277_a_, 277_b_ are provided between the guides 226_a_, 226_b_. Between the stud pins 227_a_, 227_b_, there are provided two suspending chains 229_a_, 229_b_ to which suspending hooks 228_a_, 228_b_ are attached.

A pair of suspending bolts 230_a_ and 230_b_ are attached to the fuel nozzle 3, and the suspending bolts 230_a_, 230_b_ are suspended by the suspending hooks 228_a_, 228_b_ of the suspending chains 229_a_, 229_b_. Provided on both ends on the upper side of the frame 54 of the disassembling and assembling apparatus 10 are V-shaped guides 231_a_ and 231_b_ which have V-shaped grooves. The grooves of the V-shaped guides 231_a_ and 231_b_ have conic guide tapered openings 232_a_, 232_b_. The guide tapered openings 232_a_, 232_b_ have, at the centers thereof, holes 233_a_, 233_b_ in which the bottom ends of the downward stud pins 227_a_, 227_b_ which are provided on the combustor component supplying jig 222 are fitted.

FIG. 42 is a view of the combustor component supplying jig 222 retaining the fuel nozzle 3 observed sideways, the jig being mounted on the disassembling and assembling apparatus 10. In FIG. 42, the downward stud pins 227_a_, 227_b_ of the combustor component supplying jig 222 have been inserted in the guide tapered openings 232_a_, 232_b_ of the disassembling and assembling apparatus 10. Further, the suspending bolts 230_a_ and 230_b_ of the fuel nozzle 3 are provided in the position of center of gravity which matches the tilt angle of the hand assembly 56 of the disassembling and assembling apparatus 10 having a tilt angle $\alpha$ in the installation state shown in FIG. 42.

FIG. 43 shows a case wherein the transition piece 6 which is a different combustor component from the one described above is being suspended by a combustor component supplying jig 222_a_ which is almost similar to the one described above. The transition piece 6 is clamped by clamps 234_a_, 234_b_ having suspending handles at two points thereof, namely, the front and back upper ends thereof, both clamps 234_a_, 234_b_ being suspended from the combustor component supplying jigs 222, 222_a_ via wires 235_a_, 235_b_; and a turnbuckle 236 is installed at the middle between the clamp 234_a_ and the wire 235_a_. The turnbuckle 236 is adapted to adjust the distance between the combustor component supplying jig 222_a_ and the clamp 234_a_ and to set the angle of the transition piece 6 to $\alpha$ which is the same as that of the fuel nozzle 3.

FIG. 44 is the enlarged view illustrative of a structure for attaching the clamp 234_b_ (234_a_) to one end of the transition piece 6. The clamp 234_b_ (234_a_) supports the upper wall inner surface of one end of the transition piece 6 by a jaw 237 and pushes the upper wall outer surface thereof by the distal end of a link bar 238. The link bar 238 is adapted to clamp an end of the combustor component in cooperation with the jaw 237 by the dead weight of the combustor component, making use of the principle of lever by using a joint 239 as the fulcrum and the suspending handle 240 as the point of force. When an attempt is made to pull out the end of the combustor component, the distal end of the link bar 238 is pulled also by friction and it moves in the direction for clamping the end of the combustor component. This prevents the transition piece 6 from falling off the clamp 234_b_ (234_a_) during the transportation thereof onto the disassembling and assembling apparatus 10.

With this arrangement, the combustor component is suspended by using the combustor component supplying jigs 222 and 222_a_ and carried to a portion above the disassembling and assembling apparatus 10 by the lifting equipment 220, and the stud pins 227_a_, 227_b_ are fitted in the guide tapered openings 232_a_, 232_b_ while guiding the combustor component supplying jigs 222, 222_a_ by the V-shaped guides 231_a_, 231_b_ to install the combustor component supplying jigs 222, 222_a_ on the disassembling and assembling apparatus 10. This makes it possible to always position the fuel nozzle 3 or the transition piece 6, which is suspended from the combustor component supplying jigs 222, 222_a_, at a predetermined point.

Thus, since the hand assembly 56 is capable of always holding the fuel nozzle 3 or the transition piece 6 in the same position, once the holding position is stored in the controller of the disassembling and assembling apparatus 10, the fuel nozzle 3 or the transition piece 6 can be automatically held. This leads to markedly reduced labor required for supplying a combustor component to the disassembling and assembling apparatus 10.

By enabling automatic operation of the lifting equipment 220, further reduction in labor can be achieved and combustor components can be supplied to the disassembling and assembling apparatus securely and quickly.

In the configuration described above, the fuel nozzle 3 and the transition piece 6 are supplied to the disassembling and assembling apparatus 10. However, other combustor components can be supplied to the disassembling and assembling apparatus 10 by using the combustor component supplying jig 222 by providing the similar bolts to the suspending bolts 230*a*, 230*b* provided on the fuel nozzle 3. If no suspending bolts can be provided, then the supply to the disassembling and assembling apparatus 10 can be accomplished by using a jig like the combustor component supplying jig 222*a*.

Figure 45:
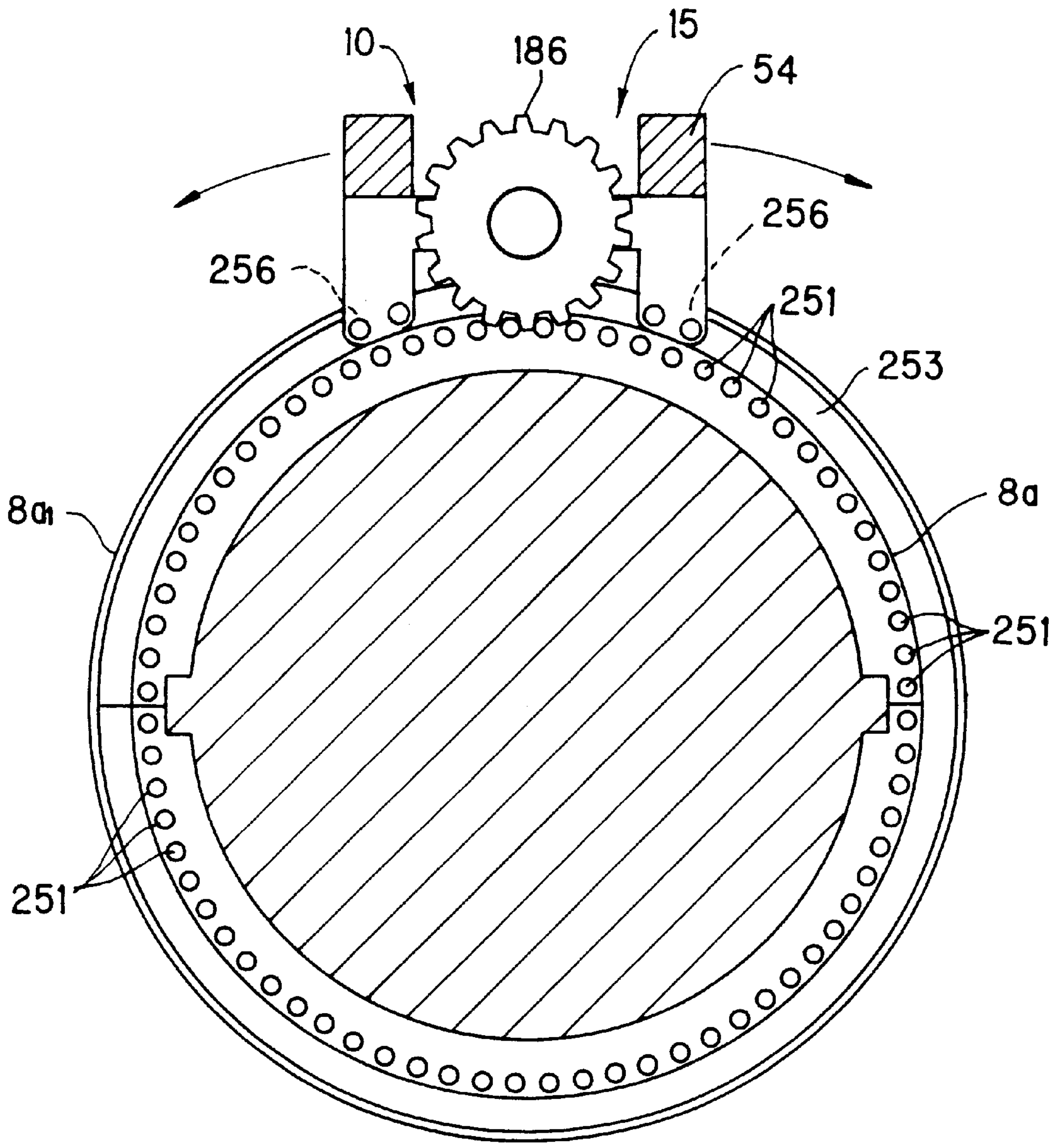
FIG. 45 is a front view illustrative of a configuration of a gas turbine combustor disassembling and assembling apparatus in accordance with a tenth embodiment of the present invention.
Figure 46:
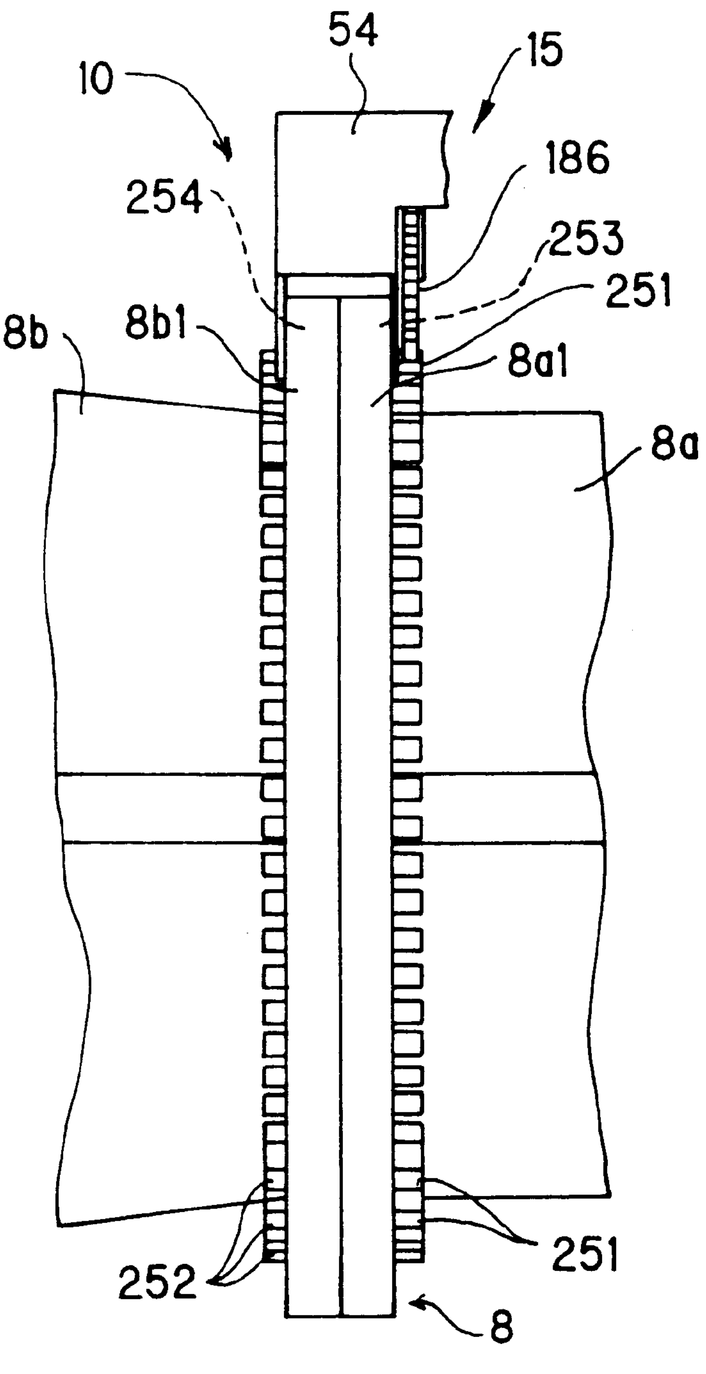
FIG. 46 is a side view of FIG. 45.
Figure 47:
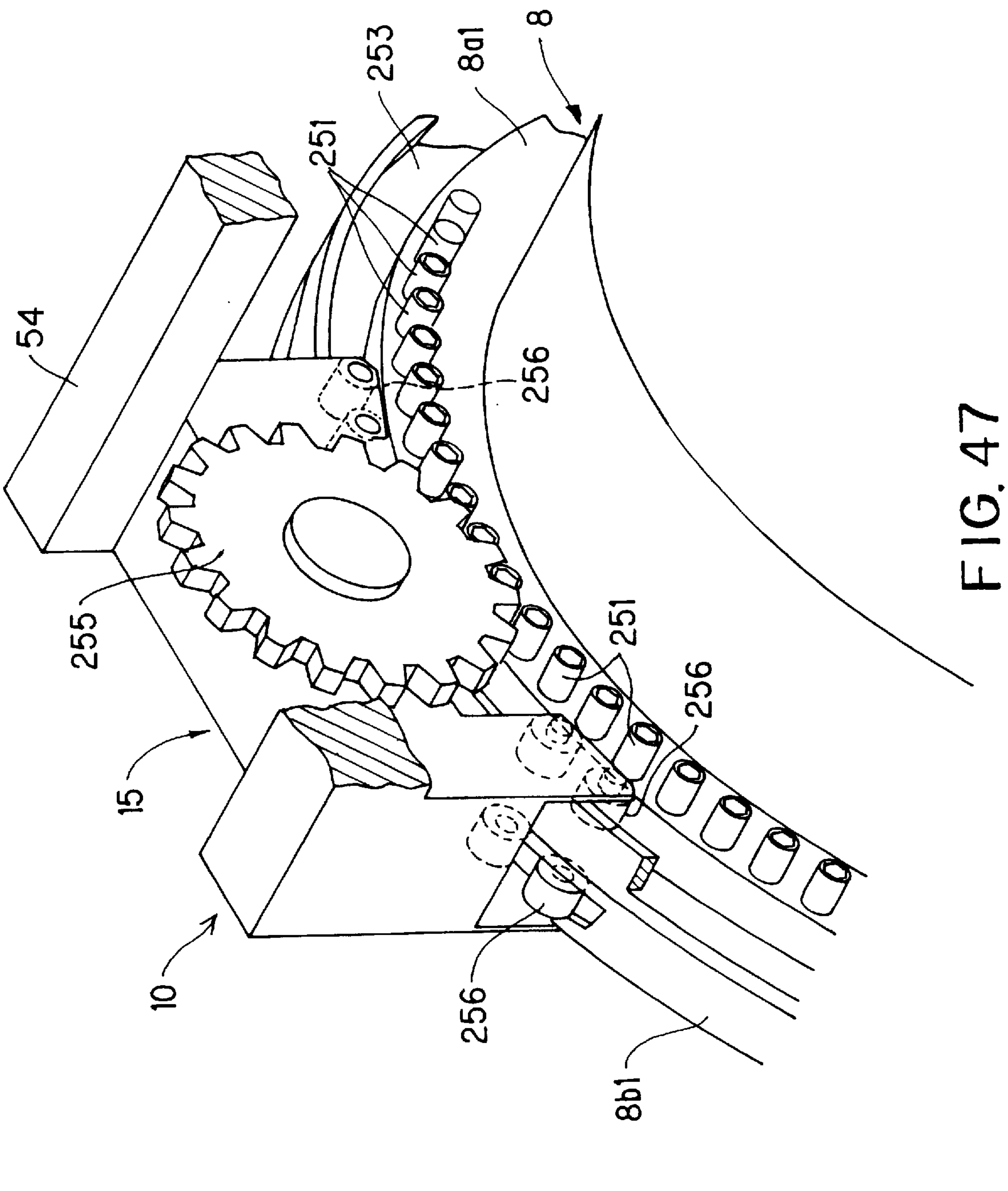
FIG. 47 is an enlarged view of a gear shown in FIG. 45.

Tenth Embodiment (FIG. 45 through FIG. 47)

In this embodiment, a flange extending on the outer periphery of the gas turbine main body casing 8 will be used as the annular rail 9. The flange serves as the rail on which the frame 54 is mounted and many guiding projections are projected therefrom in parallel to the axial center of the gas turbine main body casing 8 at predetermined intervals all over the periphery of the side surface of the flange, and a rotating and driving device which has a gear meshing with the guiding projections is attached to the frame 54 so as to enable the frame to travel around the gas turbine main body casing.

FIG. 45 is a front view illustrative of the entire structure of this embodiment, FIG. 46 is a side view of FIG. 45, and FIG. 47 is a perspective enlarged view showing an essential section.

In this embodiment, as shown in FIG. 45 and FIG. 46, the gas turbine main body casings 8*a*, 8*b* adjacent to each other are assembled with the side surfaces of flanges 8*a*1 and 8*b*1 abutting against each other and connected by many bolts 251 and nuts 252 which are disposed equidistantly in the circumferential direction and which are parallel to a turbine shaft. The bolt heads of the bolts 251 are cylindrically shaped.

The thick outer peripheries of the flanges 8*a*1 and 8*b*1 where bolts 251 are disposed are provided with annular grooves 253 and 254 which are open sideways and which are formed along the periphery of the gas turbine main body casing 8.

As illustrated in FIG. 47, a circumferential traveling section 15 of the frame 54 of the disassembling and assembling apparatus 10 is provided with a gear 255 which rotates in the circumferential direction of the gas turbine main body casing 8 while engaging with the heads of the bolts 251 serving as the guiding projections. The gear 255 is supported by a bearing, which is not shown, rotated by a motor, not shown, and stopped by a brake, also not shown.

Guide rollers 256 having a diameter which is slightly smaller than the width of the grooves 253 and 254 are provided on both sides of the gear 255, the roller surfaces are applied to the inner walls of the grooves 253 and 254, and the guide rollers 256 are provided on the circumferential traveling section 15 in such a manner that they are fitted in the grooves 253 and 254.

With such an arrangement, the flanges 8*a*1 and 8*a*2 for fixing the adjoining gas turbine main body casings 8*a* and 8*b* function as the rails, so that the gear 255 meshing with the heads of the bolts 184 which secure the gas turbine main body casing 8 and which serve as the guiding projections is rotated while applying the guide rollers 256 to the inner surfaces of the circular grooves 253 and 254 formed around the circumference of the gas turbine main body casing 8. This obviates the need for installing a special rail to allow the frame 54 of the disassembling and assembling apparatus 10 to travel around the gas turbine main body casing 8.

According to this embodiment, the rails on which the disassembling and assembling apparatus 10 travels can be omitted, leading to remarkably lower manufacturing cost of the entire structure. Furthermore, the work for installing the travel rails around the gas turbine main body casing 8 can be omitted, leading to higher efficiency of the entire disassembling and assembling work of combustors.

Figure 48:
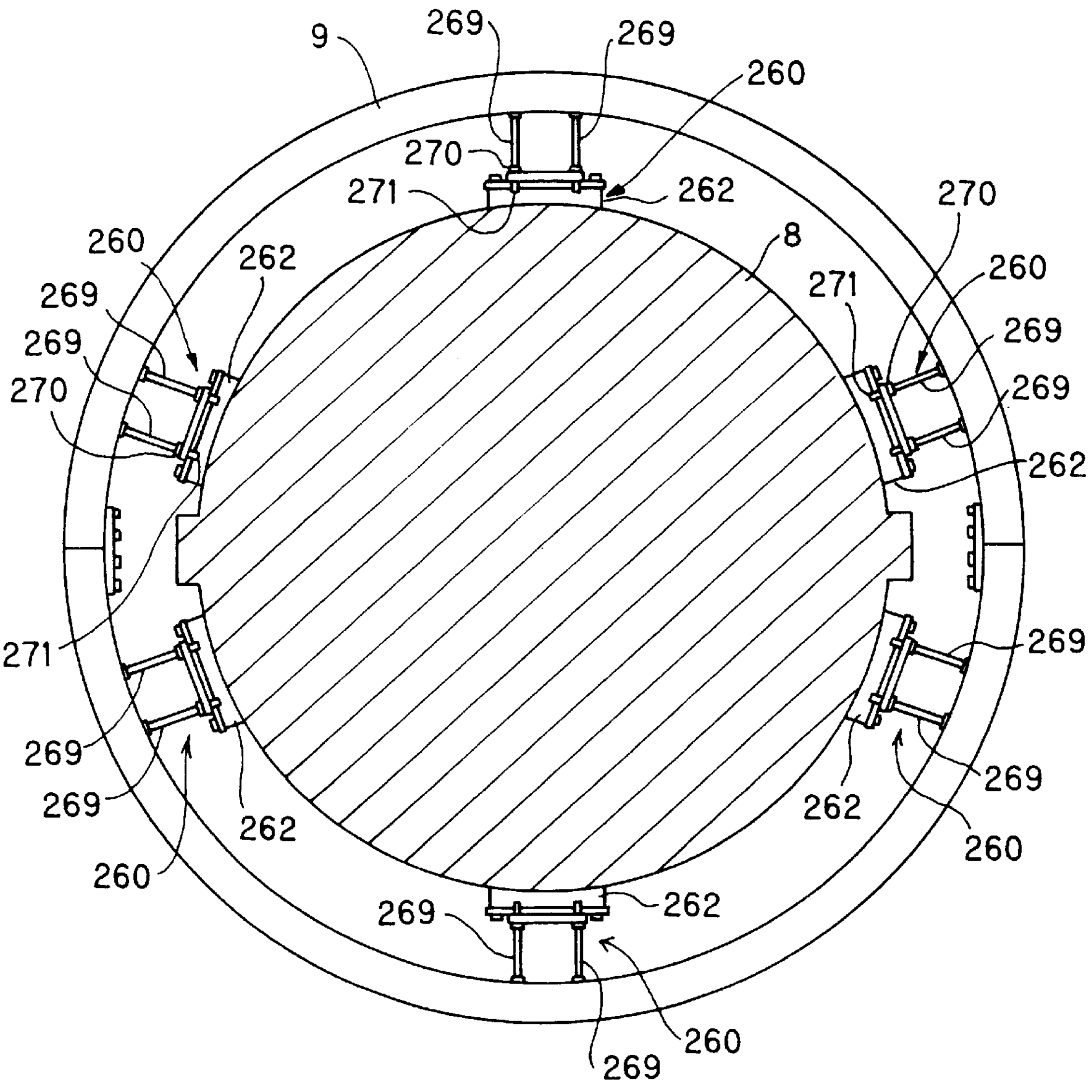
FIG. 48 is a front view illustrative of a configuration of a gas turbine combustor disassembling and assembling apparatus in accordance with an eleventh embodiment of the present invention.
Figure 49:
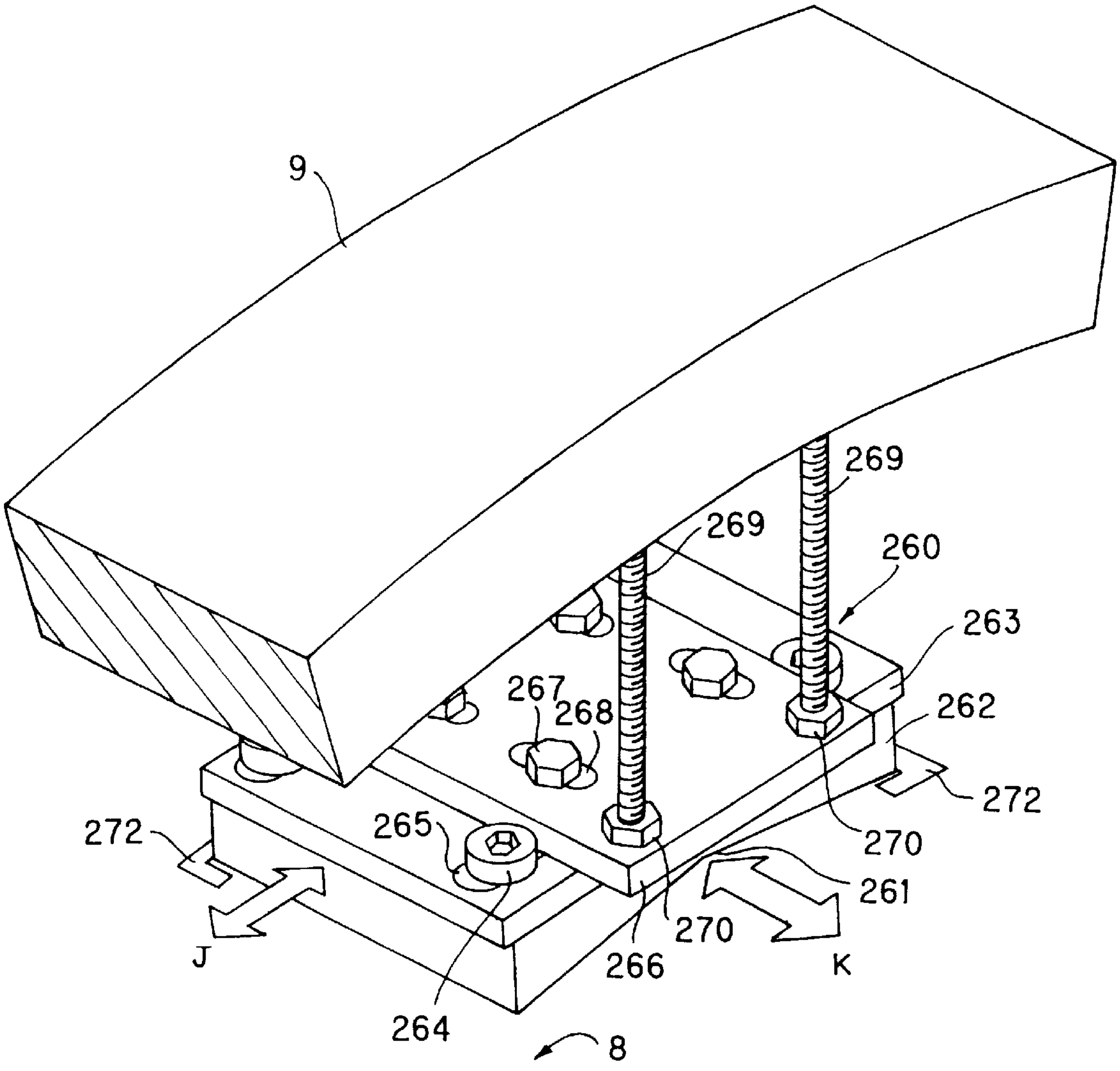
FIG. 49 is an enlarged perspective view of an essential section of a configuration shown in FIG. 48.

Eleventh Embodiment (FIG. 48, FIG. 49)

This embodiment refers to the installation and configuration of the annular rails 9, which are disposed with predetermined gaps provided in a radial direction around the gas turbine main body casing 8 by interconnecting a plurality of split ring rail elements, and a plurality of jack screws are projected toward the center on the inner circumferential side of the rail elements. A plurality of base plates are connected at predetermined intervals in the circumferential direction on the outer peripheral surface of the gas turbine main body casing 8, and the base plates are respectively pressed against the outer peripheral surface of the gas turbine main body casing 8 from the rail elements side by fixtures which engage with the jack screws, thereby fixing the annular rails.

FIG. 48 is a front view illustrative of the entire configuration of this embodiment, and FIG. 49 is an enlarged perspective view of an essential section.

In this embodiment, as shown in FIG. 48, the annular rail 9 has a larger inside diameter than the outside diameter of the gas turbine main body casing 8. The annular rail 9 is installed outside the gas turbine main body casing 8 by mounting fixtures 260 which are disposed at several locations on the inner side thereof.

Specifically, as illustrated in FIG. 49, the mounting fixtures 260 are in contact with the outer side of the gas turbine main body casing 8 through a V-groove surface 261, and a base plate 262 having several tapped holes on the upper side is provided. An intermediate plate 263 is provided on the outer side of the base plate 262 which is bolted thereon. The intermediate plate 263 has a hole 265 in which a bolt 264 is inserted. This hole 265 is formed into a slot to enable positional adjustment in the direction of an arrow E in the circumferential direction of the annular rail 9 shown in FIG. 49.

The intermediate plate 263 has several tapped holes in addition to the slot 265 and a positioning plate 266 is bolted to the outer side of the intermediate plate 263. A hole 268 which is formed in the positioning plate 266 and in which a bolt 267 is inserted is also a slot to enable positional adjustment in the longitudinal direction of the annular rail 9, i.e. in a direction F shown in FIG. 49. The positioning plate 266 is so long that the front and rear ends thereof extend beyond the front and rear ends of the intermediate plate 263 and the base plate 262.

The projected front and end portions of the positioning plate 266 have several drilled holes. Stud screws 269 extending from the inner side of the annular rail 9 are inserted in the drilled holes. The positioning plate 266 is fastened vertically by nuts 270, 271 and the stud screws 269 are fixed to the positioning plate 266. Two marks 272 are drawn on the surface of the gas turbine main body casing 8, and the marks match the shapes of the corners of base plate 262.

With this arrangement, the position of the positioning plate 266 with respect to the base plate 262 can be adjusted as desired in the longitudinal and lateral directions, i.e. J direction and K direction shown in FIG. 49. Furthermore, the stud screw 269 is raised in relation to the positioning plate 266 by fastening the nut 270 on the positioning plate 266 downward and loosening the nut 271 beneath the positioning plate 266, and conversely, turning the nut 270 and the nut 271 causes the stud screws 269 to go down with respect to the positioning plate 266.

When the stud screw 269, in these screws, located near one side surface of the annular rail 9 is raised and the stud screw 269 located near the opposite side is lowered, the annular rail 9 may be tilted slightly.

According to this embodiment, the inner side of the annular rail 9 is provided with several mounting fixtures 260 and the stud screws 269 of the respective mounting fixtures 260 are extended outward in relation to the positioning plate 266 so as to eliminate the play between the inner side of the annular rail 9 and the outer side of the gas turbine main body casing 8, thereby enabling the annular rail 9 to be fixed to the outer side of the gas turbine main body casing 8. This means that the annular rail 9 can be secured to the outer side of the gas turbine main body casing 8 without the need for providing flanges, tapped holes, etc. for securing the annular rail 9. Hence, the disassembling and assembling apparatus 10 is enabled to travel by fixing the annular rail 9 of the gas turbine 1 which has already been installed, obviating the need of modifying the gas turbine main body casing 8 to apply the disassembling and assembling apparatus 10 and consequently permitting markedly reduced operating cost.

Moreover, since the position of the annular rail 9 can be adjusted through the mounting fixtures 260, the annular rail 9 can be installed with high accuracy, enabling accurate travel of the disassembling and assembling apparatus 10. Further, when reference point 74-fixing the annular rail 9, installing the base plate 263 to the marks 272 drawn on the surface of the outer side of the gas turbine main body casing 8 omits the labor for readjusting the position of the annular rail 9. In place of drawing the marks 272 on the outer surface of the gas turbine main body casing 8, positioning pins or abutting blocks for the base plate 263 may be mounted on the outer surface of the gas turbine main body casing 8, or other alternatives may be taken.

Figure 50:
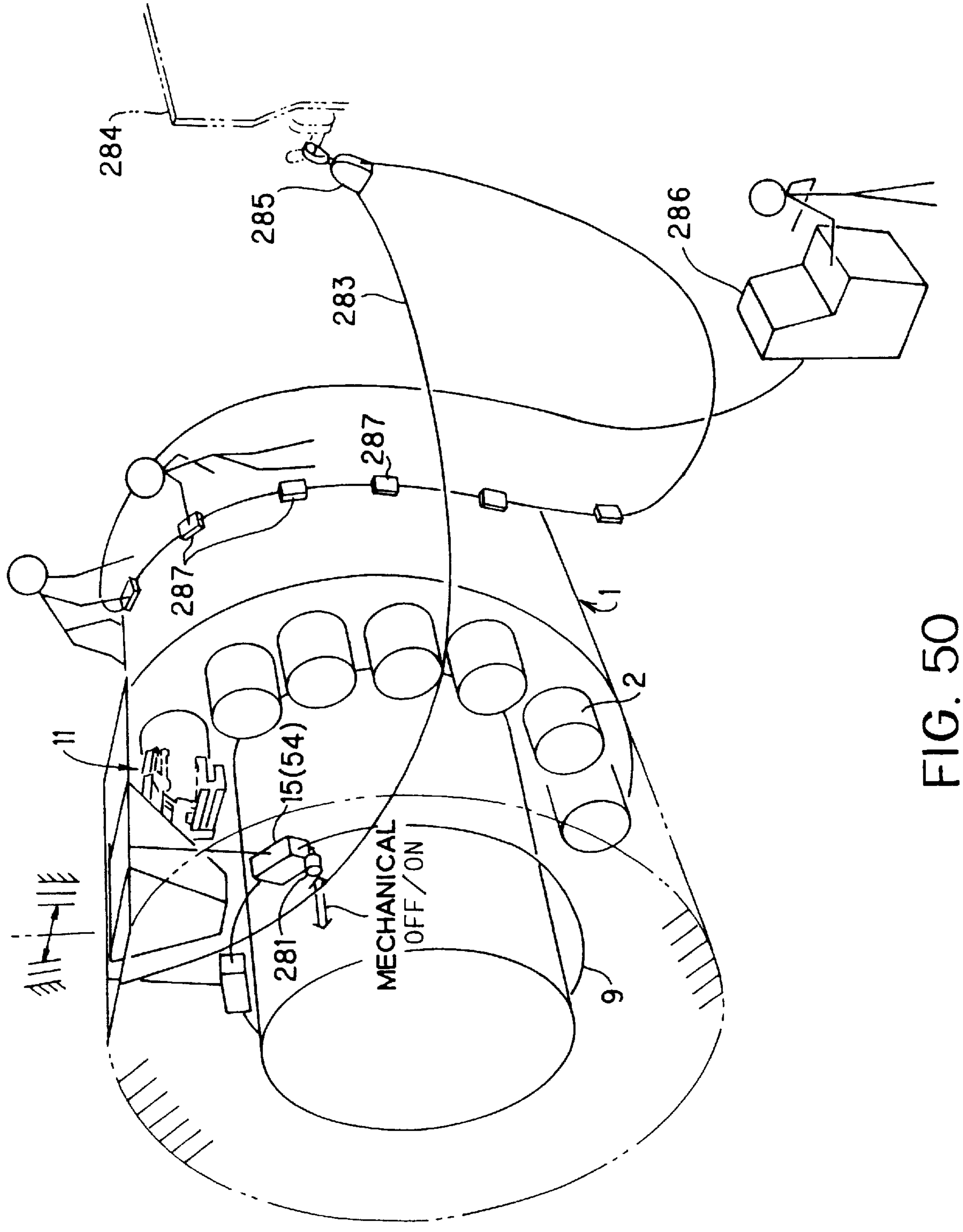
FIG. 50 is a perspective view illustrative of a configuration of a gas turbine combustor disassembling and assembling apparatus in accordance with a twelfth embodiment of the present invention.
Figure 51:
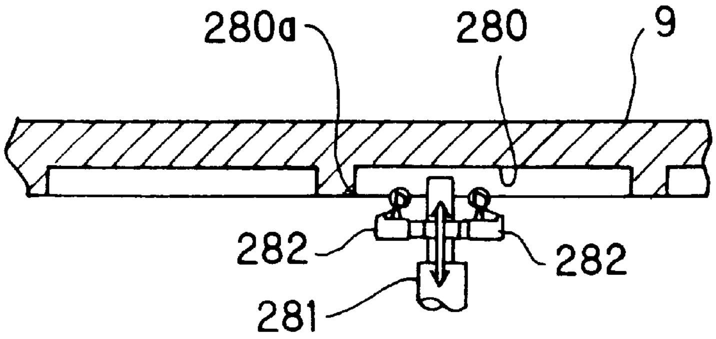
FIG. 51 is an enlarged sectional view illustrative of a stopper shown in FIG. 50.

Twelfth Embodiment (FIG. 50, FIG. 51)

FIG. 50 is a schematic diagram of a basic configuration illustrative of an entire gas turbine disassembling and assembling apparatus according to this embodiment and FIG. 51 is an enlarged sectional view illustrative of a stopper shown in FIG. 50.

In this embodiment, the annular rail 9 along the circumference of the gas turbine 1 is provided with an operating area defining section 280 composed of a projection or groove, and a movable mechanical stopper 281 which moves in or out of the operating area defining section 280 is mounted on the frame 54 which functions as the circumferential traveling section 15. The movable mechanical stopper 281 is provided with movable hardware limit switches 282 disposed in a position for detecting in advance the approach of an end 280*a* of the operating area defining section 280.

A conduit 283 is used for the transfer of power and signals from outside the operating area of the circumferential traveling section 15 to the circumferential traveling section 15, and a cable hitch 285 suspended on an enclosure 284 (outer enclosure) of the gas turbine 1 is installed in the middle of the conduit. A controller 286 is separated and it is disposed on the floor out of the operating area.

The conduit 283 has a length sufficient to allow it to be wound around the gas turbine 1 on the outer side from the cable hitch 285. Switches 287 for checking the number of workers are provided in the middle of the conduit 283, and the switches are provided with a function for registering beforehand the number of workers in the controller 286 individually or all switches 287 for checking the number of workers are entered in series.

The operation of this embodiment will be described.

The movable mechanical stopper 281 permits the movable range to be changed, and the movable hardware limit switch 282 has a function for stopping the circumferential traveling section 15 by means of electric hardware before the mechanical stopper 281 bumps against the end 280*a* of the operating area defining configuration. In the case of the gas turbine disassembling and assembling apparatus where the disassembling and assembling work can be clearly separated from the work for transporting and moving components, the movable range can be changed according to the type of work so as to restrict the operating area.

Further, the conduit 283 interferes with the operation of the circumferential traveling section 15, and the operating range of the circumferential traveling section 15 can be switched easily from the right half to the left half by changing the position where the cable hitch 285 is suspended from the right enclosure 284 to a left enclosure, which is not shown, by using a jib crane or the line which is not shown.

The controller 286 which is placed on the floor out of the operation area helps to reduce the weight of the circumferential traveling section 5, and a supervisor is enabled to operate the controller 286 from a location out of the operating area. A worker can notify the supervisor by pressing the number check switch 287 that preparatory operation has been completed.

When the number check switches 287 are of the parallel input, the number of workers is registered in the controller 286 in advance and the number of the check switches 287 that have been depressed is counted and the count result is shown on a display unit or the like, not shown, thus aiding the supervisor in making decisions.

During operation, the number check switches 287 are monitored, and the operation is continued only when the number check switches 287 in a number equal to the number of workers are depressed if the switches 287 are in the parallel input mode, or only when they are depressed if the switches 287 are in the serial input mode, and the operation is immediately stopped when the switches 287 are released, thereby securing the sweat of the workers.

According to this embodiment, the movable mechanical stopper 281 and the movable hardware limit switch 282 restrict the operating area of the apparatus to secure further safety in the work involving workers. A supervisor is enabled to safely operate the controller 286 in a place out of the operating areas and to confirm that all workers have evacuated the operating area by the notification through the number check switches 287. In the aspect of ease of operation, the conduit 283 can be moved simply by changing the suspending position of the cable hitch 285, and the controller 286 which is placed out of the operating area helps to reduce the weight of the circumferential traveling section 15, making it easier to install the circumferential traveling section 15 on the annular rail 9.

Figure 52:
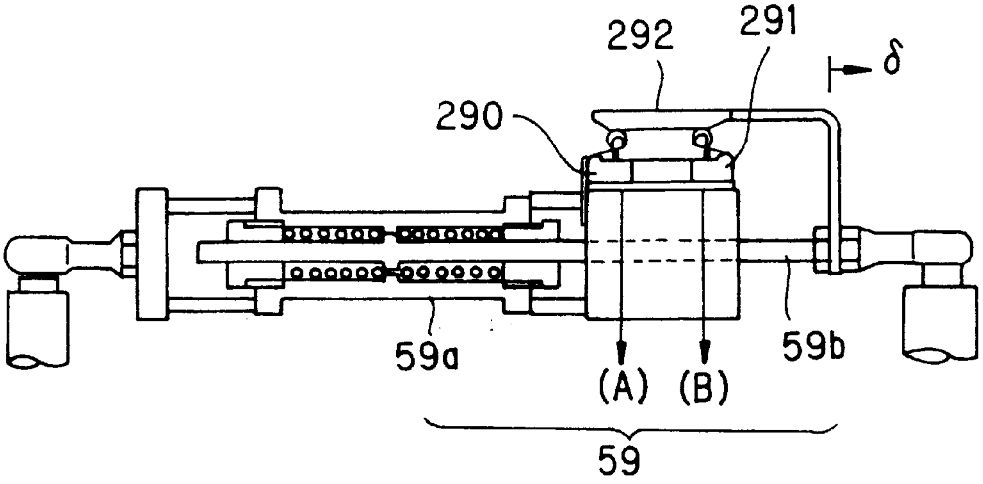
FIG. 52 is a side view illustrative of a configuration of a gas turbine combustor disassembling and assembling apparatus in accordance with a thirteenth embodiment of the present invention.
Figure 53:
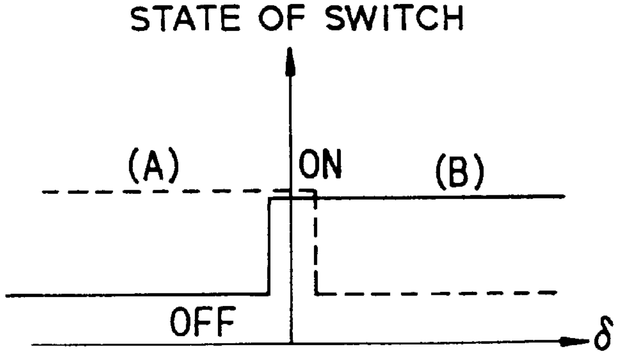
FIG. 53 is a characteristic diagram showing an operation of a restoring mechanism shown in FIG. 52.
Figure 54:
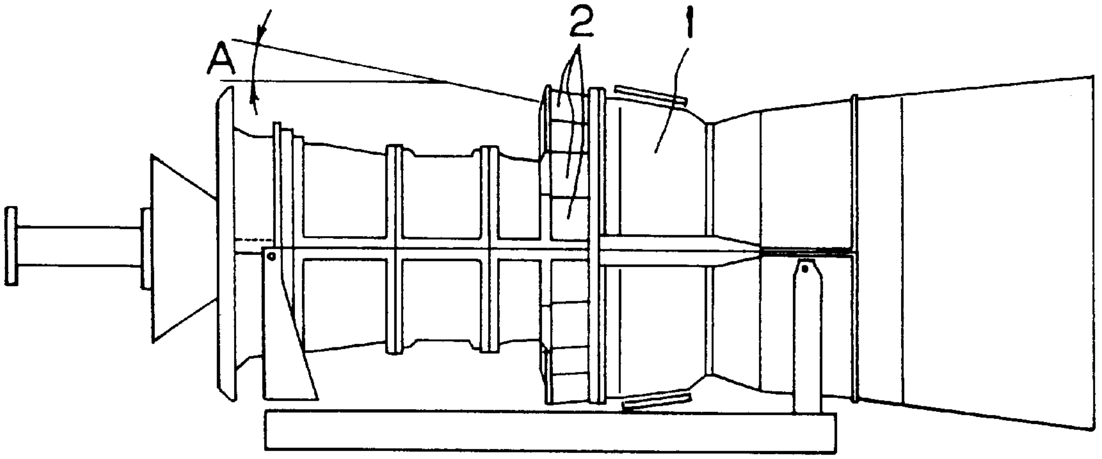
FIG. 54 PRIOR ART
FIG. 54 is a side view illustrative of a gas turbine equipped with multi-can combustors.
Figure 55:
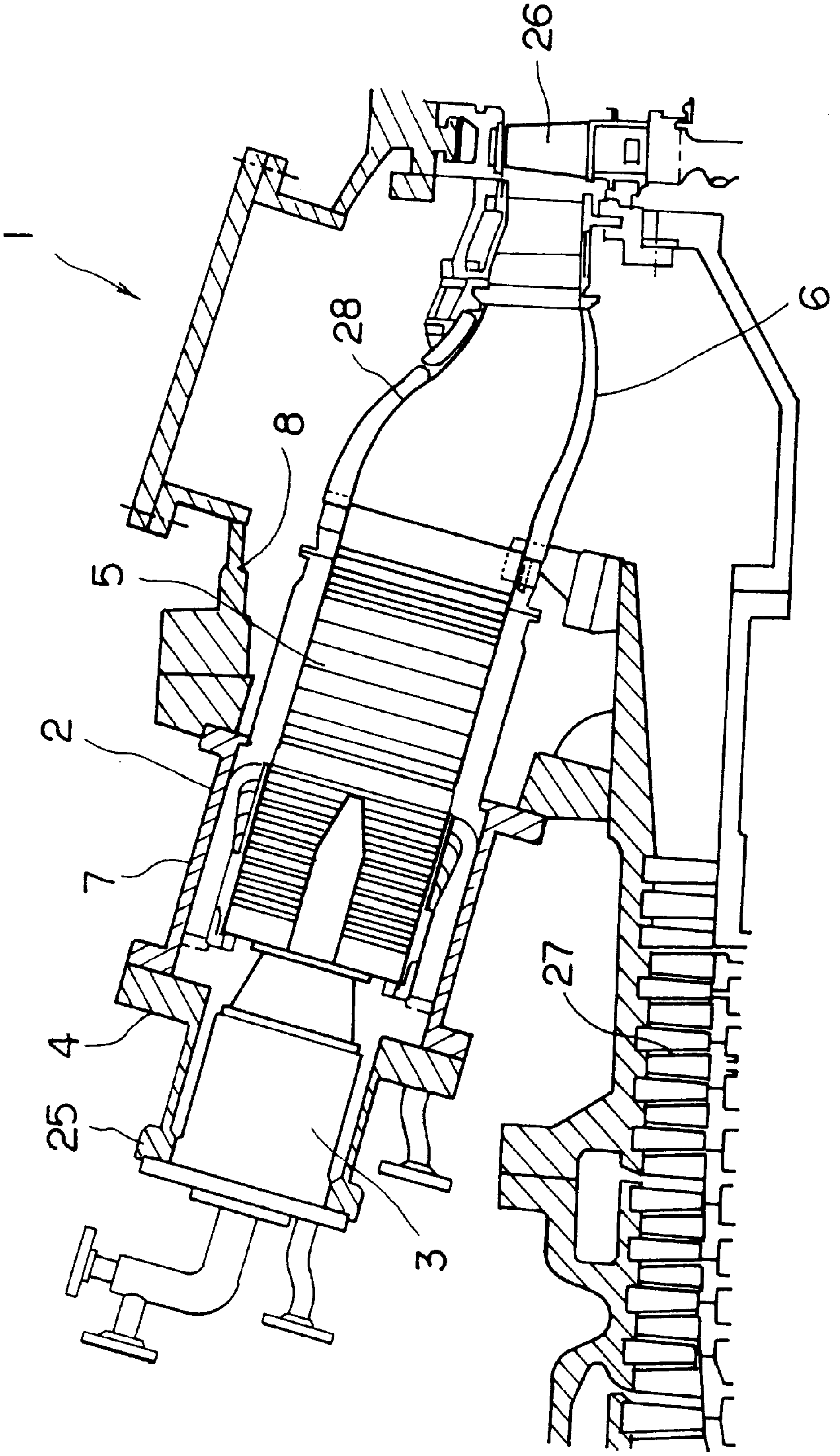
FIG. 55 PRIOR ART
FIG. 55 is an enlarged longitudinal sectional view of a combustor shown in FIG. 54.

Thirteenth Embodiment (FIG. 52, FIG. 53)

FIG. 52 is a sectional view showing a restoring mechanism of a gas turbine disassembling and assembling apparatus according to this embodiment and FIG. 53 is a characteristic chart showing the operation.

According to this embodiment, as illustrated in FIG. 52, in the restoring mechanism 59 described previously, a position check sensor (A) 290 and a position check sensor (B) 291 are mounted on the housing 59$a$ and a sensor dog 292 on the shaft 59$b$. The sensor dog 292 has a predetermined length. There is provided an automatic restoring function constituted by a program of a controller which actuates the aforementioned balance ratio changing mechanism 97 to restore the link mechanism 57 back in a particular position according to the information from the position check sensor 290.

Specifically, in the embodiment in accordance with the present invention, when the link mechanism 57 has been restored back in the particular position, the sensor dog 292 is in contact with both the position check sensor (A) 290 and the position check sensor (B) 291.

With the state described above set as an origin, FIG. 52 shows a state of the sensor switches, a relative amount δ of the housing 59$a$ and the shaft 59$b$ being indicated on the axis of abscissa.

If the relative amount δ moves toward positive or negative, then one of the position check sensors 290 and 291 moves out of the sensor dog 292, thus enabling the detection of the tilting direction of the link mechanism (57), not shown. The controller controls the position of the gas turbine disassembling and assembling apparatus and the direction of the gravity is evident. Therefore, it can be specified whether the balancing state of the balance ratio changing mechanism 97 should be made heavier or lighter according to the restoring direction. The balancing state is gradually changed until the particular restoring position is reached.

Thus, according to this embodiment, the tilting direction of the link mechanism can be detected and therefore workers are not required to perform any special operation, permitting automatic balancing.

Thus, the use of the disassembling and assembling apparatus in accordance with the present invention permits safe and easy work of the complicated disassembly and assembly of a multi-can type gas turbine combustor and also permits shorter time required for overhauling a combustor in comparison with the conventional disassembling and assembling work which used to be done mostly by hand.

More specifically, manual disassembly and assembly of a combustor involves the work for adjusting the orientation of a component according to the tilting angle of the combustor before suspending it by a crane, the work for lifting and moving a transition piece in and out of a gas turbine casing by a worker, the work for manually pulling out and inserting straight a combustor liner or transition piece along the central axis of the combustor, and the work for operating a crane for disassembling and assembling the lower half combustor, all of which has been extremely difficult. According to the present invention, all such work can be accomplished mechanically, enabling significantly greater ease of operation.

What is claimed is:

1. An apparatus for disassembling and assembling a gas turbine combustor, comprising:

a hand assembly for holding a combustor component of a gas turbine;

an inserting and drawing section which supports the hand assembly and moves the same in parallel to a central axis of the combustor component; and a retainer for securing the inserting and drawing section onto a casing which constitutes an outer section of the gas turbine, said retainer comprising:

an annular rail set having a plurality of supporting sections which are provided in a circumferential direction of the casing of the gas turbine; and a travel device which supports the inserting and drawing section and which moves along the supporting sections in the circumferential direction of the gas turbine to move the hand assembly in the circumferential direction.

2. An apparatus according to claim 1, wherein said hand assembly comprises an inner hand and an outer hand, said inner hand being constructed by a rod which is configured to be inserted in the casing of the gas turbine and which is flexible and a holding section disposed on a distal end of the rod and said outer hand being constructed by a holding section disposed on an outer side of the inner hand with respect to a center axis of the rod.

3. An apparatus according to claim 2, wherein said inner hand comprises a hook and is equipped, at a root of said inner hand, with a rotatable inner hand joint, a driving and fixing shaft which drives the hook of said inner hand and which also fixes said inner hand joint when the drive shaft moves to a side where the hand is used, and an inner hand stretching device which stretches and bonds said inner hand joint.

4. An apparatus according to claim 2, wherein said inner hand has a hook equipped with a rotatable auxiliary roller which is composed of an elastic material.

5. An apparatus according to claim 2, wherein said outer hand has a hook provided with a driving unit which comprises an outer hand driving device which drives an output end in a linear direction in relation to a hand central axis and an outer hand hook driving link which rotatably links one end thereof to an output end of said outer hand driving device and which rotatably links another end thereof to the hook.

6. An apparatus according to claim 2, wherein the outer hand comprises a hook and wherein a rotatable auxiliary roller is provided on a corner and section of the hook of said outer hand.

7. An apparatus according to claim 1, wherein said inserting and drawing section comprises a frame to which the travel device is secured so as to travel on the annular rail set in a circumferential direction of the gas turbine and a hand mounting section which travels on the frame in a direction for inserting and drawing out a combustor component, and said hand mounting section and said hand assembly are connected together so as to be allowed to rock in two independent directions by at least one link mechanism section each of which has at least three links.

8. An apparatus according to claim 7, wherein an intermediate mounting section is further provided between said hand mounting section and said hand assembly, the at least one link mechanism section comprises first and second link mechanism sections, said hand mounting section being connected to said intermediate mounting section via the first link mechanism section, said hand assembly being connected to said intermediate mounting section via the second link mechanism section.

9. An apparatus according to claim 8, further comprising a restoring mechanism which provides said first and second link mechanism sections with a restoring force to restore a particular attitude thereof.

10. An apparatus according to claim 9, wherein said restoring mechanism has a restore position adjusting mechanism for adjusting a restore position of the first and second link mechanism sections.

11. An apparatus according to claim 8, further comprising a rocking and securing mechanism for rocking said first and second link mechanism sections until the link mechanism sections take a predetermined attitude and for applying a braking force to the link mechanism sections when said predetermined attitude is reached.

12. An apparatus according to claim 8, wherein the second link mechanism section includes a plurality of trapezoid linkage-shaped links, at least one of a length and a supporting position of the at least three links is variable, and a position of a reference point toward which the links are directed between an inserting distal end mounting section and the center of gravity of the combustor component to be held by the hand assembly is variable.

13. An apparatus according to claim 12, further comprising at least an axial position changing mechanism for changing an axial position of a link end of said second link mechanism section, and reference point position moving means for changing the position of the reference point toward which the at least three links of said link mechanism section are directed between the distal end mounting section and a center of gravity of the combustor component.

14. An apparatus according to claim 7, wherein said at least three links are respectively arranged in parallel.

15. An apparatus according to claim 14, wherein two links of the at least three links are formed as a set and link ends of said set are coaxially connected.

16. An apparatus according to claim 14, wherein a restoring mechanism is equipped with a position check sensor for checking that the at least one link mechanism section has been restored to a particular position.

17. An apparatus according to claim 16, wherein a balance ratio changing mechanism is disposed, and further comprising an automatic restoring mechanism which operates the balance ratio changing mechanism according to information received from the position check sensor so as to reset the at least one link mechanism section to the particular position.

18. An apparatus according to claim 7, wherein said links of the link mechanism are arranged to form a trapezoid directed substantially toward a reference point at an end of the combustor component observed from said hand assembly.

19. An apparatus according to claim 18, further comprising, instead of said link mechanism, a guiding mechanism for guiding the hand assembly in a spherical trajectory in relation to the hand mounting section.

20. An apparatus according to claim 19, wherein the guiding mechanism is a curve guiding mechanism in two independent directions which permits a curvature radius center to be set between a distal end mounting section and a center of gravity of the combustor component as observed from said hand assembly.

21. An apparatus according to claim 7, wherein the at least one link mechanism section is equipped with a balancing mechanism, said balancing mechanism having a point of action at an intermediate mounting section at at least one of a portion near a hand assembly of said at least one link mechanism section and the hand assembly and having a fulcrum at at least one of said hand mounting section at a portion near a frame of said at least one link mechanism section and said intermediate mounting section, a balancing weight of the balancing mechanism serving as a point of force which balances with a weight at the fulcrum is provided on an opposite side to the fulcrum, and wherein at least one of a balancing link which serves also as one of the at least three links and a separate balancing link is employed as a balance pole of three points to support said balancing link so as to be allowed to rock in two independent directions at the point of action and the fulcrum.

22. An apparatus according to claim 21, wherein said balancing mechanism is provided with a balance ratio changing mechanism for changing a balance ratio by changing the position of at least one of said point of force, said point of action, and said fulcrum.

23. An apparatus according to claim 21, further comprising a balancing link separately provided, wherein said balancing link is equipped with an error absorbing mechanism which absorbs a geometrical error in a link direction when said at least one link mechanism section moves if said balancing link is geometrically redundant for said at least one link mechanism section.

24. An apparatus according to claim 1, wherein a chain which serves as a traveling guide of the frame, is disposed in the circumferential direction of the annular rail set on at least one of an outer and inner circumferential side of the annular rail set, said chain having a plurality of lengthy chain elements projecting on both sides of the chain provided at intervals, and projecting ends of lengthy chain pins are fixed to said annular rail set by fixtures.

25. An apparatus according to claim 24, wherein the frame which travels along the annular rail set has a plurality of travel sprocket wheels configured to engage with the chain in a direction of a length of the chain so that the wheels rotate in synchronization with each other.

26. An apparatus according to claim 7, wherein the frame is fixed to a guide member which is guided by said annular rail set with a plurality of fasteners which are elastic means which permits movement in a counter-fastening direction in response to a reaction force equal to or greater than a predetermined level in the counter-fastening direction.

27. An apparatus according to claim 1, wherein the annular rail set is permanently provided on an outer circumferential section of the gas turbine so that the annular rail set serves to support a component installed around the gas turbine.

28. An apparatus according to claim 1, further comprising a movable body which moves to respective positions of an outer circumferential section of the gas turbine along the annular rail set, said movable body being provided with a retaining member capable of retaining a component of the gas turbine.

29. An apparatus according to claim 1, further comprising a combustor component retaining device which permits transfer of the combustor component to and from the hand assembly and positioning means for positioning and stopping said combustor component retaining device in a predetermined position and for always ensuring that said combustor component is transferred to and from the hand assembly in the predetermined position.

30. An apparatus according to claim 7, wherein a flange extending on an outer periphery of a casing of a main body of the gas turbine is applied as the annular rail set so as to use the flange as the annular rail set on which the frame is mounted, a plurality of guiding projections which are parallel to the axial center of the casing of the main body of the gas turbine are projected all over a circumference of a side surface of said flange at predetermined intervals, a rotating drive device having a gear engaging with the respective guiding projections is installed on said frame, and said frame is adapted to travel around the casing of the main body of the gas turbine.

31. An apparatus according claim 1, wherein the annular rail set is disposed with a predetermined gap provided in a diametral direction around a casing of a main body of the gas turbine by interconnecting a plurality of split ring rail elements, a plurality of jack screws are disposed to project toward a center on an inner circumferential side of said rail elements, a plurality of base plates are connected at intervals in a circumferential direction on an outer peripheral surface of the casing of the main body of the gas turbine, and said base plates are respectively pressed against the outer peripheral surface of the casing of the main body of the gas turbine from the rail elements by fixtures which engage with said jack screws to fix the annular rail set.

32. An apparatus according to claim 7 wherein the annular rail set is provided with an operating area defining section composed of a projection or a groove, and the frame which travels on said annular rail set is provided with a movable mechanical stopper which moves in and out of said operating area defining section.

33. An apparatus according to claim 32, wherein the mechanical stopper is equipped with a movable hard limit switch which detects in advance an approach of the mechanical stopper to an end of the operating area defining section.

34. An apparatus according to claim 1, further comprising a conduit for taking a power and a signal from outside an operating area of the frame, and a cable hitch for supporting a middle portion of the conduit in a position of an enclosure of the gas turbine.

35. An apparatus according to claim 34, wherein a controller for controlling operating sections is disposed on a floor outside the operating area.

36. An apparatus according to claim 34, wherein the conduit has a sufficient length beyond the cable hitch to allow the cable hitch to be wound around the gas turbine and a check switch for checking the number of workers is provided in the middle of the conduit.

37. An apparatus according to claim 1 wherein the annular rail set is provided with an operating area defining section composed of a groove, and the frame which travels on said annular rail set is provided with a movable mechanical stopper which moves in and out of said operating area defining section.

38. An apparatus according to claim 2, wherein said outer hand has a hook provided with a driving unit which comprises an outer hand driving device which drives an output end in a rotational direction in relation to a hand central axis and an outer hand hook driving link which rotatably links one end thereof to an output end of said outer hand driving device and which rotatably links another end thereof to the hook.

39. An apparatus for disassembling and assembling a gas turbine combustor, comprising:

a hand assembly for holding a combustor component of a gas turbine;

an inserting and drawing section which supports the hand assembly and moves the same in parallel to a central axis of the combustor component;

a retainer for securing the inserting and drawing section onto a casing which constitutes an outer section of the gas turbine, wherein said inserting and drawing section comprises a frame to which the retainer is secured and a hand mounting section which travels on the frame in a direction for inserting and drawing out the combustor component and at least one link mechanism section which connects together said hand mounting section and said hand assembly so as to be allowed to rock in two independent directions, said at least one link mechanism section having at least three links.

40. An apparatus according to claim 39, wherein the at least one link mechanism section is equipped with a balancing mechanism, said balancing mechanism having a point of action at an intermediate mounting section at at least one of a portion near a hand assembly of said at least one link mechanism section and the hand assembly and having a fulcrum at least one of said hand mounting section at a portion near a frame of said at least one link mechanism section and said intermediate mounting section, a balancing weight of the balancing mechanism serving as a point of force which balances with a weight at the fulcrum is provided on an opposite side to the fulcrum, and wherein at least one of a balancing link which serves also as one of the at least three links and a separate balancing link is employed as a balance pole of three points to support said balancing link so as to be allowed to rock in two independent directions at the point of action and the fulcrum.

41. An apparatus according to claim 40, wherein said balancing mechanism is provided with a balance ratio changing mechanism for changing a balance ratio by changing the position of at least one of said point of force, said point of action, and said fulcrum.

42. An apparatus according to claim 40, further comprising a balancing link separately provided, wherein said balancing link is equipped with an error absorbing mechanism which absorbs a geometrical error in a link direction when said at least one link mechanism section moves if said balancing link is geometrically redundant for said at least one link mechanism section.

* * * * *